(12) United States Patent  (10) Patent No.: US 8,095,949 B1
Hendricks et al.  (45) Date of Patent: Jan. 10, 2012

(54) ELECTRONIC BOOK WITH RESTRICTED ACCESS FEATURES

(75) Inventors: John S. Hendricks, Potomac, MD (US); Michael L. Asmussen, Herndon, VA (US)

(73) Assignee: Adrea, LLC, Sunnyvale, CA (US)

( * ) Notice: Subject to any disclaimer, the term of this patent is extended or adjusted under 35 U.S.C. 154(b) by 0 days.

(21) Appl. No.: 09/344,492

(22) Filed: Jun. 25, 1999

Related U.S. Application Data

(63) Continuation-in-part of application No. 08/906,469, filed on Aug. 5, 1997, and a continuation-in-part of application No. 08/336,247, filed on Nov. 7, 1994, now Pat. No. 5,986,690, and a continuation-in-part of application No. 08/160,194, filed on Dec. 2, 1993, now Pat. No. 5,990,927, which is a continuation of application No. 08/160,281, filed on Dec. 2, 1993, now Pat. No. 5,798,785.

(51) Int. Cl.
*H04N 7/16* (2011.01)
(52) U.S. Cl. ............... 725/29; 725/25; 725/27; 725/28; 725/31; 725/137; 345/901; 707/781; 707/782; 707/783; 707/784; 707/785; 707/786; 726/26; 726/27; 726/28; 726/29; 726/30; 715/741; 715/742; 715/743; 713/166; 713/185; 713/192; 713/193; 705/51; 705/54; 705/58; 705/59; 380/229; 380/231; 380/232; 434/317
(58) Field of Classification Search .............. 725/25–31; 345/901; 707/200, 203, 781–786; 726/26–30; 715/741–743; 713/166, 185, 192–193; 705/51; 705/54, 58, 59; 380/229, 231, 232; 434/317
See application file for complete search history.

(56) References Cited

U.S. PATENT DOCUMENTS

| 3,860,873 | A | 1/1975 | Ringstad |
| 3,891,792 | A | 6/1975 | Kimura |
| 3,978,470 | A | 8/1976 | McGuire |
| 4,071,697 | A | 1/1978 | Bushnell et al. |
| 4,159,417 | A | 6/1979 | Rubincam |
| 4,160,242 | A | 7/1979 | Fowler |
| 4,179,212 | A | 12/1979 | Lahr |
| 4,197,590 | A | 4/1980 | Sukonick et al. |
| 4,272,819 | A | 6/1981 | Katsumata et al. |
| 4,298,793 | A | 11/1981 | Melis et al. |
| 4,302,193 | A | 11/1981 | Haynes |

(Continued)

FOREIGN PATENT DOCUMENTS

CA 2044574 12/1992

(Continued)

OTHER PUBLICATIONS

Rauch, et al.; Enabling the Book Metaphor for the World Wide Web: Disseminating on-line information as dynamic web documents; Jun. 1997; pp. 111-128.

(Continued)

*Primary Examiner* — Jason Salce

(74) *Attorney, Agent, or Firm* — Arent Fox, LLP

(57) ABSTRACT

A viewer for displaying electronic books and having various features for restricting access to their content. A user may assign ratings to stored electronic books, or use standard ratings, and assign access levels to potential users. The ratings and access levels determine which electronic books, or portions of the electronic books, a particular user may access on the viewer.

12 Claims, 56 Drawing Sheets

U.S. PATENT DOCUMENTS

| | | | |
|---|---|---|---|
| 4,361,848 A | 11/1982 | Poigner et al. | |
| 4,381,522 A | 4/1983 | Lambert | 725/93 |
| 4,398,216 A | 8/1983 | Field et al. | |
| 4,405,829 A | 9/1983 | Rivest et al. | |
| 4,406,626 A | 9/1983 | Anderson et al. | |
| 4,429,385 A | 1/1984 | Cichelli et al. | |
| 4,455,570 A | 6/1984 | Saeki et al. | |
| 4,484,217 A | 11/1984 | Block et al. | |
| 4,488,179 A | 12/1984 | Kruger et al. | |
| 4,513,390 A | 4/1985 | Walter et al. | |
| 4,517,598 A | 5/1985 | Van Valkenburg et al. | |
| 4,528,589 A | 7/1985 | Block et al. | |
| 4,528,643 A | 7/1985 | Freeny, Jr. | |
| 4,532,540 A | 7/1985 | Wine | |
| 4,533,948 A | 8/1985 | McNamara et al. | |
| 4,546,382 A | 10/1985 | McKenna et al. | |
| 4,567,512 A | 1/1986 | Abraham | |
| 4,578,531 A | 3/1986 | Everhart et al. | |
| 4,579,533 A | 4/1986 | Anderson et al. | |
| 4,587,520 A | 5/1986 | Astle | |
| 4,602,279 A | 7/1986 | Freeman et al. | |
| 4,604,710 A | 8/1986 | Amezcua et al. | |
| 4,605,964 A | 8/1986 | Chard | |
| 4,613,901 A | 9/1986 | Gilhousen et al. | |
| 4,616,263 A | 10/1986 | Eichelberger | |
| 4,621,282 A | 11/1986 | Ahern | |
| 4,623,920 A | 11/1986 | Dufresne et al. | |
| 4,625,076 A | 11/1986 | Okamoto et al. | |
| 4,625,235 A | 11/1986 | Watson | |
| 4,633,462 A | 12/1986 | Stifle et al. | |
| 4,639,225 A | 1/1987 | Washizuka | |
| 4,644,470 A | 2/1987 | Feigenbaum et al. | |
| 4,653,100 A | 3/1987 | Barnett et al. | |
| 4,668,218 A | 5/1987 | Virtanen | |
| 4,673,976 A | 6/1987 | Wreford-Howard | |
| 4,688,218 A | 8/1987 | Blineau et al. | |
| 4,688,246 A | 8/1987 | Eilers et al. | |
| 4,694,483 A | 9/1987 | Cheung | |
| 4,694,490 A | 9/1987 | Harvey et al. | |
| 4,697,209 A | 9/1987 | Klewit et al. | |
| 4,706,121 A | 11/1987 | Young | |
| 4,712,105 A | 12/1987 | Kohler | |
| 4,712,130 A | 12/1987 | Casey | |
| 4,716,543 A | 12/1987 | Ogawa et al. | |
| 4,724,491 A | 2/1988 | Lambert | |
| 4,731,840 A | 3/1988 | Mniszewski et al. | |
| 4,739,510 A | 4/1988 | Jeffers et al. | |
| 4,742,543 A | 5/1988 | Frederiksen | |
| 4,751,578 A | 6/1988 | Reiter et al. | |
| 4,768,087 A | 8/1988 | Taub et al. | |
| 4,774,655 A | 9/1988 | Kollin et al. | |
| 4,776,011 A | 10/1988 | Busby | |
| 4,792,972 A | 12/1988 | Cook, Jr. | |
| 4,796,220 A | 1/1989 | Wolfe | |
| 4,805,014 A | 2/1989 | Sahara et al. | |
| 4,816,901 A | 3/1989 | Music et al. | |
| 4,816,904 A | 3/1989 | McKenna et al. | |
| 4,820,167 A * | 4/1989 | Nobles et al. | 434/336 |
| D301,037 S | 5/1989 | Matsuda | |
| 4,829,372 A | 5/1989 | McCalley et al. | |
| 4,829,558 A | 5/1989 | Welsh | |
| 4,829,569 A | 5/1989 | Seth-Smith et al. | |
| 4,835,607 A | 5/1989 | Keith | |
| 4,854,878 A | 8/1989 | Malvino | |
| 4,855,725 A | 8/1989 | Fernandez | 345/175 |
| 4,860,379 A | 8/1989 | Schoenberger et al. | |
| 4,866,770 A | 9/1989 | Seth-Smith | |
| 4,868,866 A | 9/1989 | Williams, Jr. | |
| 4,876,736 A | 10/1989 | Klewit | |
| 4,885,803 A | 12/1989 | Hermann et al. | |
| 4,890,319 A | 12/1989 | Seth-Smith | |
| 4,890,321 A | 12/1989 | Seth-Smith | |
| 4,891,838 A | 1/1990 | Faber | |
| 4,899,292 A | 2/1990 | Montagna | |
| 4,920,432 A | 4/1990 | Eggers et al. | |
| 4,924,513 A | 5/1990 | Herbison et al. | |
| 4,928,168 A | 5/1990 | Iwashita | |
| 4,928,177 A | 5/1990 | Martinez | |
| 4,930,160 A | 5/1990 | Vogel | 725/30 |
| 4,941,125 A | 7/1990 | Boyne | |
| 4,947,244 A | 8/1990 | Fenwich et al. | |
| 4,947,429 A | 8/1990 | Bestler et al. | |
| 4,949,187 A | 8/1990 | Cohen | |
| 4,959,810 A | 9/1990 | Darbee et al. | |
| 4,961,109 A | 10/1990 | Tanaka | |
| 4,965,819 A | 10/1990 | Kannes | |
| 4,965,825 A | 10/1990 | Harvey et al. | |
| 4,975,951 A | 12/1990 | Bennett | |
| 4,977,455 A | 12/1990 | Young | |
| 4,982,344 A | 1/1991 | Jordan | |
| 4,985,697 A | 1/1991 | Boulton | 707/500.1 |
| D314,383 S | 2/1991 | Hafner | |
| 4,995,078 A | 2/1991 | Monslow et al. | |
| 4,996,597 A | 2/1991 | Duffield | |
| 5,001,554 A | 3/1991 | Johnson et al. | |
| 5,003,384 A | 3/1991 | Durden et al. | 725/104 |
| 5,003,591 A | 3/1991 | Kauffman et al. | |
| 5,010,499 A | 4/1991 | Yee | |
| 5,014,125 A | 5/1991 | Pococh et al. | 725/93 |
| 5,015,829 A | 5/1991 | Eilert et al. | |
| 5,020,129 A | 5/1991 | Martin et al. | |
| 5,027,400 A | 6/1991 | Baji et al. | |
| 5,036,394 A | 7/1991 | Morii | |
| 5,036,537 A | 7/1991 | Jeffers et al. | |
| 5,038,402 A | 8/1991 | Robbins | |
| 5,046,093 A | 9/1991 | Wachob | |
| 5,047,867 A | 9/1991 | Strubbe et al. | |
| 5,049,862 A | 9/1991 | Dao | |
| 5,049,990 A | 9/1991 | Kondo et al. | |
| 5,056,138 A | 10/1991 | Tyson, Sr. | |
| 5,057,917 A | 10/1991 | Shalkauser et al. | |
| 5,073,930 A | 12/1991 | Green et al. | |
| 5,075,771 A | 12/1991 | Hashimoto | |
| 5,077,607 A | 12/1991 | Johnson et al. | |
| 5,078,019 A | 1/1992 | Aoki | |
| 5,089,956 A | 2/1992 | MacPhail | |
| 5,091,782 A | 2/1992 | Krause et al. | |
| 5,093,718 A | 3/1992 | Hoarty et al. | 725/120 |
| 5,099,319 A | 3/1992 | Esch et al. | |
| 5,099,331 A | 3/1992 | Truong | |
| D325,581 S | 4/1992 | Schwartz | |
| 5,103,314 A | 4/1992 | Keenan | |
| 5,105,268 A | 4/1992 | Yamanouchi et al. | |
| D326,446 S | 5/1992 | Wong | |
| 5,115,426 A | 5/1992 | Spanke | |
| 5,121,476 A | 6/1992 | Yee | |
| 5,124,980 A | 6/1992 | Maki | |
| 5,128,662 A | 7/1992 | Failla | |
| 5,130,792 A | 7/1992 | Tindell et al. | |
| 5,130,924 A | 7/1992 | Barker et al. | |
| 5,132,789 A | 7/1992 | Ammon et al. | |
| 5,132,992 A | 7/1992 | Yurt et al. | |
| 5,133,079 A | 7/1992 | Ballantyne et al. | |
| 5,140,419 A | 8/1992 | Galumbeck et al. | |
| D329,238 S | 9/1992 | Grasso et al. | |
| 5,144,663 A | 9/1992 | Kudelski et al. | 380/230 |
| 5,144,665 A | 9/1992 | Takaragi et al. | |
| 5,146,552 A | 9/1992 | Cassorla et al. | |
| 5,150,118 A | 9/1992 | Finkle et al. | |
| 5,151,782 A | 9/1992 | Ferraro | |
| 5,151,789 A | 9/1992 | Young | |
| 5,152,011 A | 9/1992 | Schwob | |
| 5,155,590 A | 10/1992 | Beyers, II et al. | |
| 5,155,591 A | 10/1992 | Wachob | |
| 5,157,783 A | 10/1992 | Anderson | |
| 5,159,452 A | 10/1992 | Kinoshita et al. | |
| 5,159,669 A * | 10/1992 | Trigg et al. | 715/814 |
| 5,166,886 A | 11/1992 | Molnar et al. | |
| D331,760 S | 12/1992 | Renk, Jr. | |
| 5,172,413 A | 12/1992 | Bradley et al. | |
| 5,173,051 A | 12/1992 | May et al. | |
| 5,182,639 A | 1/1993 | Jutamulia et al. | |
| 5,185,667 A | 2/1993 | Zimmerman et al. | |
| 5,195,181 A | 3/1993 | Bryant et al. | |
| 5,199,104 A | 3/1993 | Hirayama | |
| 5,202,817 A | 4/1993 | Koenck et al. | |
| 5,204,947 A | 4/1993 | Bernstein et al. | |

| | | | | | | |
|---|---|---|---|---|---|---|
| 5,206,722 A | 4/1993 | Kwan | | 5,375,068 A | 12/1994 | Palmer et al. |
| 5,206,929 A | 4/1993 | Langford et al. ............ 345/723 | | 5,375,160 A | 12/1994 | Guidon et al. |
| 5,206,954 A | 4/1993 | Inoue et al. | | 5,379,057 A | 1/1995 | Clough et al. |
| 5,208,665 A | 5/1993 | McCalley et al. | | 5,383,112 A | 1/1995 | Clark |
| 5,208,745 A | 5/1993 | Quentin et al. | | 5,384,588 A | 1/1995 | Martin et al. |
| 5,210,611 A | 5/1993 | Yee et al. | | 5,388,101 A | 2/1995 | Dinkins |
| 5,212,553 A | 5/1993 | Maruoka | | 5,388,196 A * | 2/1995 | Pajak et al. .................... 715/751 |
| 5,216,515 A | 6/1993 | Steele et al. | | 5,390,348 A | 2/1995 | Magin et al. |
| 5,220,649 A | 6/1993 | Forcier | | 5,392,387 A | 2/1995 | Fitzpatrick |
| 5,221,962 A | 6/1993 | Backus et al. | | 5,396,546 A | 3/1995 | Remillard .................. 379/93.24 |
| 5,222,136 A | 6/1993 | Rasmussen et al. | | 5,400,401 A | 3/1995 | Wasilewski et al. |
| 5,223,924 A | 6/1993 | Strubbe | | 5,404,393 A | 4/1995 | Remillard .................. 379/93.25 |
| 5,231,631 A | 7/1993 | Buhrke | | 5,404,505 A | 4/1995 | Levison |
| 5,233,333 A | 8/1993 | Borsuk | | 5,407,357 A | 4/1995 | Cutler |
| 5,235,419 A | 8/1993 | Krause et al. | | 5,408,258 A | 4/1995 | Kolessar |
| 5,235,619 A | 8/1993 | Beyers et al. | | 5,408,465 A | 4/1995 | Guesella et al. |
| 5,235,680 A | 8/1993 | Bijnagte | | 5,410,326 A | 4/1995 | Goldstein |
| 5,237,311 A | 8/1993 | Mailey et al. | | 5,410,344 A | 4/1995 | Graves et al. |
| 5,237,610 A | 8/1993 | Gammie et al. | | 5,410,692 A | 4/1995 | Torres |
| 5,239,665 A | 8/1993 | Tsuchiya | | 5,412,416 A | 5/1995 | Nemirofsky |
| 5,241,671 A | 8/1993 | Reed et al. | | 5,414,426 A | 5/1995 | O'Donnell et al. |
| 5,247,347 A | 9/1993 | Litteral et al. | | 5,416,508 A | 5/1995 | Sakuma et al. |
| 5,247,575 A | 9/1993 | Sprague et al. | | 5,417,575 A | 5/1995 | McTaggart |
| 5,251,324 A | 10/1993 | McMullan | | 5,418,559 A | 5/1995 | Blahut |
| 5,253,066 A | 10/1993 | Vogel | | 5,418,957 A * | 5/1995 | Narayan ........................ 717/113 |
| 5,253,275 A | 10/1993 | Yurt et al. | | 5,420,474 A | 5/1995 | Morris et al. |
| 5,253,341 A | 10/1993 | Rozmanith et al. | | 5,420,974 A | 5/1995 | Morris et al. |
| 5,256,067 A | 10/1993 | Gildea | | 5,424,770 A | 6/1995 | Schmelzer et al. |
| 5,257,185 A * | 10/1993 | Farley et al. .................. 707/100 | | 5,425,102 A | 6/1995 | Moy |
| 5,260,778 A | 11/1993 | Kauffman et al. | | 5,426,594 A | 6/1995 | Wright et al. |
| 5,260,788 A | 11/1993 | Takano et al. | | 5,428,529 A | 6/1995 | Hartrick et al. |
| 5,262,875 A | 11/1993 | Mincer et al. | | 5,432,542 A | 7/1995 | Thibadeau et al. |
| 5,282,028 A | 1/1994 | Johnson et al. | | 5,432,561 A | 7/1995 | Strubbe |
| 5,283,639 A | 2/1994 | Esch et al. | | 5,437,552 A | 8/1995 | Baer et al. |
| 5,285,272 A | 2/1994 | Bradley et al. | | 5,438,372 A | 8/1995 | Tsumori et al. |
| 5,289,271 A | 2/1994 | Watson | | 5,440,632 A | 8/1995 | Bacon et al. |
| 5,289,288 A | 2/1994 | Silverman et al. | | 5,442,390 A | 8/1995 | Hooper et al. |
| 5,291,554 A | 3/1994 | Morales | | 5,442,626 A | 8/1995 | Wei |
| 5,293,540 A | 3/1994 | Trani et al. | | 5,444,853 A | 8/1995 | Lentz |
| 5,293,633 A | 3/1994 | Robbins | | 5,446,488 A | 8/1995 | Vogel |
| 5,301,172 A | 4/1994 | Richards et al. | | 5,446,490 A | 8/1995 | Blahut et al. .................... 725/97 |
| D346,620 S | 5/1994 | McSorley | | 5,446,919 A | 8/1995 | Wilkins |
| 5,315,711 A | 5/1994 | Barone et al. | | D362,429 S | 9/1995 | Lande et al. |
| 5,318,450 A | 6/1994 | Carver | | 5,453,796 A | 9/1995 | Duffield |
| 5,319,454 A | 6/1994 | Schutte | | 5,459,507 A | 10/1995 | Sakuma et al. |
| 5,319,455 A | 6/1994 | Hoarty et al. .................. 725/34 | | 5,461,667 A | 10/1995 | Remillard |
| 5,319,542 A | 6/1994 | King et al. | | 5,465,213 A | 11/1995 | Ross |
| 5,319,649 A | 6/1994 | Raghaven et al. | | 5,465,401 A | 11/1995 | Thompson |
| 5,319,707 A | 6/1994 | Wasilewski et al. | | 5,466,158 A | 11/1995 | Smith, III |
| 5,321,846 A | 6/1994 | Yokota et al. | | 5,467,102 A | 11/1995 | Kuno et al. |
| 5,323,240 A | 6/1994 | Amano et al. | | 5,469,206 A | 11/1995 | Strubbe et al. |
| 5,327,554 A | 7/1994 | Palazzi, III et al. | | 5,473,362 A | 12/1995 | Fitzgerald et al. |
| 5,329,590 A | 7/1994 | Pond | | 5,475,398 A | 12/1995 | Yamazaki et al. |
| D349,923 S | 8/1994 | Billings et al. | | 5,475,399 A | 12/1995 | Borsuk |
| 5,339,091 A | 8/1994 | Yamazaki et al. | | 5,475,585 A | 12/1995 | Bush |
| 5,339,239 A | 8/1994 | Manabe et al. | | 5,475,682 A | 12/1995 | Choudhury |
| 5,339,315 A | 8/1994 | Maeda et al. | | 5,477,262 A | 12/1995 | Bunker et al. .................... 725/38 |
| 5,341,166 A | 8/1994 | Garr et al. | | 5,477,263 A | 12/1995 | O'Callaghan et al. |
| 5,341,425 A | 8/1994 | Wasilewski et al. | | 5,479,268 A | 12/1995 | Young et al. .................... 386/83 |
| 5,341,426 A | 8/1994 | Barney et al. | | 5,479,508 A | 12/1995 | Bestler et al. |
| 5,341,474 A | 8/1994 | Gelman et al. | | 5,479,615 A | 12/1995 | Ishii et al. |
| 5,343,239 A | 8/1994 | Lappington et al. .......... 725/136 | | 5,481,294 A | 1/1996 | Thomas et al. |
| 5,343,516 A | 8/1994 | Callele et al. | | 5,481,296 A | 1/1996 | Cragum et al. ................ 725/136 |
| 5,345,580 A | 9/1994 | Tamaru et al. | | 5,481,542 A | 1/1996 | Logston |
| 5,345,594 A | 9/1994 | Tsuda | | 5,483,278 A | 1/1996 | Strubbe et al. |
| 5,349,638 A | 9/1994 | Pitroda et al. | | 5,484,292 A | 1/1996 | McTaggart |
| 5,351,075 A | 9/1994 | Herz et al. | | 5,485,176 A | 1/1996 | Ohara |
| 5,353,121 A | 10/1994 | Young et al. | | 5,485,221 A | 1/1996 | Banker et al. |
| 5,355,162 A | 10/1994 | Yazolino et al. | | 5,486,686 A | 1/1996 | Zdybel, Jr. et al. |
| 5,357,276 A | 10/1994 | Banker et al. | | 5,495,581 A | 2/1996 | Tsai |
| 5,365,265 A | 11/1994 | Shibata et al. | | 5,497,187 A | 3/1996 | Banker et al. |
| 5,365,434 A | 11/1994 | Figliuzzi | | 5,497,459 A | 3/1996 | Tanihira et al. |
| 5,367,330 A | 11/1994 | Haave et al. | | 5,499,330 A | 3/1996 | Lucas et al. |
| 5,367,571 A | 11/1994 | Bowen et al. | | 5,500,794 A | 3/1996 | Fujita et al. .................... 700/83 |
| 5,367,621 A | 11/1994 | Cohen et al. | | 5,502,576 A | 3/1996 | Ramsay et al. |
| 5,367,643 A | 11/1994 | Chang et al. | | 5,506,902 A | 4/1996 | Kubota |
| 5,371,532 A | 12/1994 | Gelman et al. | | 5,509,074 A | 4/1996 | Choudhury et al. |
| 5,372,507 A | 12/1994 | Goleh | | 5,512,934 A | 4/1996 | Kochanski |
| 5,373,324 A | 12/1994 | Kuroda et al. | | 5,515,098 A | 5/1996 | Carles |

| | | | | | | |
|---|---|---|---|---|---|---|
| 5,517,254 | A | 5/1996 | Monta et al. | 5,715,314 | A | 2/1998 | Payne et al. |
| 5,519,780 | A | 5/1996 | Woo et al. | 5,715,515 | A | 2/1998 | Akins, III |
| 5,521,631 | A | 5/1996 | Budow et al. | 5,721,832 | A | 2/1998 | Westrope et al. |
| 5,524,193 | A | 6/1996 | Covington et al. | 5,721,908 | A | 2/1998 | Lagarde et al. |
| 5,524,201 | A | 6/1996 | Shwarts et al. | 5,721,956 | A | 2/1998 | Martin et al. |
| 5,526,035 | A | 6/1996 | Lappington et al. | 5,722,418 | A | 3/1998 | Bro |
| 5,526,469 | A | 6/1996 | Brindle et al. | 5,724,091 | A | 3/1998 | Freeman et al. ............. 725/138 |
| 5,528,281 | A | 6/1996 | Grady et al. | 5,724,521 | A | 3/1998 | Dedrick |
| 5,528,490 | A | 6/1996 | Hill | 5,726,909 | A | 3/1998 | Krikorian |
| 5,530,235 | A | 6/1996 | Stefik | 5,727,065 | A | 3/1998 | Dillon |
| 5,531,227 | A | 7/1996 | Schneider | 5,734,719 | A | 3/1998 | Tsevdos et al. |
| 5,531,600 | A | 7/1996 | Baer | 5,734,823 | A | 3/1998 | Saigh et al. |
| 5,532,920 | A * | 7/1996 | Hartrick et al. ............... 715/234 | 5,734,891 | A | 3/1998 | Saigh |
| 5,534,888 | A | 7/1996 | Lebby et al. | 5,737,725 | A | 4/1998 | Case |
| 5,537,473 | A | 7/1996 | Saward | 5,737,747 | A | 4/1998 | Vishlitzky et al. |
| 5,538,430 | A | 7/1996 | Smith | 5,739,814 | A | 4/1998 | Ohara et al. |
| 5,544,320 | A | 8/1996 | Konrad | 5,740,549 | A | 4/1998 | Reily et al. |
| 5,544,342 | A | 8/1996 | Dean | 5,742,680 | A | 4/1998 | Wilson |
| 5,550,863 | A | 8/1996 | Yurt et al. | 5,745,711 | A | 4/1998 | Kitahara et al. |
| 5,553,216 | A * | 9/1996 | Yoshioka et al. ............. 715/210 | 5,748,441 | A | 5/1998 | Loritz et al. |
| 5,555,441 | A | 9/1996 | Haddad | 5,749,735 | A | 5/1998 | Redford |
| 5,557,722 | A | 9/1996 | DeRose et al. | 5,754,172 | A | 5/1998 | Kubota et al. |
| 5,557,744 | A | 9/1996 | Kobayakawa et al. | 5,758,257 | A | 5/1998 | Herz et al. |
| 5,561,708 | A | 10/1996 | Remillard | 5,760,771 | A | 6/1998 | Blonder |
| 5,561,803 | A | 10/1996 | Kilis | 5,761,468 | A | 6/1998 | Emberson |
| 5,564,043 | A | 10/1996 | Siefert | 5,761,485 | A | 6/1998 | Munyan ........................ 345/839 |
| 5,565,908 | A | 10/1996 | Ahmad | 5,761,606 | A | 6/1998 | Wolzien |
| 5,570,126 | A | 10/1996 | Blahut et al. .................... 725/93 | 5,761,681 | A * | 6/1998 | Huffman et al. ............. 715/500 |
| 5,572,625 | A | 11/1996 | Raman et al. | 5,764,276 | A | 6/1998 | Martin et al. |
| 5,572,652 | A | 11/1996 | Robusto et al. | 5,767,896 | A | 6/1998 | Nemirofsky |
| 5,579,055 | A | 11/1996 | Hamilton et al. | 5,768,521 | A | 6/1998 | Dedrick |
| 5,579,057 | A | 11/1996 | Banker et al. | 5,771,354 | A | 6/1998 | Crawford |
| 5,581,560 | A | 12/1996 | Shimada et al. | 5,774,109 | A | 6/1998 | Winksy et al. |
| 5,581,686 | A | 12/1996 | Koppolu et al. | 5,774,170 | A | 6/1998 | Hite et al. |
| 5,585,858 | A | 12/1996 | Harper et al. | 5,778,374 | A * | 7/1998 | Dang et al. .................... 707/101 |
| 5,586,235 | A | 12/1996 | Kauffman et al. | 5,784,565 | A | 7/1998 | Lewine |
| 5,587,724 | A | 12/1996 | Matsuda | 5,786,521 | A | 7/1998 | Darsow |
| 5,596,697 | A | 1/1997 | Foster et al. | 5,787,171 | A | 7/1998 | Kubota et al. |
| 5,598,209 | A | 1/1997 | Cortjens et al. | 5,787,254 | A | 7/1998 | Maddalozzo et al. |
| 5,598,279 | A | 1/1997 | Ishii | 5,788,504 | A * | 8/1998 | Rice et al. ..................... 434/219 |
| 5,598,351 | A | 1/1997 | Chater et al. | 5,790,176 | A | 8/1998 | Criag |
| 5,598,523 | A | 1/1997 | Fujita | 5,790,935 | A | 8/1998 | Payton |
| 5,600,368 | A | 2/1997 | Matthews, III ............... 348/143 | 5,793,414 | A | 8/1998 | Shaffer ........................ 725/133 |
| 5,600,573 | A | 2/1997 | Hendricks et al. | 5,796,954 | A | 8/1998 | Hanif |
| 5,602,596 | A | 2/1997 | Claussen et al. | 5,798,785 | A | 8/1998 | Hendricks et al. |
| 5,604,824 | A | 2/1997 | Chui et al. | 5,799,071 | A | 8/1998 | Azar et al. |
| 5,608,449 | A | 3/1997 | Swafford et al. | 5,799,157 | A | 8/1998 | Escallon ........................ 705/27 |
| 5,613,109 | A | 3/1997 | Yamauchi et al. | 5,802,465 | A | 9/1998 | Hamalainen et al. |
| 5,621,456 | A | 4/1997 | Florin et al. | 5,802,526 | A | 9/1998 | Fawcett et al. |
| 5,624,265 | A | 4/1997 | Redford et al. | 5,805,204 | A | 9/1998 | Thompson et al. ............. 725/48 |
| 5,625,833 | A | 4/1997 | Levine et al. | 5,815,662 | A | 9/1998 | Ong |
| 5,630,103 | A | 5/1997 | Smith et al. | 5,815,671 | A | 9/1998 | Morrison |
| 5,630,125 | A | 5/1997 | Zellweger | 5,819,301 | A | 10/1998 | Rowe et al. |
| 5,631,693 | A | 5/1997 | Wunderlich et al. | 5,835,732 | A | 11/1998 | Kikinis et al. |
| 5,631,694 | A | 5/1997 | Aggarwal et al. | 5,844,600 | A | 12/1998 | Kerr |
| 5,632,022 | A | 5/1997 | Warren et al. | 5,844,890 | A | 12/1998 | Delp et al. |
| 5,634,064 | A | 5/1997 | Warnock et al. | 5,850,218 | A | 12/1998 | LaJoie et al. |
| 5,635,918 | A | 6/1997 | Tett | 5,850,520 | A | 12/1998 | Griebenow et al. |
| 5,636,036 | A | 6/1997 | Ashbey | 5,850,629 | A | 12/1998 | Holm et al. |
| 5,638,443 | A | 6/1997 | Stefik | 5,859,594 | A | 1/1999 | King et al. |
| 5,640,193 | A | 6/1997 | Wellner | 5,862,325 | A | 1/1999 | Reed et al. |
| 5,640,196 | A | 6/1997 | Behrens et al. | 5,862,329 | A | 1/1999 | Aras et al. |
| 5,644,354 | A | 7/1997 | Thompson et al. ........... 725/138 | 5,870,717 | A | 2/1999 | Wiecha |
| 5,646,675 | A | 7/1997 | Copriviza et al. | 5,870,767 | A | 2/1999 | Kraft, IV |
| 5,649,230 | A | 7/1997 | Lentz | 5,877,755 | A | 3/1999 | Helhake |
| 5,657,414 | A | 8/1997 | Lett et al. | 5,877,801 | A | 3/1999 | Martin et al. |
| 5,661,516 | A | 8/1997 | Carles | 5,881,269 | A | 3/1999 | Dobbelstein |
| 5,663,748 | A | 9/1997 | Huffman | 5,884,288 | A | 3/1999 | Chang |
| 5,663,757 | A | 9/1997 | Morales ............. 725/5 | 5,890,122 | A | 3/1999 | Van Kleeck et al. |
| 5,666,493 | A | 9/1997 | Wojoik et al. | 5,890,177 | A * | 3/1999 | Moody et al. .................. 715/210 |
| 5,682,206 | A | 10/1997 | Wehmeyer et al. | 5,892,900 | A * | 4/1999 | Ginter et al. .................... 726/26 |
| 5,689,641 | A | 11/1997 | Ludwig et al. | 5,892,915 | A | 4/1999 | Duso et al. |
| 5,689,648 | A | 11/1997 | Diaz et al. | 5,893,109 | A * | 4/1999 | DeRose et al. ............. 707/104.1 |
| 5,689,663 | A | 11/1997 | Williams | 5,893,132 | A | 4/1999 | Huffman et al. |
| 5,696,906 | A | 12/1997 | Peters et al. | 5,898,852 | A | 4/1999 | Petolino et al. |
| 5,696,982 | A | 12/1997 | Tanigawa et al. | 5,903,319 | A | 5/1999 | Busko et al. |
| 5,697,793 | A | 12/1997 | Huffman et al. | 5,903,652 | A | 5/1999 | Mital |
| 5,708,960 | A | 1/1998 | Kamisaka | 5,903,901 | A | 5/1999 | Kawakura et al. |
| 5,710,887 | A | 1/1998 | Chelliah et al. | 5,906,397 | A | 5/1999 | MacWilliams |

| Patent Number | Date | Inventor | Ref |
|---|---|---|---|
| 5,914,706 A | 6/1999 | Kono | |
| 5,917,543 A | 6/1999 | Uehara | |
| 5,917,915 A | 6/1999 | Hirose | |
| 5,918,213 A | 6/1999 | Bernard et al. | |
| 5,923,656 A | 7/1999 | Duan | |
| 5,926,624 A | 7/1999 | Katz et al. | |
| 5,929,848 A | 7/1999 | Albukerk et al. | |
| 5,930,768 A | 7/1999 | Hooban | |
| 5,933,498 A | 8/1999 | Schneck et al. | |
| 5,937,162 A | 8/1999 | Funk et al. | |
| 5,940,073 A | 8/1999 | Klosterman et al. | |
| 5,956,034 A * | 9/1999 | Sachs et al. | 715/776 |
| 5,956,483 A | 9/1999 | Grate et al. | |
| 5,957,695 A | 9/1999 | Redford et al. | |
| 5,957,697 A | 9/1999 | Iggulden et al. | |
| 5,959,945 A | 9/1999 | Kleiman | |
| 5,963,246 A | 10/1999 | Kato | |
| 5,978,841 A | 11/1999 | Berger | |
| 5,986,677 A | 11/1999 | Jones et al. | |
| 5,986,690 A | 11/1999 | Hendricks | 725/60 |
| 5,990,927 A | 11/1999 | Hendricks et al. | |
| 5,991,594 A | 11/1999 | Froeber | |
| 5,999,214 A | 12/1999 | Inagaki | |
| 6,009,401 A | 12/1999 | Horstmann | |
| 6,012,890 A | 1/2000 | Celorio | |
| 6,014,184 A | 1/2000 | Knee et al. | |
| 6,016,484 A | 1/2000 | Williams et al. | |
| 6,025,837 A | 2/2000 | Matthews, III et al. | |
| 6,025,871 A | 2/2000 | Kantor et al. | |
| 6,029,045 A | 2/2000 | Picco et al. | |
| 6,029,141 A | 2/2000 | Bezos et al. | |
| 6,029,176 A | 2/2000 | Cannon | |
| 6,034,680 A | 3/2000 | Kessenich | 345/733 |
| 6,044,385 A | 3/2000 | Gross et al. | |
| 6,052,717 A | 4/2000 | Reynolds et al. | 709/218 |
| 6,055,544 A | 4/2000 | DeRose et al. | |
| 6,061,504 A | 5/2000 | Tzelnic et al. | |
| 6,072,463 A | 6/2000 | Glaser | |
| 6,091,823 A | 7/2000 | Hosomi et al. | |
| 6,091,930 A | 7/2000 | Mortimer et al. | |
| 6,101,485 A | 8/2000 | Fortenberry et al. | |
| 6,112,049 A | 8/2000 | Sonnenfeld | |
| 6,115,040 A | 9/2000 | Bladow et al. | |
| 6,115,482 A | 9/2000 | Sears et al. | |
| 6,161,093 A | 12/2000 | Watari et al. | |
| 6,163,796 A | 12/2000 | Yokomizo | |
| 6,167,435 A | 12/2000 | Druckenmiller et al. | |
| 6,173,335 B1 | 1/2001 | Culbert | |
| 6,177,936 B1 | 1/2001 | Cragun | |
| 6,195,667 B1 * | 2/2001 | Duga et al. | 715/513 |
| 6,204,885 B1 | 3/2001 | Kwoh | 348/564 |
| 6,229,694 B1 | 5/2001 | Kono | |
| 6,243,071 B1 | 6/2001 | Shwarts et al. | |
| 6,249,785 B1 * | 6/2001 | Paepke | 707/5 |
| 6,252,876 B1 | 6/2001 | Brueckheimer | |
| 6,252,879 B1 | 6/2001 | Zhang | |
| 6,260,024 B1 | 7/2001 | Shkedy | |
| 6,269,483 B1 | 7/2001 | Broussard | |
| 6,279,017 B1 * | 8/2001 | Walker | 715/529 |
| 6,281,986 B1 | 8/2001 | Form | |
| 6,295,542 B1 * | 9/2001 | Corbin | 715/501.1 |
| 6,298,441 B1 * | 10/2001 | Handelman et al. | 713/185 |
| 6,301,584 B1 | 10/2001 | Ranger | |
| 6,313,828 B1 | 11/2001 | Chombo | |
| 6,314,474 B1 | 11/2001 | Walter et al. | |
| 6,320,591 B1 | 11/2001 | Briencewic | |
| 6,331,865 B1 * | 12/2001 | Sachs et al. | 715/776 |
| 6,331,867 B1 | 12/2001 | Eberhard et al. | |
| 6,334,109 B1 | 12/2001 | Kanevsky et al. | |
| 6,335,678 B1 | 1/2002 | Heutschi | |
| 6,339,842 B1 | 1/2002 | Sunga Fernandez et al. | |
| 6,344,853 B1 | 2/2002 | Knight | |
| 6,351,750 B1 * | 2/2002 | Duga et al. | 707/102 |
| 6,363,418 B1 * | 3/2002 | Conboy et al. | 709/218 |
| 6,385,614 B1 | 5/2002 | Vellandi | |
| 6,411,973 B1 | 6/2002 | Yianilos | |
| 6,415,316 B1 * | 7/2002 | Van Der Meer | 709/203 |
| 6,418,214 B1 | 7/2002 | Smythe et al. | |
| 6,438,233 B1 * | 8/2002 | Yoshimune et al. | 380/241 |
| 6,452,614 B1 | 9/2002 | King et al. | |
| 6,452,933 B1 | 9/2002 | Duffield et al. | |
| 6,460,036 B1 | 10/2002 | Herz | |
| 6,462,729 B2 | 10/2002 | Morita | |
| 6,486,895 B1 | 11/2002 | Robertson | |
| 6,493,734 B1 | 12/2002 | Sachs et al. | |
| 6,507,342 B1 | 1/2003 | Hirayama | |
| 6,510,531 B1 | 1/2003 | Gibbons | |
| 6,535,505 B1 | 3/2003 | Hwang et al. | |
| 6,546,016 B1 | 4/2003 | Gerszberg et al. | |
| 6,556,561 B1 | 4/2003 | Himbeault et al. | |
| 6,557,173 B1 | 4/2003 | Hendricks | |
| 6,585,776 B1 | 7/2003 | Bates et al. | |
| 6,597,314 B1 | 7/2003 | Beezer | |
| 6,606,603 B1 | 8/2003 | Joseph | |
| 6,611,531 B1 | 8/2003 | Chen et al. | |
| 6,634,028 B2 | 10/2003 | Handelman | |
| 6,654,754 B1 * | 11/2003 | Knauft et al. | 707/100 |
| 6,657,654 B2 | 12/2003 | Narayanaswami | |
| 6,675,384 B1 * | 1/2004 | Block et al. | 725/28 |
| 6,683,631 B2 * | 1/2004 | Carroll | 715/821 |
| 6,714,238 B2 | 3/2004 | Urisaka et al. | |
| 6,725,203 B1 | 4/2004 | Seet et al. | |
| 6,813,249 B1 | 11/2004 | Lauffenburger et al. | |
| 6,847,403 B1 | 1/2005 | Forsberg, Jr. et al. | |
| 6,886,000 B1 | 4/2005 | Aggarwal et al. | |
| 6,891,551 B2 * | 5/2005 | Keely et al. | 715/762 |
| 6,976,028 B2 | 12/2005 | Fenton | |
| 6,990,464 B1 | 1/2006 | Pirillo | |
| 7,020,663 B2 | 3/2006 | Hay | |
| 7,039,643 B2 | 5/2006 | Sena et al. | |
| 7,051,351 B2 | 5/2006 | Goldman et al. | |
| 7,181,468 B2 | 2/2007 | Spring | |
| 7,181,692 B2 | 2/2007 | Siegel | |
| 7,185,274 B1 | 2/2007 | Rubin et al. | |
| 7,283,129 B1 * | 10/2007 | Sawada et al. | 345/204 |
| 7,350,704 B2 | 4/2008 | Barsness | |
| 7,401,286 B1 | 7/2008 | Hendricks et al. | |
| 2001/0011238 A1 | 8/2001 | Eberhard et al. | |
| 2002/0034296 A1 | 3/2002 | Yoshimune | |
| 2002/0087555 A1 | 7/2002 | Murata | |
| 2002/0120635 A1 | 8/2002 | Joao | |
| 2003/0018543 A1 | 1/2003 | Alger et al. | |
| 2003/0093336 A1 | 5/2003 | Ukita et al. | |
| 2003/0093382 A1 | 5/2003 | Himeno et al. | |
| 2003/0124502 A1 | 7/2003 | Chou | |
| 2003/0198932 A1 | 10/2003 | Stuppy | |
| 2003/0200145 A1 | 10/2003 | Krassner et al. | |
| 2003/0236836 A1 | 12/2003 | Borthwick | |
| 2004/0039934 A1 | 2/2004 | Land et al. | |
| 2004/0201609 A1 | 10/2004 | Obrador | |
| 2004/0215658 A1 | 10/2004 | Carnegie et al. | |
| 2004/0219494 A1 | 11/2004 | Boon | |
| 2004/0268224 A1 | 12/2004 | Balkus et al. | |
| 2005/0144133 A1 | 6/2005 | Hoffman | |
| 2006/0204942 A1 | 9/2006 | Kimball | |
| 2006/0259239 A1 | 11/2006 | Nouri | |
| 2007/0016657 A1 | 1/2007 | Ito | |
| 2008/0229182 A1 | 9/2008 | Hendricks et al. | |
| 2009/0216623 A1 | 8/2009 | Hendricks et al. | |

FOREIGN PATENT DOCUMENTS

| | | |
|---|---|---|
| CA | 2257659 | 11/1993 |
| CA | 2177154 | 6/1995 |
| CA | 2458564 | 6/1995 |
| CA | 2256591 | 11/1997 |
| CA | 2458346 | 5/2004 |
| CA | 2458564 | 5/2004 |
| CA | 2459528 | 10/2004 |
| CA | 2458337 | 12/2004 |
| CA | 2458564 | 12/2004 |
| CA | 2458346 | 4/2005 |
| CA | 2458355 | 11/2005 |
| CA | 2458337 | 12/2005 |
| CA | 2458317 | 3/2006 |
| CA | 2459063 | 3/2006 |
| CA | 2361371 | 7/2006 |
| CA | 2458258 | 10/2006 |
| CA | 2459048 | 10/2006 |

| | | | | | | |
|---|---|---|---|---|---|---|
| CA | 2458317 | 11/2006 | | EP | 0570785 | 11/1993 |
| CA | 2458355 | 11/2006 | | EP | 09322877 | 11/1993 |
| CA | 2459063 | 12/2006 | | EP | 0586954 | 3/1994 |
| CA | 2458337 | 1/2007 | | EP | 0620689 | 10/1994 |
| CA | 2459059 | 5/2007 | | EP | 0646856 | 4/1995 |
| CA | 2458379 | 6/2007 | | EP | 0690426 | 1/1996 |
| CA | 2459048 | 6/2007 | | EP | 0702491 | 3/1996 |
| CA | 2459529 | 6/2007 | | EP | 0372384 | 5/1997 |
| CA | 2361371 | 10/2007 | | EP | 0810534 A | 12/1997 |
| CA | 2458307 | 10/2007 | | EP | 0810534 A2 | 12/1997 |
| CA | 2458355 | 11/2007 | | EP | 0838798 | 4/1998 |
| CA | 2459779 | 11/2007 | | EP | 0838798 A1 | 4/1998 |
| CA | 2459780 | 11/2007 | | EP | 95904787.9 | 5/1998 |
| CA | 2459059 | 3/2008 | | EP | 0892388 | 1/1999 |
| CA | 2458317 | 5/2008 | | EP | 0924629 A | 6/1999 |
| CA | 2459063 | 5/2008 | | EP | 0924687 | 6/1999 |
| CA | 2359690 | 9/2008 | | EP | 0701220 | 7/2001 |
| CA | 2459779 | 1/2009 | | EP | 0726535 | 5/2003 |
| CA | 2459780 | 1/2009 | | EP | 00968375.6 | 3/2004 |
| CA | 2385097 | 2/2009 | | EP | 00909958.1 | 5/2004 |
| CA | 2458307 | 2/2009 | | EP | 00974003.6 | 7/2004 |
| CA | 2361371 | 4/2009 | | EP | 00974006.9 | 7/2004 |
| CA | 2369779 | 4/2009 | | EP | 00923211.7 | 5/2005 |
| CA | 2459059 | 4/2009 | | EP | 00923210.9 | 6/2005 |
| CA | 2388648 | 8/2009 | | EP | 00909958.1 | 7/2005 |
| CA | 2388649 | 8/2009 | | EP | 00968375.6 | 7/2005 |
| CA | 2377405 | 9/2009 | | EP | 00909966.4 | 6/2006 |
| CA | 2459780 | 9/2009 | | EP | 00974003.6 | 6/2006 |
| CA | 2458345 | 11/2009 | | EP | 00909958.1 | 9/2006 |
| CA | 2369759 | 12/2009 | | EP | 00909958.1 | 10/2006 |
| CA | 2371379 | 12/2009 | | EP | 00943086.9 | 12/2006 |
| CA | 2458307 | 12/2009 | | EP | 00925915.1 | 4/2007 |
| CA | 2459779 | 12/2009 | | EP | 00960077.6 | 10/2007 |
| CA | 2382650 | 1/2010 | | EP | 00941287.5 | 2/2010 |
| CA | 2359690 | 7/2010 | | GB | 1204190 | 9/1970 |
| CA | 2369779 | 7/2010 | | GB | 2149544 | 6/1985 |
| CA | 2388648 | 7/2010 | | GB | 2149544 A | 12/1985 |
| CA | 2382650 | 9/2010 | | GB | 2168227 | 6/1986 |
| CA | 2361371 | 11/2010 | | GB | 2 177 873 A | 1/1987 |
| CA | 2385097 | 11/2010 | | GB | 2269302 A | 2/1994 |
| CA | 2371379 | 1/2011 | | GB | 2344009 | 5/2000 |
| DE | 3423846 | 1/1986 | | JP | 060-143086 | 7/1985 |
| DE | 3935294 | 4/1991 | | JP | 61-028150 | 2/1986 |
| DE | 42 12 184 | 10/1993 | | JP | 061060150 | 3/1986 |
| EP | 0103438 | 3/1984 | | JP | 62-24777 | 2/1987 |
| EP | 140302 | 5/1985 | | JP | 62-140134 | 6/1987 |
| EP | 0145063 | 6/1985 | | JP | 62-245167 | 10/1987 |
| EP | 0149536 | 7/1985 | | JP | 64-086778 | 3/1989 |
| EP | 0158548 | 10/1985 | | JP | 01-130683 | 5/1989 |
| EP | 0158767 | 10/1985 | | JP | 01-142918 | 6/1989 |
| EP | 0167237 | 1/1986 | | JP | 64-007786 | 11/1989 |
| EP | 0243312 | 10/1987 | | JP | 02-284571 | 11/1990 |
| EP | 0277014 | 8/1988 | | JP | 03-114375 | 5/1991 |
| EP | 0281293 | 9/1988 | | JP | 03-198119 | 8/1991 |
| EP | 0299830 | 1/1989 | | JP | 03225445 | 10/1991 |
| EP | 0299830 A1 | 1/1989 | | JP | 04-170183 | 6/1992 |
| EP | 0314572 | 5/1989 | | JP | 05-046045 | 2/1993 |
| EP | 0328440 | 8/1989 | | JP | 05056405 | 3/1993 |
| EP | 0340643 | 11/1989 | | JP | 05-236437 | 9/1993 |
| EP | 0355 697 | 2/1990 | | JP | 05233547 | 9/1993 |
| EP | 0377334 | 7/1990 | | JP | 05236437 | 9/1993 |
| EP | 0384986 | 9/1990 | | JP | 05250106 | 9/1993 |
| EP | 0396186 | 11/1990 | | JP | 05-334167 A | 12/1993 |
| EP | 0399200 | 11/1990 | | JP | 05334167 A | 12/1993 |
| EP | 0402 809 | 12/1990 | | JP | 06-068339 A | 3/1994 |
| EP | 0420 123 | 4/1991 | | JP | 06068339 A | 3/1994 |
| EP | 0420123 A2 | 4/1991 | | JP | 06134489 | 5/1994 |
| EP | 0187 961 | 5/1991 | | JP | 06187359 | 7/1994 |
| EP | 0424 648 | 5/1991 | | JP | 07135594 | 5/1995 |
| EP | 0425 834 | 5/1991 | | JP | 07-230466 A | 8/1995 |
| EP | 0450841 | 10/1991 | | JP | 7230466 | 8/1995 |
| EP | 0472070 | 2/1992 | | JP | 07-235909 | 9/1995 |
| EP | 0472070 A2 | 2/1992 | | JP | 08-008850 A | 1/1996 |
| EP | 0506 435 | 9/1992 | | JP | 08008851 | 1/1996 |
| EP | 0513 763 | 11/1992 | | JP | 08-051614 A | 2/1996 |
| EP | 0516533 | 12/1992 | | JP | 08137913 | 5/1996 |
| EP | 0539106 | 4/1993 | | JP | 08214074 | 8/1996 |
| EP | 0539106 A2 | 4/1993 | | JP | 08215158 | 8/1996 |
| EP | 0567800 | 11/1993 | | JP | 08-228328 | 9/1996 |

| | | | | | | |
|---|---|---|---|---|---|---|
| JP | 08314790 | 11/1996 | | WO | WO 9100670 | 1/1991 |
| JP | 08510869 | 11/1996 | | WO | WO 91/03112 | 3/1991 |
| JP | 09081475 | 3/1997 | | WO | WO 91/11769 | 8/1991 |
| JP | 09101971 | 4/1997 | | WO | WO 91/15841 | 10/1991 |
| JP | 09506225 | 6/1997 | | WO | WO 92/10040 | 6/1992 |
| JP | 09-227193 | 9/1997 | | WO | WO 92/11713 | 7/1992 |
| JP | 09237096 | 9/1997 | | WO | WO 92/12599 | 7/1992 |
| JP | 09-284571 | 10/1997 | | WO | WO 92/17027 | 10/1992 |
| JP | 09282218 | 10/1997 | | WO | WO 92/21206 | 11/1992 |
| JP | 09511350 | 11/1997 | | WO | WO 93/06692 | 4/1993 |
| JP | 09330354 | 12/1997 | | WO | WO9307713 | 4/1993 |
| JP | 09330360 | 12/1997 | | WO | WO 93/09490 | 5/1993 |
| JP | 10070530 | 3/1998 | | WO | WO 93/09631 | 5/1993 |
| JP | 10134080 | 5/1998 | | WO | WO93/15466 | 8/1993 |
| JP | 10207945 | 8/1998 | | WO | WO 93/22877 | 11/1993 |
| JP | 10240830 | 9/1998 | | WO | WO 94/01964 | 1/1994 |
| JP | 10-285568 A | 10/1998 | | WO | WO 94/07327 A1 | 3/1994 |
| JP | 10275186 | 10/1998 | | WO | WO 94/13107 | 6/1994 |
| JP | 10301946 | 11/1998 | | WO | WO 94/14282 | 6/1994 |
| JP | 10312344 | 11/1998 | | WO | WO 94/16527 | 7/1994 |
| JP | 10327397 | 12/1998 | | WO | WO 94/23537 | 10/1994 |
| JP | 11003341 | 1/1999 | | WO | WO 95/15649 | 6/1995 |
| JP | 11-068770 | 3/1999 | | WO | WO 9515649 A | 6/1995 |
| JP | 11084999 | 3/1999 | | WO | WO 96/08109 | 3/1996 |
| JP | 11096175 | 4/1999 | | WO | WO 96/17306 | 6/1996 |
| JP | 11-143954 | 5/1999 | | WO | WO 96/25006 | 8/1996 |
| JP | 11143719 | 5/1999 | | WO | WO 96/41473 | 12/1996 |
| JP | 11250145 | 9/1999 | | WO | WO 97/13368 | 4/1997 |
| JP | 2000-501214 | 2/2000 | | WO | WO 97/18665 | 5/1997 |
| JP | 2000-507728 | 6/2000 | | WO | WO 97/12105 | 6/1997 |
| JP | 2002-512708 | 4/2002 | | WO | WO 97/20224 | 6/1997 |
| JP | 515760/95 | 4/2004 | | WO | WO 97/20274 | 6/1997 |
| JP | 515760/95 | 12/2004 | | WO | WO 97/22049 | 6/1997 |
| JP | 2000-596729 | 8/2009 | | WO | WO 97/22062 | 6/1997 |
| JP | 2000-611178 | 10/2009 | | WO | WO 97/22063 | 6/1997 |
| JP | 2000-611222 | 1/2010 | | WO | WO 97/22064 | 6/1997 |
| JP | 2000-611223 | 1/2010 | | WO | WO 97/22065 | 6/1997 |
| JP | 2000-596729 | 3/2010 | | WO | WO 97/22067 | 6/1997 |
| JP | 2001-525893 | 4/2010 | | WO | WO 97/22079 | 6/1997 |
| JP | 2000-611178 | 5/2010 | | WO | WO 97/22080 | 6/1997 |
| JP | 2001-506518 | 5/2010 | | WO | WO 97/22097 | 6/1997 |
| JP | 2001-502044 | 6/2010 | | WO | WO 97/22099 | 6/1997 |
| JP | 2001-522408 | 6/2010 | | WO | WO 97/22100 | 6/1997 |
| JP | 2001-533556 | 7/2010 | | WO | WO 97/22101 | 6/1997 |
| JP | 2001-539201 | 8/2010 | | WO | WO 97/22102 | 6/1997 |
| JP | 2000-596729 | 11/2010 | | WO | WO 97/22103 | 6/1997 |
| JP | 2001-525893 | 12/2010 | | WO | WO 97/22104 | 6/1997 |
| MX | 2001/010300 | 9/2004 | | WO | WO 97/22105 | 6/1997 |
| MX | 2001/010298 | 4/2005 | | WO | WO 97/22106 | 6/1997 |
| MX | 2001/007581 | 7/2006 | | WO | WO 97/22107 | 6/1997 |
| MX | 2001/010298 | 11/2006 | | WO | WO 97/22108 | 6/1997 |
| MX | 2002/002555 | 1/2007 | | WO | WO 97/22109 | 6/1997 |
| MX | 2002/000197 | 2/2007 | | WO | WO 97/22110 | 6/1997 |
| MX | 2002/002984 | 3/2007 | | WO | WO 97/22111 | 6/1997 |
| MX | 2001/007580 | 2/2008 | | WO | WO 97/22112 | 6/1997 |
| MX | 2001/007580 | 6/2008 | | WO | WO9720274 | 6/1997 |
| MX | 2001/010300 | 6/2008 | | WO | WO 97/12819 | 7/1997 |
| MX | 2001/010298 | 9/2008 | | WO | WO 97/23819 | 7/1997 |
| MX | 2002/002555 | 9/2008 | | WO | WO9737344 | 10/1997 |
| MX | 2001/010300 | 11/2008 | | WO | WO 97/41688 A1 | 11/1997 |
| MX | 2001/007580 | 3/2009 | | WO | WO 97/45798 | 12/1997 |
| MX | 2001/007581 | 3/2009 | | WO | WO 98/02836 | 1/1998 |
| MX | 2001/007580 | 6/2010 | | WO | WO 98/08344 | 2/1998 |
| TW | 234223 | 11/1994 | | WO | WO9808344 | 2/1998 |
| TW | 235358 | 12/1994 | | WO | WO 9808344 A | 2/1998 |
| TW | 235359 | 12/1994 | | WO | WO 9821679 | 2/1998 |
| TW | 236065 | 12/1994 | | WO | WO 98/18086 | 4/1998 |
| TW | 236744 | 12/1994 | | WO | WO 9818086 | 4/1998 |
| TW | 238461 | 1/1995 | | WO | WO9827494 | 6/1998 |
| WO | WO 80/00209 | 2/1980 | | WO | WO 98/48566 | 10/1998 |
| WO | WO 83/03020 | 9/1983 | | WO | WO 98/53581 | 11/1998 |
| WO | WO 84/00237 | 1/1984 | | WO | WO 99/12349 | 3/1999 |
| WO | WO 86/01962 | 3/1986 | | WO | WO 99/18701 A1 | 4/1999 |
| WO | WO 87/01481 | 3/1987 | | WO | WO 99/26415 | 5/1999 |
| WO | WO 88/01463 | 2/1988 | | WO | WO 99/44144 | 9/1999 |
| WO | WO 8809985 | 12/1988 | | WO | WO 99/45491 | 9/1999 |
| WO | WO 89/09528 | 10/1989 | | WO | WO 9944144 A | 9/1999 |
| WO | WO 89/12370 | 12/1989 | | WO | WO 99/52285 | 10/1999 |
| WO | WO 90/10988 | 9/1990 | | WO | WO 99/66719 | 12/1999 |

| | | | |
|---|---|---|---|
| WO | WO 00/62228 A3 | 10/2000 | |
| WO | WO 01/18665 A1 | 3/2001 | |
| WO | WO 01/18665 A1 | 3/2001 | |
| WO | WO 2007/022107 | 2/2007 | |

OTHER PUBLICATIONS

Speech Technology; Electronic Dictionary Pronounces over 83,000 Words; May 1989; pp. 78-79.
Pasquier-Boltuck, et al. Protoyping an Interactive Electronic Book System Using an Object-Oriented Approach; Aug. 1988; p. 177-190.
Boyle, et al.; A Survey and Classification of Hypertext Documentation Systems; 1992; pp. 90-111.
Bogdan Czejdo; Using an ER Query and Update Interface for Rapid Prototyping of Hypertext Systems; Feb. 1990; pp. 227-236.
Bestler, et al.; Flexible Data Structures and Interface Rituals for Rapid Development of OSD Applications; Jun. 1993; pp. 223-226.
Bieber, et al.; Fourth Generation Hypermedia: some missing links for the world wide web; Jul. 1997; pp. 31-65.
Yankelovich, et al; Reading and Writing the Electronic Book; Oct. 1985; pp. 15-30.
Gelman, et al.; An Architecture for Interactive Applications; 1993; pp. 848-852.
Henrie van den Boom; An Interactive Videotex System for Two-Way CATV Networks; 1986; pp. 397-401.
Technology Update, Wordperfect Corporation Introduces Wordperfect 6.0 for DOS, http://www.nfbnet.org/files/word_processing/WP60.TXT, Mar. 24, 1993.
T.V. Raman, "An Audio View of (LA)Tex Documents," Proceedings of the 1191 Annual Meeting, pp. 1001-1008.
Microsoft Press Computer Dictionary Second Edition, Microsoft Press. 1994, p. 418.
Seno, H. et al., "A Consideration of Data Transmission Method for Enhanced Teletext", NHK Science and Technical Research Laboratories, ITEJ Technical Report, vol. 16, No. 71, Oct. 1992, Japan, pp. 1-6.
Antelman et al. "Collection Development in the Electronic Library," Proceedings of the 21rst annual ACM SIGUCCS Conference on User Services, San Diego, CA, p. 50-56, 1993.
"BSD Kernel Interfaces Manual-PTY(4)", Mac OS X Man Pages, original publication, Nov. 30, 1993.
Sandrick, Karen, "Internet marketing: Software for the hard sell," Health Management Technology, Oct. 1998, vol. 19, No. 11, 6 pages.
Proceedings of the Symnposium on Optical Character Recognition, Washington, D.C., 1962, Edited by Fisher, George, et al., 6 pages.
Rethinking Ink, Science News, Jun. 20, 1998, 4 pages.
Computer Organization and Design, Patterson, David, and John Hennessay, 1998, 4 pages.
Systems, Boyle, C. et al.; *IEEE Transactions on Professional Communication*; IEEE Inc.; New York; vol. 35, No. 2; Jun. 1, 1992, pp. 98-111.
"An Interactive Lesson in the Interactive Course Series" Waite Group Press, MacMillan Computer Publishing, "Online! 1996, XP00082591, Retrieved from the Internet: <URL:http//www.waite.com/> retrieved in 1996.
"Electronic Dictionary Pronounces over 83,000 Words," Goorfin, L., *Speech Technology*, Man-Machine Voice Communications, U.S., Media Dimensions Inc.; New York, vol. 4, No. 4; Apr. 1, 1989, pp. 78-79.
"Enabling the book metaphor for the World-Wide-Web: disseminating on-line information as dynamic Web documents," Rauch, T. et al.; *IEEE Transactions on Professional Communications*, Jun. 1997; vol. 40, No. 2, pp. 111-128.
"Fourth generation hypermedia: some missing links for the World Wide Web," Bieber, M. et al., *International Journal of Human-Computer Studies*; U.S.; Academic Press: New York; vol. 47, No. 1; Jul. 1997; pp. 31-65.
"A Dynamic Policy of Segment Replication for Load-Balancing in Video-On-Demand Servers," Dan, A. et al.; Multimedia Systems, vol. 3, No. 3, Jul. 1995, pp. 93-103.
"Prototyping an Interactive Electronic Book System Using an Object-oriented Approach," Pasquier-Boltuck, J. et al.; *ECOOP*; European Conference on Object-oriented Programming; Aug. 15, 1988; pp. 177-190.

"Reading and Writing the Electronic Book," Yankelovich, N. et al., *Computer*; U.S. IEEE Computer Society, Long Beach, Calif., U.S. vol. 18, No. 10, Oct. 1, 1985, pp. 15-30.
"Subscription Teletext for Value Added Services", Dr. G.T. Sharpless, IEEE Transactions on Consumer Electronics, Aug. 1985, vol. CE-31, No. 3, pp. 283-289.
"The Internet bookstore opens for business", Medford: Jul./Aug. 1994. vol. 11, Iss. 4; p. 21 (1 page).
"Using an ER Query and Update Interface for Rapid Prototyping of Hypertext Systems," Czejdo, B.; Proceedings of the Annual Hawaii International Conference on System Sciences; Jan. 1, 1990, pp. 227-236.
"A Store-and-Forward Architecture for Video-on-Demand Service," Gelman, A.D. et al., ICC Conference, 1991, pp. 842-846.
Dinaro, M. et al., "Markets and Products Overview," Revue HF Tijdschrift, 1991, vol. 15, No. 3/4, pp. 135-148.
Alexander Gelman, et al., "An Architecture for Interactive Applications", May 1993, pp. 848-852.
Boom, H., "An Interactive Videotex System for Two-Way CATV Networks," 1986, vol. 40, No. 6, pp. 397-401.
"*Applied Cryptography Protocols, Algorithms, and Source Code in C*," Schneier, Bruce; 1996 by John Wiley & Sons, pp. 34-44.
Azuma J., "Creating Educational Web Sites", IEE Communications Magazine, U.S. IEEE Service Center, Piscataway, N.J., vol. 37, No. 3, Mar. 1999, pp. 109-113.
Barnes, 10 Minute Guide to Windows 3.1., Alpha Books, 1992, pp. 60-64.
Basch, Reva, "Books Online: Visions, Plans, and Perspectives for Electronic Text", Online, Medford: Jul. 1991, vol. 15, Iss. 4; pp. 13-23.
Bestler, C., "Flexible Data Structure and Interface Rituals for Rapid Development of OSD Applications", NCTA Technical Papers, pp. 223-236, Jun. 1993.
Broering, N. C., "The Electronic Library and IAIMS at Georgetown University", Policy Issues in Information and Communication Techniques in Medical Applications, 1988. Symposium Record, Sep. 29-30, 1988, pp. 27-29.
Chan, L. M., "Principles, Structure and Format", Immroth's Guide To the Library of Congress Classification, 4th Edition, 1990, Chapter 2, pp. 19-51.
Consumer Digest advertisement; "Xpand Your TV's Channel Capability;" Fall/Winter 1992; p. 215.
Daniel M. Moloney, "Digital Compression in Today's Addressable Environment;" 1993 NCTA Technical Papers; Jun. 6, 1993; pp. 308-316.
DeBuse, R., "So That's a Book . . . Advancing Technology and the Library," Mar. 1988, Information Technology and Libraries, vol. 7, Issue 1, pp. 7-18.
Endo, K. et al., "Electronic Book in 3.5" Floppy Disk", Consumer Electronics, Digest of Technical Papers, IEEE 1994 International Conference on Jun. 21-23, 1994 pp. 316-317.
Fox E. A., et al., "Users, user interfaces, and objects: Envision, a Digital Library," Sep. 1993, Journal of the American Society for Information Science, vol. 44, issue 8, p. 480-491.
Schepers, C., "Für Geschlossene Benutzergruppen" Funkschau, DE, Franzis-Verlag K.G. Munchen, No. 18, Aug. 25, 1989, pp. S53-S54.
Goldberg M W et al: "World Wide Web—course tool: An environment for building www-based courses," Computer Networks and ISDN Systems, NL, North Holland Publishing. Amsterdam, vol. 28, No. 11, May 1, 1996.
Great Presentations advertisement; "Remote, Remote;" 1987; p. 32H.
Hartley S et al.: "Enhancing Teaching Using the Internet" SIGCSE/SIGCUE Conference on Integrating Technology into Computer Science Education, US, New York, ACM, vol. Conf. 1, Jun. 2, 1996, pp. 218-228.
Herron T L: "Teaching with the Internet" Internet and Higher Education, US, Jai Press, Stamford, CT, vol. 1, No. 3, 1998, pp. 217-222.
Hong Kong Enterprise; Advertisement, "Two Innovative New Consumer Products From SVI," Nov. 1988, p. 379.
HP-41 C Operating Manual—A Guide for the Experienced User, Hewlett Packard Co., Jun. 1980.

"Applying Interactive Voice Response Technology in Psychiatric Practice", Sorce J. F. et al., Human Factors in Telecommunications; R. V. Decker's Verlag, Heidelberg, Germany, pp. 397-407.
Indian Patent Application 762-Cal-93.
Indian Patent Application 765-Cal-93.
Intner, S. S. et al., "The Dewey Decimal Classification", Special Libraries: A Cataloging Guide, 1998, Chapter 11, pp. 211-239.
John Reimer, "Memories in My Pocket;" BYTE; Feb. 1991; pp. 251-258.
Kubota H. et al.: "Terrestrial Data Multiplex Broadcasting News Delivery System and Its Terminal", IEE Transactions on Consumer Electronics, U.S., IEE Inc., New York, vol. 43, No. 3, Aug. 1, 1997, pp. 504-509.
Lewis, B.T. et al.; "Shared books: collaborative publication management for an office information system"; ACM SIGIOS Bulletin Conference sponsored by ACM SIGOIS and IEEECS TC-OA on Office information systems, vol. 9, Issue 2-3, Apr. 1988, pp. 197-204.
Mann et al.; "A coherent distributed file cache with directory write-behind" ACM Transactions on Computer Systems (TCOS), vol. 12, Issue 2, May 1994.
Miyazawa, M. et al., "An electronic book: APT Book," Aug. 1990, Human-Computer Interaction, INTERACT '90, Proceedings of the IFIP TC 13 Third International Conference, Cambridge, UK, pp. 513-519.
O'Gorman, L., "Image and document processing techniques for the RightPages electronic library system", Conference B: Pattern Recognition Methodology and Systems, Proceedings, 11th IAP International Conference on Aug. 30-Sep. 3, 1992 pp. 260-263.
Olshansky R. et al., "Subscriber Distribution Networks Using Compressed Digital Video;" Journal of Lightwave Technology; Nov. 1992; vol. 10, No. 11, pp. 1760-1765.
Pobiak, B.C., "Adjustable access electronic books", Computing Applications to Assist Persons with Disabilities, 1992, Proceedings of the John Hopkins National Search for Feb. 1-5, 1992 pp. 90-94.
Raman, T.V., "Audio System for Technical Readings," May 1994, Cornell University, pp. 1-129.
Rawlins, "The New Publishing—Technology's impact on the publishing industry over the next decade", Nov. 12, 1991, pp. 1-65.
Schatz, "Building an electronic scientific community", System Sciences, 1991. Proceeding of the Twenty-Fourth Annual Hawaii International Conference on vol. iii, Jan. 8-11, 1991 pp. 739-748 vol. 3.
Simpson, Alan, Mastering Wordperfect® 5.1 & 5.2 for Windows, 1993, Sybex, Inc., pp. 72-73.
Soloview; "Prefetching in segmented disk cache for multi-disk systems" Proceedings of the fourth workshop on I/O in parallel and distributed systems: part of the federated computing research conference; May 1996.
Valauskas, Edward J, "Electronic books as databases", Database, Aug. 1993. vol. 16, Iss. 4; p. 84-86.
U.S. Appl. No. 29/030,157, Date of Office Action Sep. 24, 1996.
U.S. Appl. No. 12/010,045, Date of Office Action Sep. 8, 2009.
U.S. Appl. No. 09/964,883, Date of Office Action Sep. 4, 2009.
U.S. Appl. No. 09/964,883, Date of Office Action Feb. 17, 2009.
U.S. Appl. No. 09/964,883, Date of Office Action Sep. 17, 2008.
U.S. Appl. No. 09/964,883, Date of Office Action Feb. 6, 2008.
U.S. Appl. No. 09/964,883, Date of Office Action Jun. 22, 2007.
U.S. Appl. No. 09/964,883, Date of Office Action Jan. 3, 2007.
U.S. Appl. No. 09/964,883, Date of Office Action Jul. 12, 2006.
U.S. Appl. No. 09/964,883, Date of Office Action Feb. 2, 2006.
U.S. Appl. No. 09/964,883, Date of Office Action Jun. 15, 2005.
U.S. Appl. No. 09/964,883, Date of Office Action Sep. 27, 2004.
U.S. Appl. No. 09/964,882, Date of Office Action Aug. 10, 2007.
U.S. Appl. No. 09/964,882, Date of Office Action May 22, 2006.
U.S. Appl. No. 09/964,882, Date of Office Action Dec. 2, 2005.
U.S. Appl. No. 09/964,882, Date of Office Action Mar. 22, 2005.
U.S. Appl. No. 09/964,880, Date of Office Action Jul. 22, 2005.
U.S. Appl. No. 09/964,880, Date of Office Action Jan. 12, 2005.
U.S. Appl. No. 09/964,857, Date of Office Action May 9, 2005.
U.S. Appl. No. 09/964,857, Date of Office Action Jul. 7, 2004.
U.S. Appl. No. 09/723,282, Date of Office Action Feb. 8, 2006.
U.S. Appl. No. 09/723,282, Date of Office Action Aug. 17, 2005.
U.S. Appl. No. 09/723,282, Date of Office Action Jun. 3, 2004.
U.S. Appl. No. 09/723,280, Date of Office Action May 19, 2005.
U.S. Appl. No. 09/723,280, Date of Office Action Jun. 7, 2004.
U.S. Appl. No. 09/722,823, Date of Office Action Aug. 24, 2005.
U.S. Appl. No. 09/722,823, Date of Office Action Jan. 4, 2005.
U.S. Appl. No. 09/722,744, Date of Office Action Jul. 18, 2002.
U.S. Appl. No. 09/722,744, Date of Office Action Jan. 16, 2002.
U.S. Appl. No. 09/722,743, Date of Office Action Oct. 5, 2005.
U.S. Appl. No. 09/722,743, Date of Office Action Dec. 16, 2004.
U.S. Appl. No. 09/722,742, Date of Office Action Jan. 11, 2008.
U.S. Appl. No. 09/722,742, Date of Office Action May 29, 2007.
U.S. Appl. No. 09/722,742, Date of Office Action Oct. 2, 2006.
U.S. Appl. No. 09/722,742, Date of Office Action Apr. 13, 2006.
U.S. Appl. No. 09/722,742, Date of Office Action Oct. 7, 2003.
U.S. Appl. No. 09/722,741, Date of Office Action Mar. 24, 2005.
U.S. Appl. No. 09/722,741, Date of Office Action Jun. 28, 2004.
U.S. Appl. No. 09/722,740, Date of Office Action Aug. 24, 2005.
U.S. Appl. No. 09/722,740, Date of Office Action May 24, 2004.
U.S. Appl. No. 09/722,626, Date of Office Action Apr. 10, 2009.
U.S. Appl. No. 09/722,626, Date of Office Action Dec. 5, 2008.
U.S. Appl. No. 09/722,626, Date of Office Action Jun. 9, 2008.
U.S. Appl. No. 09/722,626, Date of Office Action Oct. 30, 2007.
U.S. Appl. No. 09/722,626, Date of Office Action May 8, 2007.
U.S. Appl. No. 09/722,626, Date of Office Action Aug. 1, 2006.
U.S. Appl. No. 09/722,626, Date of Office Action Feb. 22, 2006.
U.S. Appl. No. 09/722,626, Date of Office Action Jun. 20, 2005.
U.S. Appl. No. 09/722,519, Date of Office Action Dec. 20, 2006.
U.S. Appl. No. 09/722,519, Date of Office Action Aug. 15, 2006.
U.S. Appl. No. 09/722,519, Date of Office Action Mar. 15, 2006.
U.S. Appl. No. 09/722,519, Date of Office Action Nov. 22, 2005.
U.S. Appl. No. 09/722,519, Date of Office Action Apr. 14, 2005.
U.S. Appl. No. 09/722,519, Date of Office Action Aug. 10, 2004.
U.S. Appl. No. 09/722,463, Date of Office Action Jan. 18, 2006.
U.S. Appl. No. 09/722,463, Date of Office Action Jul. 27, 2005.
U.S. Appl. No. 09/722,463, Date of Office Action Jan. 12, 2005.
U.S. Appl. No. 09/722,462, Date of Office Action Jun. 6, 2005.
U.S. Appl. No. 09/722,462, Date of Office Action Jun. 4, 2004.
U.S. Appl. No. 09/722,460, Date of Office Action May 17, 2005.
U.S. Appl. No. 09/722,460, Date of Office Action Jun. 18, 2004.
U.S. Appl. No. 09/722,456, Date of Office Action Feb. 9, 2007.
U.S. Appl. No. 09/722,456, Date of Office Action Aug. 11, 2006.
U.S. Appl. No. 09/722,456, Date of Office Action Feb. 23, 2006.
U.S. Appl. No. 09/722,456, Date of Office Action May 5, 2005.
U.S. Appl. No. 09/722,456, Date of Office Action Jun. 16, 2004.
U.S. Appl. No. 09/539,773, Date of Office Action Jul. 30, 2009.
U.S. Appl. No. 09/539,773, Date of Office Action Jun. 24, 2009.
U.S. Appl. No. 09/539,773, Date of Office Action Feb. 25, 2009.
U.S. Appl. No. 09/539,773, Date of Office Action Aug. 25, 2008.
U.S. Appl. No. 09/539,773, Date of Office Action Nov. 29, 2007.
U.S. Appl. No. 09/539,773, Date of Office Action Nov. 24, 2006.
U.S. Appl. No. 09/539,773, Date of Office Action Aug. 2, 2006.
U.S. Appl. No. 09/539,773, Date of Office Action Apr. 4, 2006.
U.S. Appl. No. 09/539,773, Date of Office Action Jun. 15, 2005.
U.S. Appl. No. 09/539,773, Date of Office Action Jun. 22, 2004.
U.S. Appl. No. 09/520,344, Date of Office Action Apr. 6, 2009.
U.S. Appl. No. 09/520,344, Date of Office Action Oct. 23, 2008.
U.S. Appl. No. 09/520,344, Date of Office Action Jun. 13, 2008.
U.S. Appl. No. 09/520,344, Date of Office Action Dec. 26, 2007.
U.S. Appl. No. 09/520,344, Date of Office Action Aug. 3, 2007.
U.S. Appl. No. 09/520,344, Date of Office Action Jun. 23, 2005.
U.S. Appl. No. 09/441,892, Date of Office Action Nov. 12, 2008.
U.S. Appl. No. 09/441,892, Date of Office Action Apr. 29, 2008.
U.S. Appl. No. 09/441,892, Date of Office Action Nov. 2, 2007.
U.S. Appl. No. 09/441,892, Date of Office Action Jun. 18, 2007.
U.S. Appl. No. 09/441,892, Date of Office Action Nov. 24, 2006.
U.S. Appl. No. 09/441,892, Date of Office Action Feb. 3, 2006.
U.S. Appl. No. 09/441,892, Date of Office Action May 17, 2005.
U.S. Appl. No. 09/441,892, Date of Office Action Aug. 24, 2004.
U.S. Appl. No. 09/427,939, Date of Office Action Jun. 19, 2009.
U.S. Appl. No. 09/427,939, Date of Office Action Aug. 16, 2007.
U.S. Appl. No. 09/427,939, Date of Office Action Mar. 29, 2007.
U.S. Appl. No. 09/427,939, Date of Office Action Jun. 7, 2006.
U.S. Appl. No. 09/427,939, Date of Office Action May 20, 2005.
U.S. Appl. No. 09/427,938, Date of Office Action May 28, 2009.
U.S. Appl. No. 09/427,938, Date of Office Action Dec. 3, 2008.

U.S. Appl. No. 09/427,938, Date of Office Action Apr. 18, 2008.
U.S. Appl. No. 09/427,938, Date of Office Action Oct. 19, 2007.
U.S. Appl. No. 09/427,938, Date of Office Action Jun. 15, 2007.
U.S. Appl. No. 09/427,938, Date of Office Action Jan. 31, 2007.
U.S. Appl. No. 09/427,938, Date of Office Action Jun. 7, 2006.
U.S. Appl. No. 09/427,938, Date of Office Action Apr. 25, 2005.
U.S. Appl. No. 09/400,296, Date of Office Action Dec. 30, 2005.
U.S. Appl. No. 09/400,296, Date of Office Action Apr. 8, 2005.
U.S. Appl. No. 09/391,461, Date of Office Action Jun. 25, 2009.
U.S. Appl. No. 09/391,461, Date of Office Action Jan. 7, 2009.
U.S. Appl. No. 09/391,461, Date of Office Action Jul. 3, 2008.
U.S. Appl. No. 09/391,461, Date of Office Action Dec. 13, 2007.
U.S. Appl. No. 09/391,461, Date of Office Action Jun. 22, 2007.
U.S. Appl. No. 09/391,461, Date of Office Action Nov. 17, 2006.
U.S. Appl. No. 09/391,461, Date of Office Action Mar. 28, 2006.
U.S. Appl. No. 09/391,461, Date of Office Action Jun. 15, 2005.
U.S. Appl. No. 09/391,461, Date of Office Action Jun. 30, 2004.
U.S. Appl. No. 09/344,499, Date of Office Action Aug. 10, 2009.
U.S. Appl. No. 09/344,499, Date of Office Action Feb. 18, 2009.
U.S. Appl. No. 09/344,499, Date of Office Action Feb. 8, 2008.
U.S. Appl. No. 09/344,499, Date of Office Action Jun. 14, 2007.
U.S. Appl. No. 09/344,499, Date of Office Action Dec. 15, 2006.
U.S. Appl. No. 09/344,499, Date of Office Action Jun. 30, 2006.
U.S. Appl. No. 09/344,499, Date of Office Action May 6, 2005.
U.S. Appl. No. 09/344,492, Date of Office Action Jul. 13, 2009.
U.S. Appl. No. 09/344,492, Date of Office Action Jan. 23, 2009.
U.S. Appl. No. 09/344,492, Date of Office Action Aug. 5, 2008.
U.S. Appl. No. 09/344,492, Date of Office Action Jan. 23, 2008.
U.S. Appl. No. 09/344,492, Date of Office Action Jul. 11, 2007.
U.S. Appl. No. 09/344,492, Date of Office Action Dec. 19, 2006.
U.S. Appl. No. 09/344,492, Date of Office Action Jun. 26, 2006.
U.S. Appl. No. 09/344,492, Date of Office Action Jan. 24, 2006.
U.S. Appl. No. 09/344,492, Date of Office Action Jun. 6, 2005.
U.S. Appl. No. 09/335,268, Date of Office Action Jan. 22, 2009.
U.S. Appl. No. 09/335,268, Date of Office Action Jul. 9, 2008.
U.S. Appl. No. 09/335,268, Date of Office Action Jan. 10, 2008.
U.S. Appl. No. 09/335,268, Date of Office Action May 17, 2007.
U.S. Appl. No. 09/335,268, Date of Office Action Oct. 2, 2006.
U.S. Appl. No. 09/335,268, Date of Office Action Apr. 13, 2006.
U.S. Appl. No. 09/335,268, Date of Office Action Oct. 28, 2005.
U.S. Appl. No. 09/335,268, Date of Office Action Feb. 24, 2005.
U.S. Appl. No. 09/328,672, Date of Office Action Feb. 19, 2009.
U.S. Appl. No. 09/328,672, Date of Office Action Jun. 16, 2004.
U.S. Appl. No. 09/289,958, Date of Office Action Jul. 7, 2009.
U.S. Appl. No. 09/289,958, Date of Office Action Dec. 24, 2008.
U.S. Appl. No. 09/289,958, Date of Office Action Jul. 29, 2008.
U.S. Appl. No. 09/289,958, Date of Office Action Jan. 18, 2008.
U.S. Appl. No. 09/289,958, Date of Office Action Jul. 31, 2007.
U.S. Appl. No. 09/289,958, Date of Office Action Mar. 23, 2007.
U.S. Appl. No. 09/289,958, Date of Office Action Jun. 6, 2006.
U.S. Appl. No. 09/289,958, Date of Office Action Jan. 3, 2005.
U.S. Appl. No. 09/289,957, Date of Office Action Jul. 22, 2009.
U.S. Appl. No. 09/289,957, Date of Office Action Nov. 18, 2008.
U.S. Appl. No. 09/289,957, Date of Office Action Mar. 25, 2008.
U.S. Appl. No. 09/289,957, Date of Office Action Jul. 6, 2007.
U.S. Appl. No. 09/289,957, Date of Office Action Oct. 11, 2006.
U.S. Appl. No. 09/289,957, Date of Office Action Apr. 21, 2006.
U.S. Appl. No. 09/289,957, Date of Office Action Nov. 3, 2005.
U.S. Appl. No. 09/289,957, Date of Office Action Nov. 4, 2004.
U.S. Appl. No. 09/289,957, Date of Office Action Sep. 9, 2009.
U.S. Appl. No. 09/289,956, Date of Office Action Mar. 17, 2009.
U.S. Appl. No. 09/289,956, Date of Office Action Nov. 13, 2008.
U.S. Appl. No. 09/289,956, Date of Office Action Jun. 12, 2008.
U.S. Appl. No. 09/289,956, Date of Office Action Mar. 22, 2007.
U.S. Appl. No. 09/289,956, Date of Office Action Jul. 24, 2006.
U.S. Appl. No. 09/289,956, Date of Office Action Jan. 30, 2006.
U.S. Appl. No. 09/289,956, Date of Office Action Jun. 23, 2005.
U.S. Appl. No. 09/237,828, Date of Office Action Oct. 3, 2007.
U.S. Appl. No. 09/237,828, Date of Office Action Mar. 5, 2007.
U.S. Appl. No. 09/237,828, Date of Office Action Sep. 8, 2006.
U.S. Appl. No. 09/237,828, Date of Office Action May 12, 2005.
U.S. Appl. No. 09/237,828, Date of Office Action Aug. 25, 2004.
U.S. Appl. No. 09/237,827, Date of Office Action Aug. 28, 2009.
U.S. Appl. No. 09/237,827, Date of Office Action Mar. 2, 2009.
U.S. Appl. No. 09/237,827, Date of Office Action Aug. 18, 2008.
U.S. Appl. No. 09/237,827, Date of Office Action Jan. 9, 2008.
U.S. Appl. No. 09/237,827, Date of Office Action Jul. 23, 2007.
U.S. Appl. No. 09/237,827, Date of Office Action May 16, 2007.
U.S. Appl. No. 09/237,827, Date of Office Action Jan. 12, 2007.
U.S. Appl. No. 09/237,827, Date of Office Action Aug. 2, 2006.
U.S. Appl. No. 09/237,827, Date of Office Action Oct. 19, 2005.
U.S. Appl. No. 09/237,827, Date of Office Action Jan. 26, 2005.
U.S. Appl. No. 09/237,826, Date of Office Action Aug. 3, 2009.
U.S. Appl. No. 09/237,826, Date of Office Action Feb. 13, 2009.
U.S. Appl. No. 09/237,826, Date of Office Action Aug. 15, 2008.
U.S. Appl. No. 09/237,826, Date of Office Action Dec. 7, 2007.
U.S. Appl. No. 09/237,826, Date of Office Action Jun. 27, 2007.
U.S. Appl. No. 09/237,826, Date of Office Action Dec. 19, 2006.
U.S. Appl. No. 09/237,826, Date of Office Action Jun. 14, 2006.
U.S. Appl. No. 09/237,826, Date of Office Action Dec. 6, 2005.
U.S. Appl. No. 09/237,826, Date of Office Action Jun. 6, 2005.
U.S. Appl. No. 09/237,826, Date of Office Action May 25, 2004.
U.S. Appl. No. 09/237,825, Date of Office Action Jun. 15, 2005.
U.S. Appl. No. 09/237,825, Date of Office Action Jun. 4, 2004.
U.S. Appl. No. 08/336,247, Date of Office Action May 12, 1998.
U.S. Appl. No. 08/336,247, Date of Office Action Jul. 24, 1997.
U.S. Appl. No. 08/336,247, Date of Office Action Apr. 29, 1997.
U.S. Appl. No. 08/336,247, Date of Office Action Aug. 28, 1996.
U.S. Appl. No. 08/336,247, Date of Office Action Jun. 27, 1996.
U.S. Appl. No. 08/336,247, Date of Office Action Nov. 1, 1995.
IPER dated Mar. 6, 1996 for PCT/US94/13808.
Written Opinion dated Nov. 16, 1995 for PCT/US94/13808.
ISR dated Apr. 5, 1995 for PCT/US94/13808.
ISR dated Feb. 21, 2002 for PCT/US01/10559.
IPER dated Apr. 11, 2002 for PCT/US01/04946.
Written Opinion dated Dec. 4, 2001 for PCT/US01/04946.
ISR dated Oct. 16, 2001 for PCT/US01/04946.
Partial ISR dated Nov. 18, 2002 for PCT/US00/29813.
IPER dated Oct. 18, 2001 for PCT/US00/09542.
Written Opinion dated Jun. 19, 2001 for PCT/US00/01708.
ISR dated Jun. 26, 2000 for PCT/US00/01708.
ISR dated Feb. 4, 2003 for PCT/US00/29813, 2388649, CA.
IPER dated Jan. 25, 2002 for PCT/US00/29813, 2388649, CA.
Written Opinion dated Sep. 5, 2001 for PCT/US00/29813, 2388649, CA.
ISR dated Feb. 21, 2003 for PCT/US00/29809, 2388648, CA.
IPER dated Feb. 11, 2002 for PCT/US00/29809, 2388648, CA.
Written Opinion dated Sep. 5, 2001 for PCT/US00/29809, 2388648, CA.
IPER dated Mar. 25, 2002 for PCT/US00/25826, 2385097, CA.
Written Opinion dated Nov. 2, 2001 for PCT/US00/25826, 2385097, CA.
ISR dated Jun. 22, 2001 for PCT/US00/25826, 2385097, CA.
Written Opinion dated May 25, 2001 for PCT/US00/09542, 2371379, CA.
ISR dated Nov. 2, 2000 for PCT/US00/09542, 2371379, CA.
ISR dated Nov. 2, 2000 for PCT/US00/09541, 2369759, CA.
IPER dated Feb. 14, 2002 for PCT/US00/31740, 2001-539201, JP.
Written Opinion dated Oct. 19, 2001 for PCT/US00/31740, 2001-539201, JP.
ISR dated Sep. 18, 2001 for PCT/US00/31740, 2001-539201, JP.
IPER dated Aug. 22, 2003 for PCT/US00/17266, 2001-506518, JP.
Written Opinion dated Jan. 31, 2003 for PCT/US00/17266, 2001-506518, JP.
ISR dated Sep. 21, 2001 for PCT/US00/15810, 2001-502044, JP.
ESR dated Oct. 4, 2005, 00974003.6, EPX.
IPER dated Feb. 13, 2002 for PCT/US00/24819, 00960077.6, EPX.
Written Opinion dated Aug. 13, 2001 for PCT/US00/24819, 00960077.6, EP.
ISR dated Dec. 7, 2000 for PCT/US00/24819, 00960077.6, EP.
ISR dated Jan. 18, 2001 for PCT/US00/17266, 00943086.9, EP.
IPER dated Sep. 8, 2001 for PCT/US00/15810, 00941287.5, EP.
IPER dated Jan. 2, 2002 for PCT/US00/09541, 00925915.1, EP.
Written Opinion dated Aug. 13, 2001 for PCT/US00/09541, 00925915.1, EP.
IPER dated Feb. 14, 2001 for PCT/US00/09543, 00923211.7, EP.

ISR dated Oct. 24, 2000 for PCT/US00/09543, 00923211.7, EP.
IPER dated Nov. 1, 2001 for PCT/US00/01708, 00909966.4, EP.
IPER dated Feb. 2, 2001 for PCT/US00/01625, 00909958.1, EP.
ISR dated Jul. 24, 2000 for PCT/US00/01625, 00909958.1, EP.
Tan, Q. et al., "A brief overview of current TV set-top box developments", Systems, Man, and Cybernetics, 1996, IEEE International Conference on: Oct. 14-17, 1996, 2127-2132.
Perry, T.S., "Consumer electronics", Spectrum, IEEE, Jan. 1997, vol. 34, No. 1, 43-48.
The Internet Protocol Journal, Dec. 1998, vol. 3, No. 1, http://www.noc.garr.it/docum/journal/ipj_dic_98.pdf.
T.P. David, "Networking requirements and solutions for a TV WWW Browser" 1997 from http://scholar.lib.vt.edu/theses/public/etd-82497-16476/materials/etd.pdf.
Atzori, L. et al., "Multimedia information broadcasting using digital TV channels", Broadcasting, IEEE Transactions on, Dec. 1997, vol. 43, No. 4, 383-392.
Encryption. Free On-line dictionary of computing: http://foldoc.doc.ic.ac.uk/foldoc/2003-04-12.
Encode. Free On-line dictionary of computing: http://foldoc.doc.ic.ac.uk/foldoc/1999-07-06.
The project Gutenberg entitled: "The Bible: Old and New Testaments, King James Version by Anonymous", released on Aug. 1, 1989.
"'Optical Disks' May Be Books of the Future", Steven Kosek and Dennis Lynch; Chicago Tribune, Sep. 15, 1985, p. 31.
"Transmission Control Protocol; Request for Comment 793", Sep. 1981, pp. 1-85.
Cerf, V. et al., "A protocol for Packet Network Intercommunication," May 1974, IEEE Transactions on Communications Col. COM-22, No. 5, 637-647.
Holzmann, G., "Design and Validation of Computer Protocols," Nov. 1990, Prentice Hall, pp. 1-512.
Hearst, "Changing Network Society: New Technology in the Internet," (the original title: Interfaces for Searching the Web), Dec. 1998, Japan Nikkei Science, 1$^{st}$ edition, 80-85.
Shunji Ichiyama, "WWW-based Digital Library System," Jul. 1996, NEC Giho (technical journal), NEC Creative, vol. 49, 33-39.
Minoru Ashizawa, "Using Digital Libraries as a Community Hall for Worldwide Information Spiral Development," May 1998, Journal of the Institute of Electronics, Information and Communication Engineers, Japan, vol. J81-D-II, No. 5, 1014-1024.
Akira Kojima, "Navigable Digital Library System Using Video-based Walk-through Technology," Mar. 1996, Technical Research Report of the Institute of Electronics, Information and Communication Engineers, Japan, vol. 95, No. 580, 31-36.
Toshiyuki Kamiya, "Development of Electronic Library Interface with 3D Walk-through and CG Librarian," Jan. 1995, Research Report of Information Processing Society of Japan, vol. 95, No. 1, 27-35.
Mamoru Sato, "Electronic Library Search using Animation," Apr. 1989, Science and Technology Information Service, Japan, National Diet Library, No. 88, 11-17.
Mamoru Sato, "SON-GO-KU: A dream of Automated Library," Mar. 1989, Joho Kanri (Journal of Information Processing and Management), the Japan Information Center of Science and Technology, vol. 31, No. 12, 1023-1034.

English language translation of citation No. 12, JP08008851.
English language translation of citation No. 13, JP09237096.
English language translation of citation No. 14, JP10070530.
U.S. Appl. No. 09/427,939, Date of Office Action Dec. 8, 2010.
U.S. Appl. No. 09/289,958, Date of Office Action Dec. 8, 2010.
U.S. Appl. No. 09/289,956, Date of Office Action Jan. 5, 2011.
Henry Kisor, "Videotex: Swapping Hardcovers for Software," Boston Globe, Jan. 23, 1983, pp. 1-3.
Alan Kay, "A Personal Computer for Children of All Ages." Originally published in Proceedings of the ACM National Conference, Boston, Aug. 1972. Available from <http://mprove.de/diplom/gui/kay72.html>.
Shigeo Tsujii, "Cryptography and Information Security," Shokodo Co. Ltd., Mar. 29, 1990, 1$^{st}$ edition.
U.S. Appl. No. 12/391,044, Date of Office Action Aug. 25, 2010.
U.S. Appl. No. 12/010,045, Date of Office Action Jul. 28, 2010.
U.S. Appl. No. 12/010,045, Date of Office Action Jun. 4, 2010.
U.S. Appl. No. 12/010,045, Date of Office Action Mar. 24, 2010.
U.S. Appl. No. 11/785,959, Date of Office Action Oct. 27, 2010.
U.S. Appl. No. 11/785,959, Date of Office Action Jan. 26, 2010.
U.S. Appl. No. 09/964,883, Date of Office Action Oct. 6, 2010.
U.S. Appl. No. 09/722,626, Date of Office Action Sep. 13, 2010.
U.S. Appl. No. 09/722,626, Date of Office Action Mar. 26, 2010.
U.S. Appl. No. 09/722,626, Date of Office Action Nov. 25, 2009.
U.S. Appl. No. 09/539,773, Date of Office Action Aug. 26, 2010.
U.S. Appl. No. 09/539,773, Date of Office Action Mar. 1, 2010.
U.S. Appl. No. 09/520,344, Date of Office Action Jun. 3, 2010.
U.S. Appl. No. 09/520,344, Date of Office Action Oct. 21, 2009.
U.S. Appl. No. 09/427,939, Date of Office Action Jun. 4, 2010.
U.S. Appl. No. 09/427,938, Date of Office Action Dec. 30, 2009.
U.S. Appl. No. 09/391,461, Date of Office Action Sep. 15, 2010.
U.S. Appl. No. 09/391,461, Date of Office Action Jan. 6, 2010.
U.S. Appl. No. 09/344,499, Date of Office Action Jul. 27, 2010.
U.S. Appl. No. 09/344,499, Date of Office Action Jan. 28, 2010.
U.S. Appl. No. 09/344,492, Date of Office Action Aug. 18, 2010.
U.S. Appl. No. 09/344,492, Date of Office Action Jan. 29, 2010.
U.S. Appl. No. 09/328,672, Date of Office Action Nov. 2, 2009.
U.S. Appl. No. 09/289,958, Date of Office Action Aug. 2, 2010.
U.S. Appl. No. 09/289,958, Date of Office Action Jan. 13, 2010.
U.S. Appl. No. 09/289,957, Date of Office Action May 13, 2010.
U.S. Appl. No. 09/289,956, Date of Office Action Jul. 8, 2010.
U.S. Appl. No. 09/289,956, Date of Office Action Mar. 18, 2010.
U.S. Appl. No. 09/237,827, Date of Office Action Aug. 19, 2010.
U.S. Appl. No. 09/237,827, Date of Office Action Jan. 21, 2010.
U.S. Appl. No. 09/237,826, Date of Office Action Jun. 29, 2010.
U.S. Appl. No. 09/237,826, Date of Office Action Mar. 15, 2010.
English language translation of citation No. 85, JP10134080.
English language translation of citation No. 87, JP10275186.
English language translation of citation No. 88, JP10301946.
English language translation of citation No. 90, JP10327397.
English language translation of citation No. 92, JP11250145.
English language translation of citation No. 93, JP11084999.
U.S. Appl. No. 09/344,492, Date of Office Action Feb. 15, 2011.
U.S. Appl. No. 09/344,499, Date of Office Action Feb. 10, 2011.
U.S. Appl. No. 09/964,883, Date of Office Action Mar. 16, 2011.
U.S. Appl. No. 12/129,496, Date of Office Action Feb. 7, 2011.

* cited by examiner

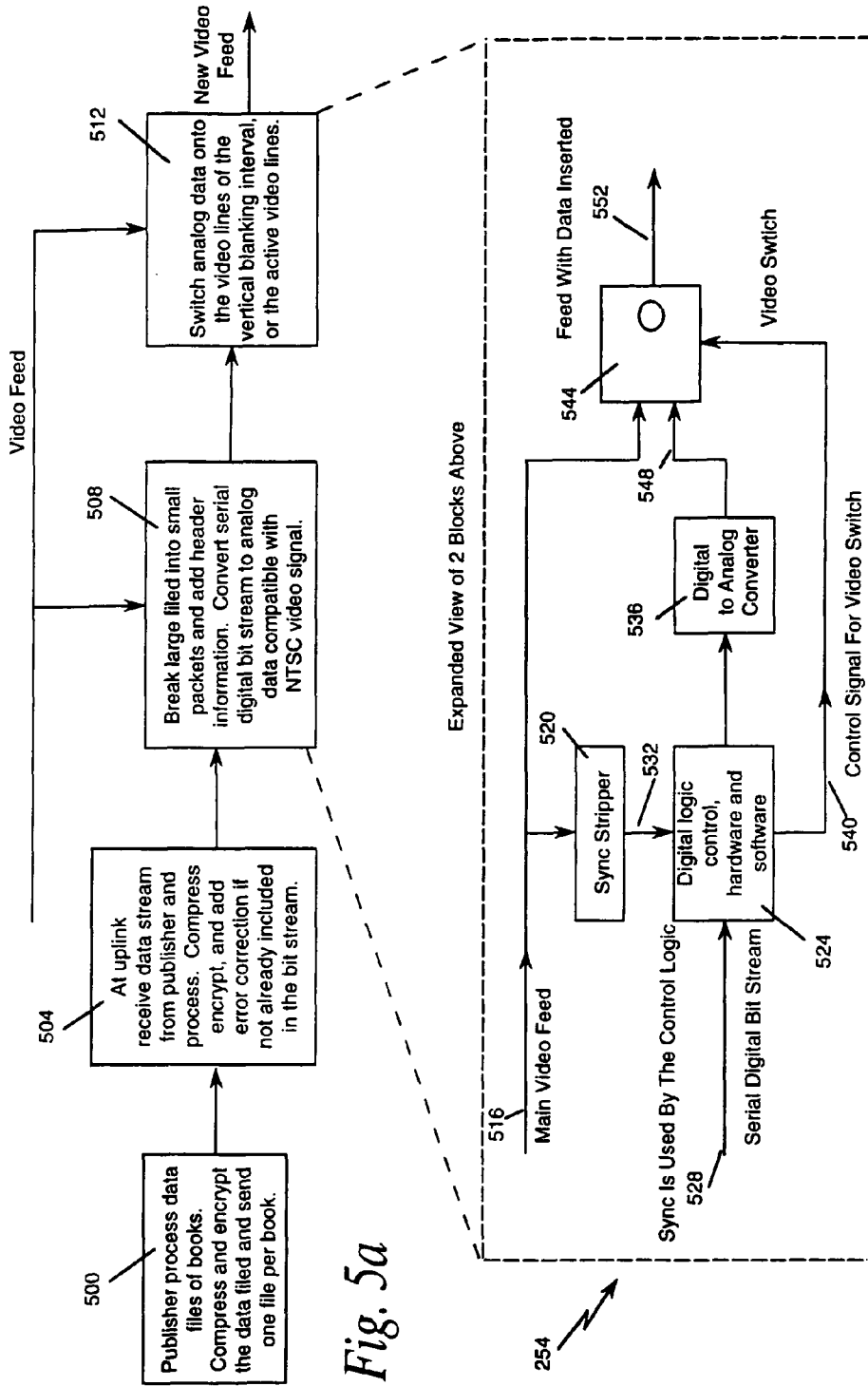

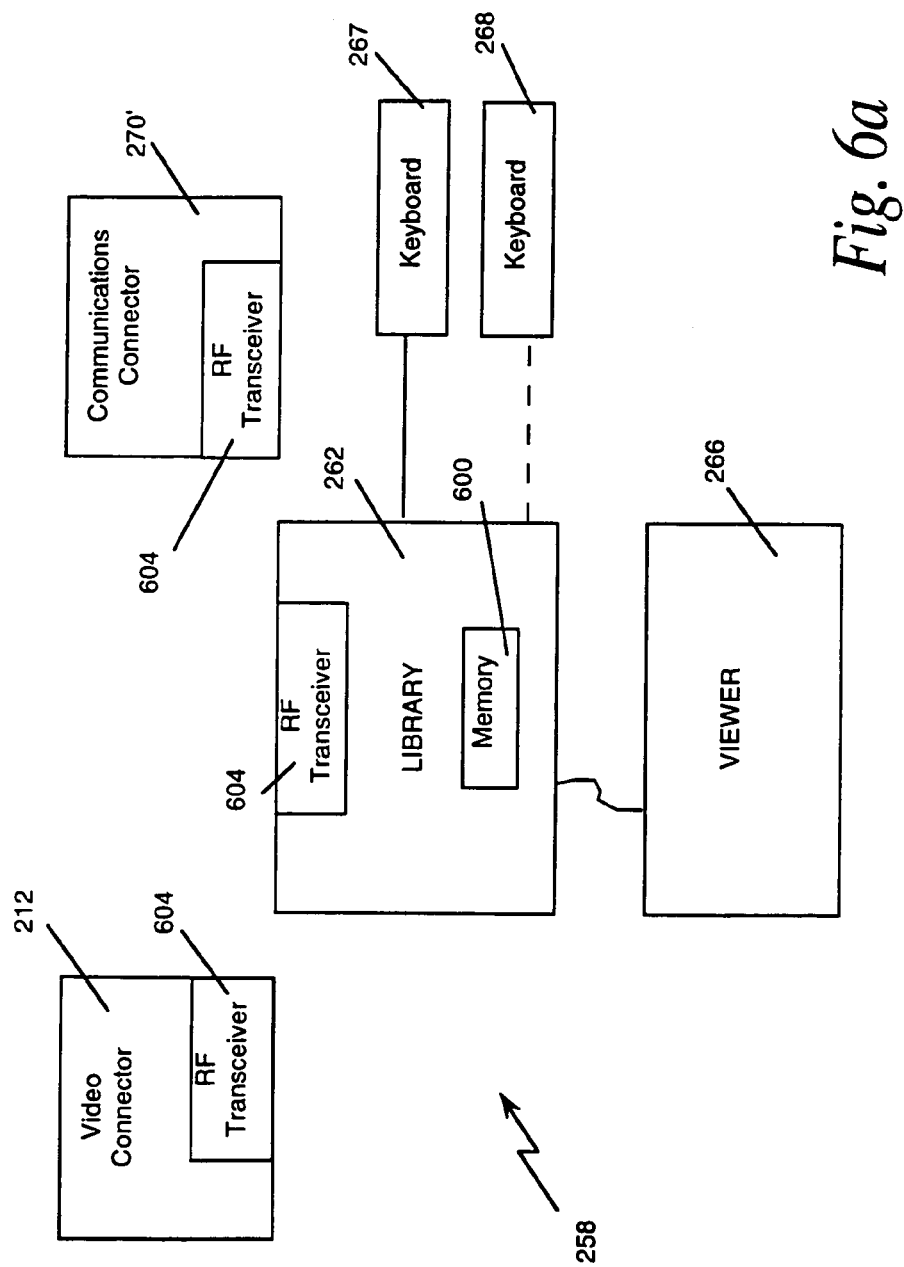

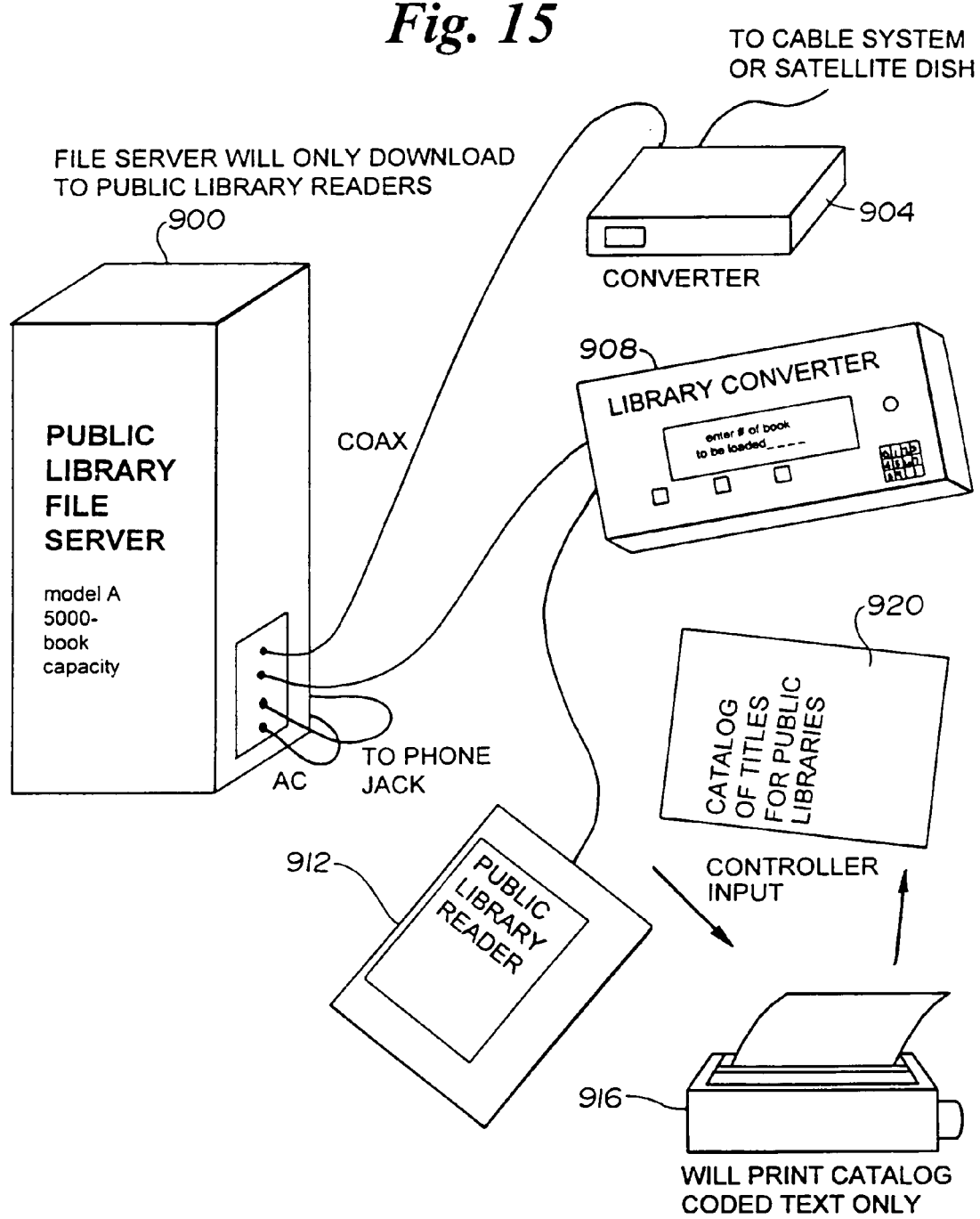

1340 ical demands, the resignation of Gorbachev. To be sure, as part of Ukraine, Donbas was now on Leonid Kravchuk's conscience. Vorkuta and Kuzbas were coal-mining areas I had visited a number of times and to which I would certainly return. Their demands were harshly formulated at times, and they expected a great deal from me, but they supported me during the tough reforms.

We have a saying in Russia that when you chop wood, the chips fly. Although Khasbulatov tried his best to portray the miners as economic chips flying from the Galdar team's woodcutting, their demand did not fit the picture. These miners were not against reform. Nevertheless, they did try to defend their economic interests, insisting that such hard work should be rewarded with part of the overall profits from the industry. Unfortunately, we did not have precise mechanism to turn such enterprises as coal mines into joint stock companies. There were long, hard negotiations under way constantly.

I must say that in the spring and summer of 1992, when the work *stoppage* resounded throughout the country (the work stoppage on trains with coal, the stoppage on factory floors, the stoppage of transportation), my aide Yuri Skokov very courageously conducted the negotiations with the miners.

I met Yuri Skokov when I worked at the Moscow City Executive Committee. He was director of Quannum, a large defense plant, and he had run for elections to the Soviet parliament against Vitaly Korotich, a prominent writer and journalist who at the time was editor in chief of *Ogonoyok[Little Flame]*, a pioneer of glasnost. Due to various backroom deals and party scheming (described in *Against the Grain*), Skokov won the election and proved himself to be a disciplined party protégé.

Skokov is an intelligent man — that is the first thing that must be said about him. And very hard and taciturn. Many people were asking what his role was in my inner circle. It was a legitimate question. Skokov was actually the "shadow" prime minister whom I had always had in mind. Both Silayev, under whom Skokov chaired the Supreme Economic Council, and Gaidar, on whose watch Skokov became chairman of the Security Council, sensed a latent threat restrict selected portion — 1341

1343   1345

< >

PAGE TURN

FIG. 30a (1340)

ical demands, the resignation of Gorbachev. To be sure, as part of Ukraine, Donbas was now on Leonid Kravchuk's conscience. Vorkuta and Kuzbas were coal-mining areas I had visited a number of times and to which I would certainly return. Their demands were harshly formulated at times, and they expected a great deal from me, but they supported me during the tough reforms.

We have a saying in Russia that when you chop wood, the chips fly. Although Khasbulatov tried his best to portray the miners as economic chips flying from the Galdar team's woodcutting, their demand did not fit the picture. These miners were not against reform. Nevertheless, they did try to defend their economic interests, insisting that such hard work should be rewarded with part of the overall profits from the industry. Unfortunately, we did not have precise mechanism to turn such enterprises as coal mines into joint stock companies. There were long, hard negotiations under way constantly.  }—1342

I must say that in the spring and summer of 1992, when the work *stoppage* resounded throughout the country (the work stoppage on trains with coal, the stoppage on factory floors, the stoppage of transportation), my aide Yuri Skokov very courageously conducted the negotiations with the miners.

I met Yuri Skokov when I worked at the Moscow City Executive Committee. He was director of Quannum, a large defense plant, and he had run for elections to the Soviet parliament against Vitaly Korotich, a prominent writer and journalist who at the time was editor in chief of *Ogonoyok[Little Flame]*, a pioneer of glasnost. Due to various backroom deals and party scheming (described in *Against the Grain*), Skokov won the election and proved himself to be a disciplined party protégé.

Skokov is an intelligent man — that is the first thing that must be said about him. And very hard and taciturn. Many people were asking what his role was in my inner circle. It was a legitimate question. Skokov was actually the "shadow" prime minister whom I had always had in mind. Both Silayev, under whom Skokov chaired the Supreme Economic Council, and Gaidar, on whose watch Skokov became chairman of the Security Council, sensed a latent threat 1341        1343   1345

| restrict selected portion | | < | > |

PAGE TURN

FIG. 30b ical demands, the resignation of Gorbachev. To be sure, as part of Ukraine, Donbas was now on Leonid Kravchuk's conscience. Vorkuta and Kuzbas were coal-mining areas I had visited a number of times and to which I would certainly return. Their demands were harshly formulated at times, and they expected a great deal from me, but they supported me during the tough reforms.

These miners were not against reform. Nevertheless, they did try to defend their economic interests, insisting that such hard work should be rewarded with part of the overall profits from the industry. Unfortunately, we did not have precise mechanism to turn such enterprises as coal mines into joint stock companies. There were long, hard negotiations under way constantly.

I must say that in the spring and summer of 1992, when the work *stoppage* resounded throughout the country (the work stoppage on trains with coal, the stoppage on factory floors, the stoppage of transportation), my aide Yuri Skokov very courageously conducted the negotiations with the miners.

I met Yuri Skokov when I worked at the Moscow City Executive Committee. He was director of Quannum, a large defense plant, and he had run for elections to the Soviet parliament against Vitaly Korotich, a prominent writer and journalist who at the time was editor in chief of *Ogonoyok[Little Flame]*, a pioneer of glasnost. Due to various backroom deals and party scheming (described in *Against the Grain*), Skokov won the election and proved himself to be a disciplined party protégé.

Skokov is an intelligent man — that is the first thing that must be said about him. And very hard and taciturn. Many people were asking what his role was in my inner circle. It was a legitimate question. Skokov was actually the "shadow" prime minister whom I had always had in mind. Both Silayev, under whom Skokov chaired the Supreme Economic Council, and Gaidar, on whose watch Skokov became chairman of the Security Council, sensed a latent threat restrict selected portion

< >

PAGE TURN

FIG. 30c

1346 ical demands, the resignation of Gorbachev. To be sure, as part of Ukraine, Donbas was now on Leonid Kravchuk's conscience. Vorkuta and Kuzbas were coal-mining areas I had visited a number of times and to which I would certainly return. Their demands were harshly formulated at times, and they expected a great deal from me, but they supported me during the tough reforms.

We have a saying in Russia that when you chop wood, the chips fly. Although Khasbulatov tried his best to portray the miners as economic chips flying from the Galdar team's woodcutting, their demand did not fit the picture. These miners were not against reform. Nevertheless, they did try to defend their economic interests, insisting that such hard work should be rewarded with part of the overall profits from the industry. Unfortunately, we did not have precise mechanism to turn such enterprises as coal mines into joint stock companies. There were long, hard negotiations under way constantly.

1348

I must say that in the spring and summer of 1992, when the work *stoppage* resounded throughout the country (the work stoppage on trains with coal, the stoppage on factory floors, the stoppage of transportation), my aide Yuri Skokov very courageously conducted the negotiations with the miners.

I met Yuri Skokov when I worked at the Moscow City Executive Committee. He was director of Quannum, a large defense plant, and he had run for elections to the Soviet parliament against Vitaly Korotich, a prominent writer and journalist who at the time was editor in chief of *Ogonoyok[Little Flame]*, a pioneer of glasnost. Due to various backroom deals and party scheming (described in *Against the Grain*), Skokov won the election and proved himself to be a disciplined party protégé.

| restrict selected portion | 1341 |

1343  1345

PAGE TURN

FIG. 30d ical demands, the resignation of Gorbachev. To be sure, as part of Ukraine, Donbas was now on Leonid Kravchuk's conscience. Vorkuta and Kuzbas were coal-mining areas I had visited a number of times and to which I would certainly return. Their demands were harshly formulated at times, and they expected a great deal from me, but they supported me during the tough reforms.

We have a saying in Russia that when you chop wood, the chips fly. Although Khasbulatov tried his best to portray the miners as economic chips flying from the Galdar team's woodcutting, their demand did not fit the picture. These miners were not against reform. Nevertheless, they did try to defend their economic interests, insisting that such hard work should be rewarded with part of the overall profits from the industry. Unfortunately, we did not have precise mechanism to turn such enterprises as coal mines into joint stock companies. There were long, hard negotiations under way constantly.

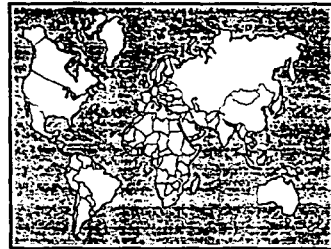

I must say that in the spring and summer of 1992, when the work *stoppage* resounded throughout the country (the work stoppage on trains with coal, the stoppage on factory floors, the stoppage of transportation), my aide Yuri Skokov very courageously conducted the negotiations with the miners.

I met Yuri Skokov when I worked at the Moscow City Executive Committee. He was director of Quannum, a large defense plant, and he had run for elections to the Soviet parliament against Vitaly Korotich, a prominent writer and journalist who at the time was editor in chief of *Ogonoyok[Little Flame]*, a pioneer of glasnost. Due to various backroom deals and party scheming (described in *Against the Grain*), Skokov won the election and proved himself to be a disciplined party protégé.

restrict selected portion

< >

PAGE TURN

FIG. 30e.

1346 ical demands, the resignation of Gorbachev. To be sure, as part of Ukraine, Donbas was now on Leonid Kravchuk's conscience. Vorkuta and Kuzbas were coal-mining areas I had visited a number of times and to which I would certainly return. Their demands were harshly formulated at times, and they expected a great deal from me, but they supported me during the tough reforms.

We have a saying in Russia that when you chop wood, the chips fly. Although Khasbulatov tried his best to portray the miners as economic chips flying from the Galdar team's woodcutting, their demand did not fit the picture. These miners were not against reform. Nevertheless, they did try to defend their economic interests, insisting that such hard work should be rewarded with part of the overall profits from the industry. Unfortunately, we did not have precise mechanism to turn such enterprises as coal mines into joint stock companies. There were long, hard negotiations under way constantly.

1352

I must say that in the spring and summer of 1992, when the work *stoppage* resounded throughout the country (the work stoppage on trains with coal, the stoppage on factory floors, the stoppage of transportation), my aide Yuri Skokov very courageously conducted the negotiations with the miners.

I met Yuri Skokov when I worked at the Moscow City Executive Committee. He was director of Quannum, a large defense plant, and he had run for elections to the Soviet parliament against Vitaly Korotich, a prominent writer and journalist who at the time was editor in chief of *Ogonoyok[Little Flame]*, a pioneer of glasnost. Due to various backroom deals and party scheming (described in *Against the Grain*), Skokov won the election and proved himself to be a disciplined party protégé.

restrict selected portion — 1341

1343 1345

< >

PAGE TURN

FIG. 30f

1425 ical demands, the resignation of Gorbachev. To be sure, as part of Ukraine, Donbas was now on Leonid Kravchuk's conscience. Vorkuta and Kuzbas were coal-mining areas I had visited a number of times and to which I would certainly return. Their demands were harshly formulated at times, and they expected a great deal from me, but they supported me during the tough reforms.

We have a saying in Russia that when you chop wood, the chips fly. Although Khasbulatov tried his best to portray the miners as economic chips flying from the Galdar team's woodcutting, their demand did not fit the picture. These miners were not against reform. Nevertheless, they did try to defend their economic interests, insisting that such hard work should be rewarded with part of the overall profits from the industry. Unfortunately, we did not have precise mechanism to turn such enterprises as coal mines into joint stock companies. There were long, hard negotiations under way constantly.

I must say that in the spring and summer of 1992, when the work *stoppage* resounded throughout the country (the work stoppage on trains with coal, the stoppage on factory floors, the stoppage of transportation), my aide Yuri Skokov very courageously conducted the negotiations with the miners.

I met Yuri Skokov when I worked at the Moscow City Executive Committee. He was director of Quannum, a large defense plant, and he had run for elections to the Soviet parliament against Vitaly Korotich, a prominent writer and journalist who at the time was editor in chief of *Ogonoyok[Little Flame]*, a pioneer of glasnost. Due to various backroom deals and party scheming (described in *Against the Grain*), Skokov won the election and proved himself to be a disciplined party protégé.

Skokov is an intelligent man — that is the first thing that must be said about him. And very hard and taciturn. Many people were asking what his role was in my inner circle. It was a legitimate question. Skokov was actually the "shadow" prime minister whom I had always had in mind. Both Silayev, under whom Skokov chaired the Supreme Economic Council, and Gaidar, on whose watch Skokov became chairman of the Security Council, sensed a latent threat

1427 next page

FIG. 34

ELECTRONIC BOOK WITH RESTRICTED ACCESS FEATURES

RELATED APPLICATIONS

This application is a continuation-in-part of U.S. application Ser. No. 08/336,247 entitled ELECTRONIC BOOK SELECTION AND DELIVERY SYSTEM, filed Nov. 7, 1994, now U.S. Pat. No. 5,986,690 and U.S. application Ser. No. 08/160,194, entitled ADVANCED SET-TOP TERMINAL FOR CABLE TELEVISION DELIVERY SYSTEMS, filed Dec. 2, 1993, now U.S. Pat. No. 5,990,927 and U.S. application Ser. No. 08/906,469, entitled REPROGRAMMABLE TERMINAL FOR SUGGESTING PROGRAMS OFFERED ON A TELEVISION PROGRAM DELIVERY SYSTEM, filed Aug. 5, 1997 which is a continuation of U.S. application Ser. No. 08/160,281, entitled TERMINAL FOR SUGGESTING PROGRAMS OFFERED ON A TELEVISION PROGRAM DELIVERY SYSTEM, filed Dec. 2, 1993, which is now U.S. Pat. No. 5,798,785, dated Aug. 25, 1998, all of which are incorporated herein by reference.

This application is related to U.S. application Ser. No. 09/237,828, filed on Jan. 27, 1999, entitled ELECTRONIC BOOK ELECTRONIC LINKS, U.S. application Ser. No. 09/289,957, filed on Apr. 13, 1999, entitled ELECTRONIC BOOK ALTERNATIVE DELIVERY SYSTEMS, and U.S. application Ser. No. 09/289,956, filed on Apr. 13, 1999, entitled ELECTRONIC BOOK ALTERNATIVE DELIVERY METHODS, all of which are incorporated herein by reference.

TECHNICAL FIELD

This invention is directed to an electronic book unit having one or more electronic books. More specifically, the invention relates to an apparatus and method for restricting access to electronic books.

BACKGROUND ART

Sparked by the concept of an information superhighway, a revolution will take place in the distribution of books. Not since the introduction of Gutenberg's movable typeset printing has the world stood on the brink of such a revolution in the distribution of text material. The definition of the word "book" will change drastically in the near future. Due to reasons such as security, convenience, cost, and other technical problems, book and magazine publishers are currently only able to distribute their products in paper form. This invention solves the problems encountered by publishers.

SUMMARY OF INVENTION

Methods and apparatus consistent with the present invention include features for restricting access to electronic books displayed on a viewer. The methods and apparatus include displaying an identification of an electronic book on a viewer, receiving information for use in restricting access to the electronic book, and restricting access to the electronic book based upon the information. The information may relate to access to the electronic book and the content of the book. Alternatively, the information may include identification of potential users of the electronic book, a rating assigned to the electronic book, selected portions of the electronic book, a particular order in which pages of the electronic book are to be viewed, a particular order in which sections of a page of the electronic book are to be viewed, or a mode of the viewer.

Many uses of the restricted access features are possible. For example, a family use electronic book may restrict children's access to particular content of an electronic book. Instructors may also use restricted access features for teaching exercises for their students. For example, they may require selection of pages or sections of pages in a particular order to facilitate a teaching process. They may also restrict access to particular content based upon, for example, an assigned order in which the students are to complete particular assignments.

BRIEF DESCRIPTION OF DRAWINGS

FIG. 5a is a flow diagram of the processing at the operations center and uplink.

FIG. 5b is a block diagram of the hardware configuration for an uplink site.

FIG. 6a is a block diagram of the hardware configuration for a four component home subsystem.

FIG. 15 is a schematic diagram of an electronic book system for a bookstore or public library.

FIG. 30a is a diagram of a page text screen.

FIG. 30b is a diagram of a page screen with selected text.

FIG. 30c is a diagram of a page screen with restricted text.

FIG. 30d is a diagram of a page text and graphics screen.

FIG. 30e is a diagram of a page screen with selected graphics.

FIG. 30f is a diagram of a page screen with restricted graphics.

FIG. 34 is a diagram of a page-based book view screen.

DETAILED DESCRIPTION

Figure 1:
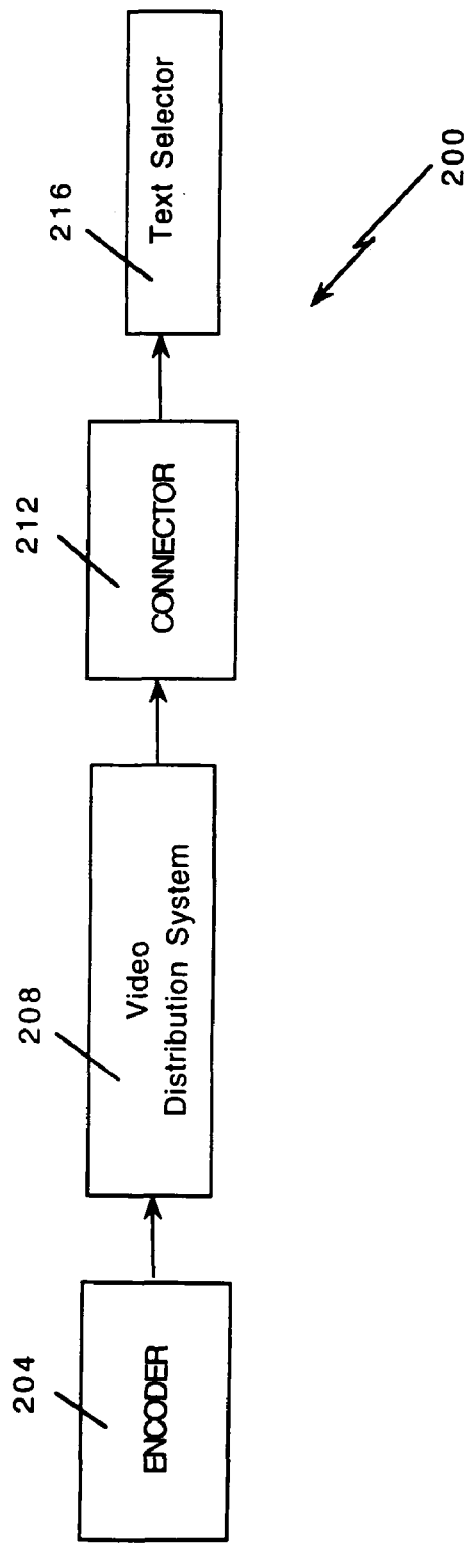
FIG. 1 is a block diagram of the primary components of the electronic book selection and delivery system.

An electronic book selection and delivery system is a new way to distribute electronic books to bookstores, public libraries, schools and consumers. The technological breakthroughs of this invention provide a secure system for both delivering selected electronic books and receiving payments. The system has an unusual combination of features that provides the consumer with an electronic book unit that has a high tech aura while being very practical, portable, and easy to use.

The clear advantage of the system is that it eliminates the distribution of any physical object such as a paper book or computer memory device from any book or text distribution system. The purchase of an electronic book may become a PAY-PER-READ™ event avoiding the overhead, "middlemen," printing costs, and time delay associated with the current book distribution system. Published material and text such as the President's speech, a new law, a court decision on abortion, or O. J. Simpson's testimony can be made immediately available to the consumer at a nominal fee.

The system is a novel combination of new technology involving the television, cable, telephone, and computer industries. It uses high bandwidth data transmissions, strong security measures, sophisticated digital switching, high resolution visual displays, novel controls, and user friendly interface software.

The primary components of the text delivery system are the subsystem for placing the text onto a signal path and the subsystem for receiving and selecting text that was placed on the signal path. A preferred embodiment of the system includes additional components and optional features that enhance the system. The system may be configured for use by bookstores, public libraries, schools and consumers.

The system for consumer use is made up of four subsystems, namely: (1) an operations center, (2) a distribution system, (3) a home subsystem including reception, selection, viewing, transacting and transmission capabilities, and (4) a billing and collection system.

The operations center performs several primary functions: manipulating text data (including receiving, formatting and storing of text data), security encoding of text, cataloging of books, providing a messaging center capability, and performing uplink functions. The system delivers the text from the operations center to consumer homes by inserting text data into an appropriate signal path. The insertion of text is generally performed with an encoder at an uplink site that is within or near the operations center. If the signal path is a video signal path, the system can use several lines of the Vertical Blanking Interval (VBI), all the lines of the analog video signal, a digital video signal or unused portions of bandwidth to transmit text data. Using the VBI delivery method, the top ten or twenty book titles may be transmitted with video during normal programming utilizing existing cable, satellite, wireless or broadcast transmission capability without disruption to the subscriber's video reception. Using the entire video signal, thousands of books may be transmitted within just one hour of air time. Nearly any analog or digital video distribution system may be used to deliver the video signal with included text.

The text data may also be transmitted over other low and high speed signal paths including a telephone network (e.g., a public switched telephone network) having a high speed connection such as an asynchronous digital subscriber line (ADSL) connection. Alternatively, other delivery systems and methods may be used, such as those disclosed in the related applications identified above.

The home subsystem performs four primary functions: connecting to the video distribution system, selecting text, storing text, and transacting through a phone or cable communicating mechanism. The components of the home subsystem may be configured in a variety of hardware configurations. Each function may be performed by a separate component, the components may be integrated, or the capability of existing cable set top converter boxes, personal computers, and televisions may be utilized. Preferably, a connector, library unit and an electronic book unit, or viewer unit, are used. The connector portion of the home subsystem receives the analog video signal and strips or extracts the text from the video. The home library stores the text signal, provides a user friendly software interface to the system and processes the transactions at the consumer home. The viewer provides a screen for viewing text or menus and novel user friendly controls. The viewer may also incorporate all the functionality of the home subsystem.

The viewing device is preferably a portable book shaped viewer which stores one or more electronic books for viewing and provides a screen for interacting with the home library unit. A high resolution LCD display is used to both read the books and to interact with the home library software. An optional phone connector or return-path cable connection initiates the telephone calls and, with the aid of the library, transmits the necessary data to complete the ordering and billing portion of the consumer transaction. The user friendly controls include a bookmark, current book and page turn button. The billing and collection system performs transaction management, authorizations, collections and publisher payments automatically utilizing the telephone system. Alternative ordering methods are disclosed in the related applications identified above.

In one embodiment, the primary components of the electronic book selection and delivery system 200 are an encoder 204, a video distribution system 208, a connector 212, and a text selector 216 as shown in FIG. 1. The encoder 204 places textual data on a video signal to form a composite video signal. Although the composite signal may contain only textual data, it usually carries both video and textual data. A variety of equipment and methods may be used to encode text data onto a video signal. The video distribution system 208 distributes the composite video signal from the single point of the encoder 204 to multiple locations which have connectors 212. The connector 212 receives the digital or analog video signal from the video distribution system 208 and separates, strips or extracts the text data from the composite video signal. If necessary, the extracted text data is converted into a digital bit stream. Text selector 216 works in connection with the connector 212 to select text.

Using a connector 212 and text selector 216 combination, various methods of selecting and retrieving desired text from a composite or video signal are possible. Text may be preselected, selected as received or selected after being received and stored. A preferred method is for the connector 212 to strip or extract all the text from the video signal and have the text selector 216 screen all the text as received from the connector 212. The text selector 216 only stores text in long term or permanent memory if the text passes a screening process described below.

Figure 2:
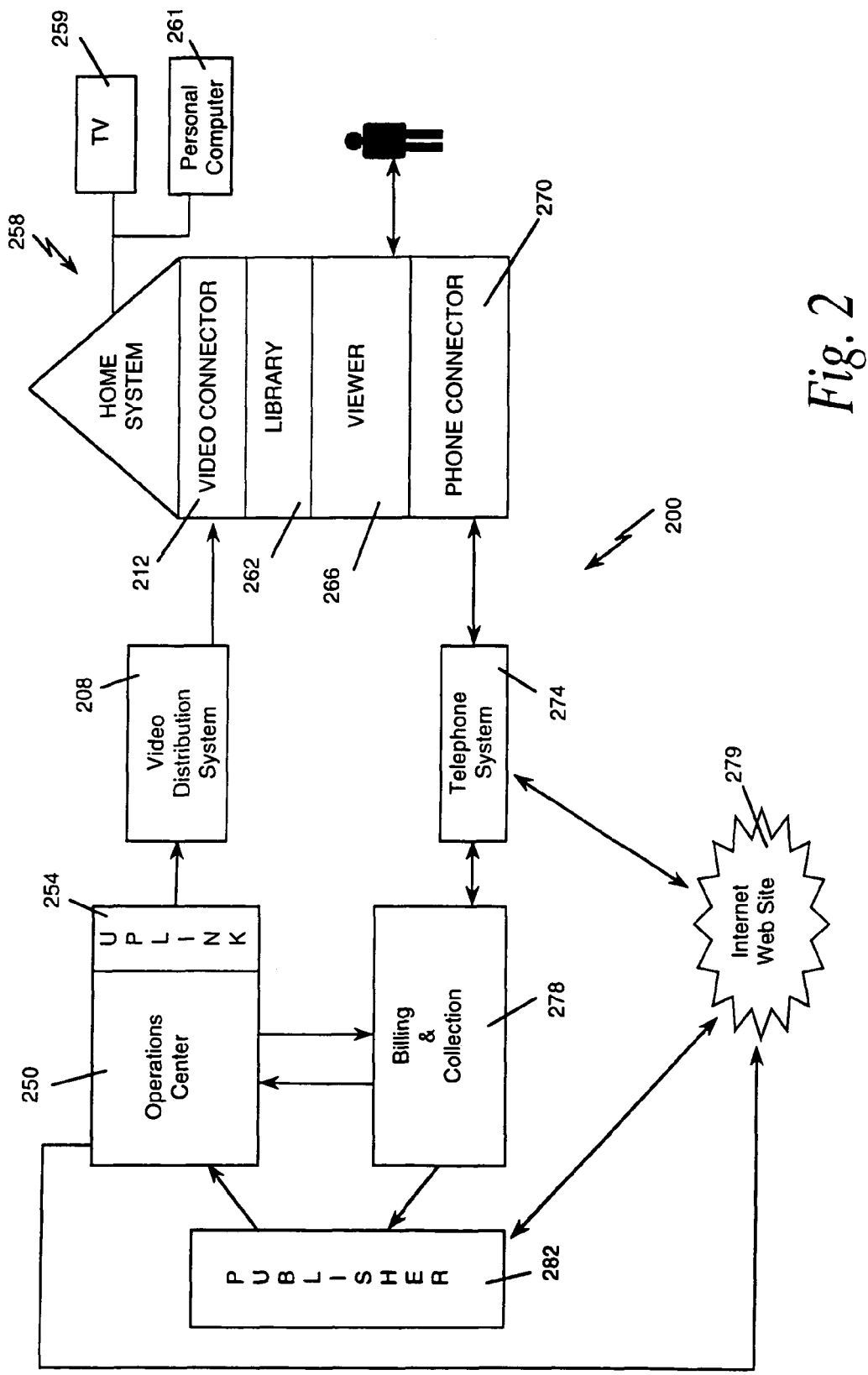
FIG. 2 is a schematic showing an overview of the electronic book selection and delivery system.

An overview of the electronic book selection and delivery system 200 is shown in FIG. 2. The delivery system 200 includes: an operations center 250 including an uplink site 254, a video distribution system 208, a home system 258 including a video connector 212, a library 262, a viewer 266, and a phone connector 270, telephone system 274, an internet web site 279 and a billing and collection system 278. Also as shown in FIG. 2, the home system 258 may include connections to a television 259 and a personal computer 261. The television 259 and the personal computer 261 may be used to display menu screens, electronic books, electronic files, or any other information associated with the delivery system 200. In addition, the television 259 and the personal computer 261 may provide control function that replicate and supplement those of the viewer 266.

The operations center 250 receives textual material from outside sources 282 such as publishers, newspapers, and on-line services. Alternately, the outside sources may maintain electronic books at the Internet web site 279. The outside sources 282 may convert textual and graphical material to digital format, or may contract with another vendor to provide this service. The operations center 250 may receive the textual and graphical material in various digital formats and may convert the textual material to a standard compressed format for storage. In so doing, the operations center 250 may create a pool of textual material that is available to be delivered to the home system 258. The textual material may be grouped by books or titles for easy access.

As used herein, "book" means textual or graphical information such as contained in any novels, encyclopedias, articles, magazines or manuals. The term "title" may represent the actual title assigned by an author to a book, or any other designation indicating a particular group, portion, or category of textual information. The title may refer to a series of related textual information, a grouping of textual information, or a portion of textual data. For example, "Latest Harlequin Romance", "Four Child Reading Books (Ages 10-12)", "Encyclopedia 'BRITANNICA'™", "President's Speech", "Instruction Manual", "Schedule of 4th of July Events", "Pet Handbooks", "Roe v. Wade", and "The Joy of Cooking" are suitable titles. Also, the title may be a graphical symbol or icon. Thus, a picture of a wrench may be a title for a repair book, a picture of a computer a title for a computer book, a graphical symbol of a telephone a title for a telephone book, a drawing of a dagger a title for a mystery book, a picture of a bat and ball a title for a sports book and a picture of tickertape a title for a business book. The term "electronic book" refers to the electronic counterpart to a "book."

The operations center 250 includes an uplink site 254 for placing the text onto a video signal and sending the composite video signal into a video distribution system. The uplink site 254 would generally include an encoder 204 (not shown in FIG. 2) to encode the text onto a video signal.

Many analog and digital distribution systems 208, or other telecommunications systems, can be used with the delivery system 200, such as a cable television distribution system, a broadcast television distribution system, video distributed over telephone systems, distribution from the Internet, direct satellite broadcast distribution systems, and other wired and wireless distribution systems.

The home system 258 performs five primary functions: (1) connecting with a video distribution system, (2) selecting data, (3) storing data, (4) displaying data, and (5) handling transactions. An important optional function of the home sub-system 258 is communicating using a telephone communication system 274. The home system 258 is made up of primarily four parts: a video connector 212 or similar type of connector for connecting with the video distribution system 208, a library unit 262 for storing and processing, an electronic book, or viewer unit, 266 for viewing menus and text and a telephone connector 270 for connecting with a telephone communications system 274. In an alternate arrangement, the viewer 266 may include all the functionality of the home system 258.

The billing and collection system 278 may be co-located with the operations center 250 or located remote from the operations center 250. In one embodiment, the billing and collection system 278 is in communication with the home system 258 via telephone-type communication systems (for example 274). Any of a number of telephone type communication systems, such as, a cellular system, will operate with the billing and collection system 278. The billing and collection system 278 records the electronic books or portions of text that are selected or ordered by the subscriber. The collection system will charge a subscriber's credit account or bill the subscriber. In addition, the billing and collection system 278 will monitor that amount due to publishers or other outside sources 282 who have provided textual data or other services such as air time to enable the text delivery system 200 to operate.

When electronic books are provided via the Internet web site 279, the billing and collecting functions may be incorporated into the Internet web site 279. For example, a subscriber may pay for an electronic book selection by entering a credit card number into a data field of a page of the Internet web site 279. In this configuration, a separate billing and collection system may not be required.

Figure 3A:
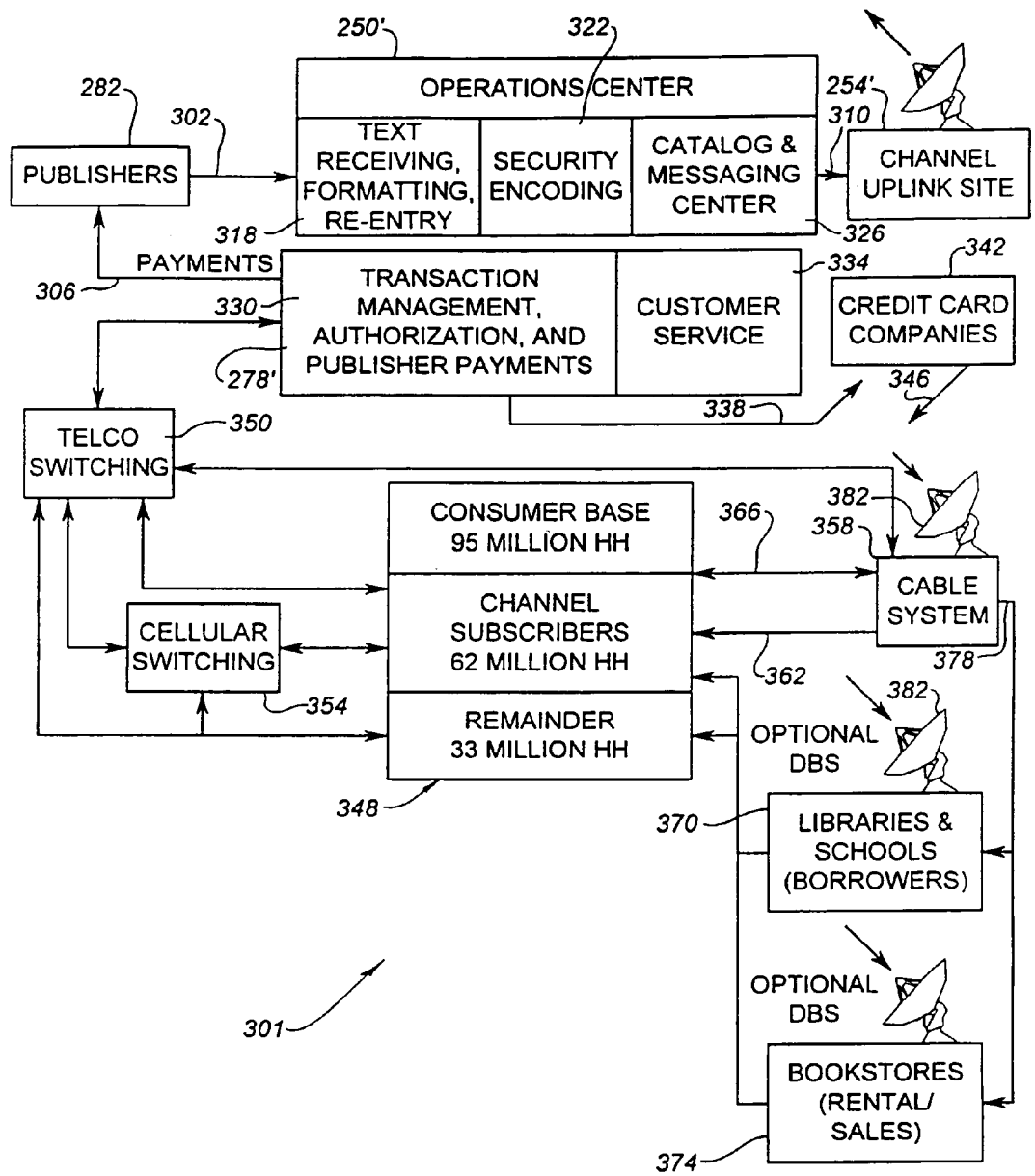
FIG. 3a is a schematic of the delivery plan for the electronic book selection and delivery system.

FIG. 3a is an expanded overview of a delivery plan 301 for the delivery system 200. The delivery plan 301 supports various types of subscribers and various billing systems. FIG. 3a shows that publishers 282 will provide text transfer 302 to the operations center 250' and receive payments 306 from the billing and collection system 278'. A separate channel uplink site 254' is shown in this configuration receiving data 310 from the operations center 250'. The operations center 250' has three separate sections (318, 322, 326) one for text receiving, formatting and re-entry 318, a second for security encoding 322 and a third section for catalog and messaging center functions 326.

The billing and collection system 278' shown has two sections (330, 334) one for transaction management, authorizations and publisher payments 330, and the other for customer service 334. The customer service section 334 provides for data entry and access to customer account information. Transaction accounting information 338 is supplied to credit card companies 342 by the transaction management section 330 of the billing and collection system 278'. The credit card companies 342 provide billing 346 to customers either electronically or by mail.

Three methods or examples for communicating between the subscriber base 348 and the billing and collection system 278' are shown: by telephone switching 350 alone, cellular (PCS) switching 354 and telephone switching 350 combined, and by use of the cable system 358 and the telephone switching 350. The system shown supports both one-way 362 and two-way cable communication 366 with subscribers. Public libraries and schools 370 as well as bookstores 374 may use the delivery system 301.

Public libraries and schools 370 would have a modified system to allow the viewer 266 to be checked-out or borrowed while bookstores 374 would rent or sell the viewer 266 and sell the electronic books. The bookstores 374 as well as the public libraries and schools 370 may be serviced by cable 378. Optional direct broadcast systems (DBS) 382 can also be used with the delivery system 200. The DBS 382 may provide the electronic books using digital satellite technology, with the electronic books being received via a backyard satellite antenna, for example.

Figure 3B:
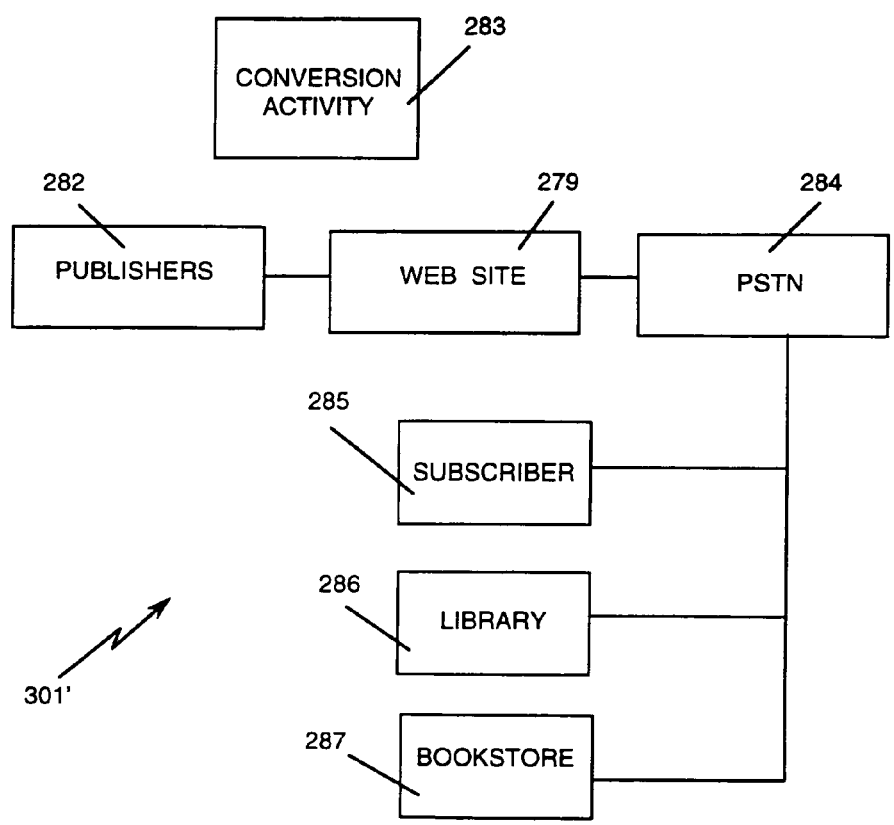
FIG. 3b is a schematic of an alternate delivery plan.

FIG. 3b is an alternate delivery plan 301' that provides for electronic book selection and delivery using the Internet. In FIG. 3b, the publishers 282 provide the electronic books to be posted at the Internet web site 279. The publishers may convert the text and graphical data to digital format, compress the digital data, and upload the compressed digital data to the Internet web site 279. Alternately, the publishers 282 may arrange for an outside conversion activity 283 to convert the text and graphical data to digital format. The conversion activity 283 may then provide the digital data to the Internet web site 279. For example, a large on-line bookstore could gather publications in electronic form from a variety of publishers, or could convert hard-copy books to electronic form, and post the electronic books on the Internet such as at the Internet web site 279.

The electronic books may then be transferred via a public switched telephone network (PSTN), for example, direct to a subscriber 285, a library 286 and a bookstore 287. The library 286 and the bookstore 287 may also provide electronic books to the subscriber 285.

I. The Operations Center

Figure 4:
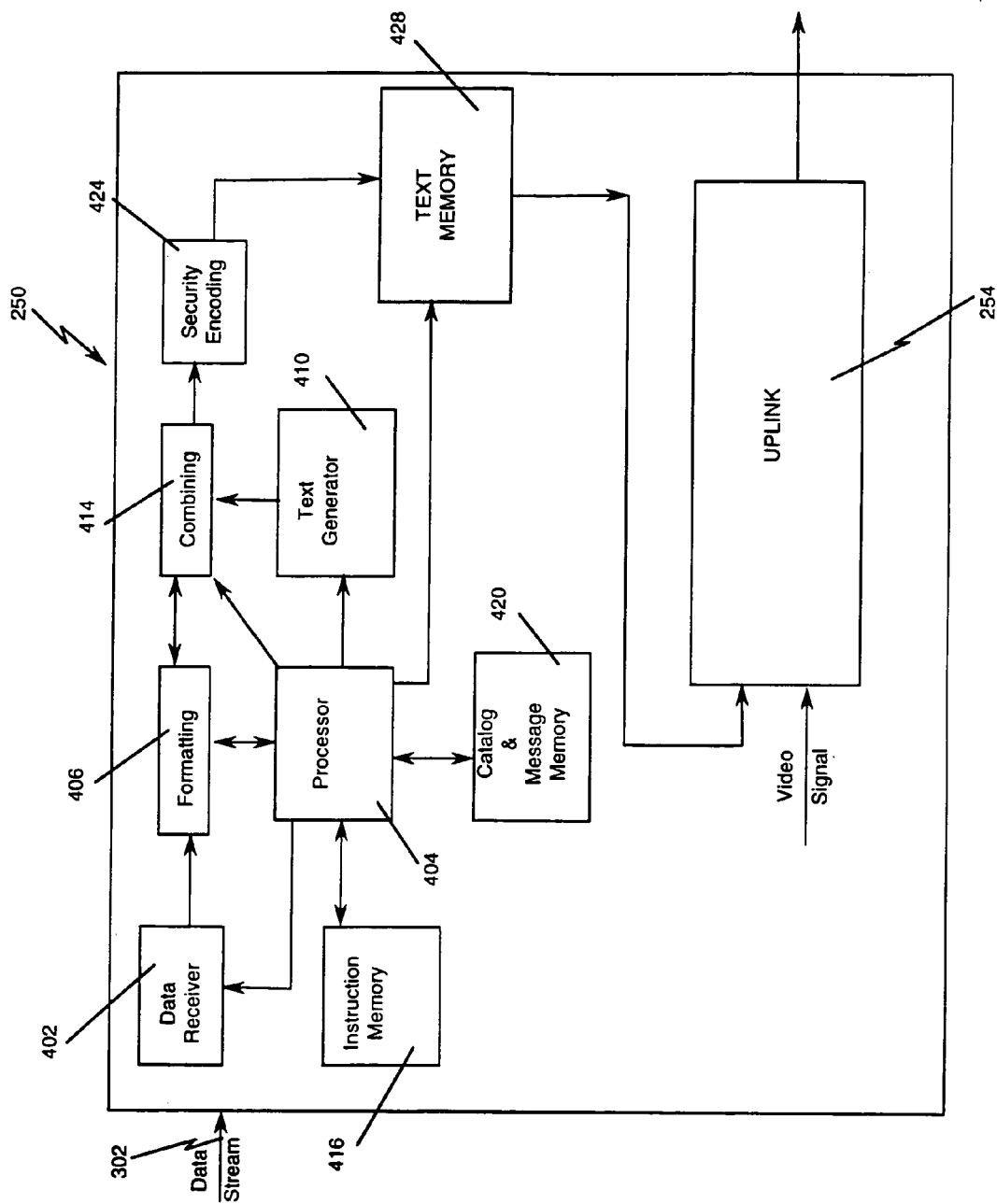
FIG. 4 is a block diagram of an operations center.

FIG. 4 is a schematic of an operations center 250 which includes an uplink 254. The operations center 250 gathers text or books by receiving, formatting, storing, and encoding. A data stream 302 containing text is received at the operations center 250 by a data receiver 402. The data receiver 402 is under the control of a processor 404. After reception, the data stream is formatted using digital logic for formatting 406 which is also under the control of the processor 404. If any additional text is being generated at the operation center 250 locally for insertion into the distributed signal, the text generation is handled through text generator hardware 410 which may include a data receiver and a keyboard (not shown). Following processing by the text generator 410, the additional text can be added to the text received by the combining hardware 414 that includes digital logic circuitry (not shown).

The processing at the operations center 250 is controlled by a processor 404 which uses an instruction memory 416. The processor 404 and instruction memory 416 may be supplied by a personal computer or mini-computer. To perform the catalog and messaging functions, the operations center 250 uses a catalog and message memory 420 and the text generator 410 if necessary.

The data stream of text, catalog and messages is preferably encoded by security module encoding 424 prior to being sent to the uplink module 254. Various encoding techniques may be used by the security encoding module 424 such as the commercial derivative of NSA's encryption algorithm (Data Encryption System (DES)) and General Instrument's DigiCipher II. Following encoding, the encoded text may be stored in text memory 428 prior to being sent to the uplink 254. A first-in-first-out text memory arrangement may be used under the control of the processor 404. Various types of memory may be used for the text memory 428 including RAM. The operations center 250 may use file server technology for the text memory 428 to catalog and spool electronic books for transmission as is described below.

To transmit textual data (i.e., electronic books), the delivery system 208 uses high bandwidth transmission techniques such as those defined by the North American Broadcast Teletext Standard (NABTS) and the World System Teletext (WST) standard. Using the WST format (where each line of the Vertical Blanking Interval contains 266 data bits), a four hundred page book, for example, may be transmitted during programming using four lines of the Vertical Blanking Interval at a rate of approximately one book every 1.6 minutes (63,840 bits per second). Alternatively, electronic books may be transmitted over a dedicated channel, which interrupts programming so that 246 lines of video can be used to transmit approximately 2,250 books every hour (3.9 Mbits per second). A teletext type format is the simplest but possibly the slowest text format to use with the delivery system 200. In either event, an encoder 204 is utilized at an uplink site 254 to insert textual data into the analog video signal. In many other respects, the delivery of the textual information is completed using existing cable television plant and equipment.

FIG. 5a is a flowchart of the steps involved in processing text from the publisher or provider 282 that occurs at the operations center 250. As shown in block 500, the publisher 282 processes data files of text for books, compresses, encrypts and sends the data files to the operations center 250 or uplink 254. Text files for books are preferably sent one book at a time. As shown in block 504, the uplink 254 or operations center 250 receives and processes the data stream from the publisher 282. Generally, part of this processing includes encryption and error correction.

As shown in block 508, files are broken into smaller packets of information. Header information is added to the packets. The bit stream is converted from a serial digital bit stream to an analog bit stream that is compatible with an NTSC video signal. Block 512 shows the switching of analog data into the video lines of a video signal. The analog data is generally placed either in the VBI or the active video lines. In some instances, it may be preferable to utilize unused portions of bandwidth (such as 5-40 MHZ, 70-75 MHZ, 100-109 MHZ or other guard bands) instead of the video lines.

FIG. 5b is an example of a hardware configuration to perform some of the functions for blocks 508 and 512. A video feed 516 is received and processed through a sync stripper 520. The stripped sync signal 532 is used by the digital logic control 524. The digital logic control 524 receives the sync signal 532 and a serial digital bit stream 528 for processing. The digital logic control 524 passes the serial digital bit stream to the Digital to Analog converter 536 and outputs a control signal 540 for the video switch 544. The video switch 544 integrates the video feed 516 and analog data stream 548 into a video feed with analog data signal inserted 552.

As an alternative to cable, satellite, broadcast, or other television delivery methods, the public telephone system may be used to transmit books to the subscribers. An average electronic book would take about 7 minutes to transmit over the public telephone system. Using the telephone system, it is not necessary to combine video and text into a composite signal. In most other respects, the operation center would remain similar whether text delivery was by telephone or cable. File server technology (such as that described in U.S. Pat. No. 5,262,875, entitled AUDIO/VIDEO FILE SERVER INCLUDING DECOMPRESSION/PLAYBACK MEANS, issued to Mincer, et al., and, U.S. Pat. No. 5,218,695, entitled FILE SERVER SYSTEM HAVING HIGH-SPEED WRITE EXECUTION, issued to Noveck, et al., incorporated herein by reference) may be used at the operation center with a telephone system text delivery method.

As another alternative to cable, television, and telephone system delivery, the public telephone system may be used to provide access to the Internet, where an Internet web site 279 may be accessed. Electronic books may be ordered, paid for, and delivered directly from the Internet web site 279 over the telephone system.

In any delivery system using the telephone system, individual subscribers may increase the electronic book deliver rate by incorporating high speed modems or other communication devices such as an Integrated Services Digital Network (ISDN) connector, or by use of an Asymmetric Digital Subscriber Line (ADSL)

II. The Home System

Figure 6B:
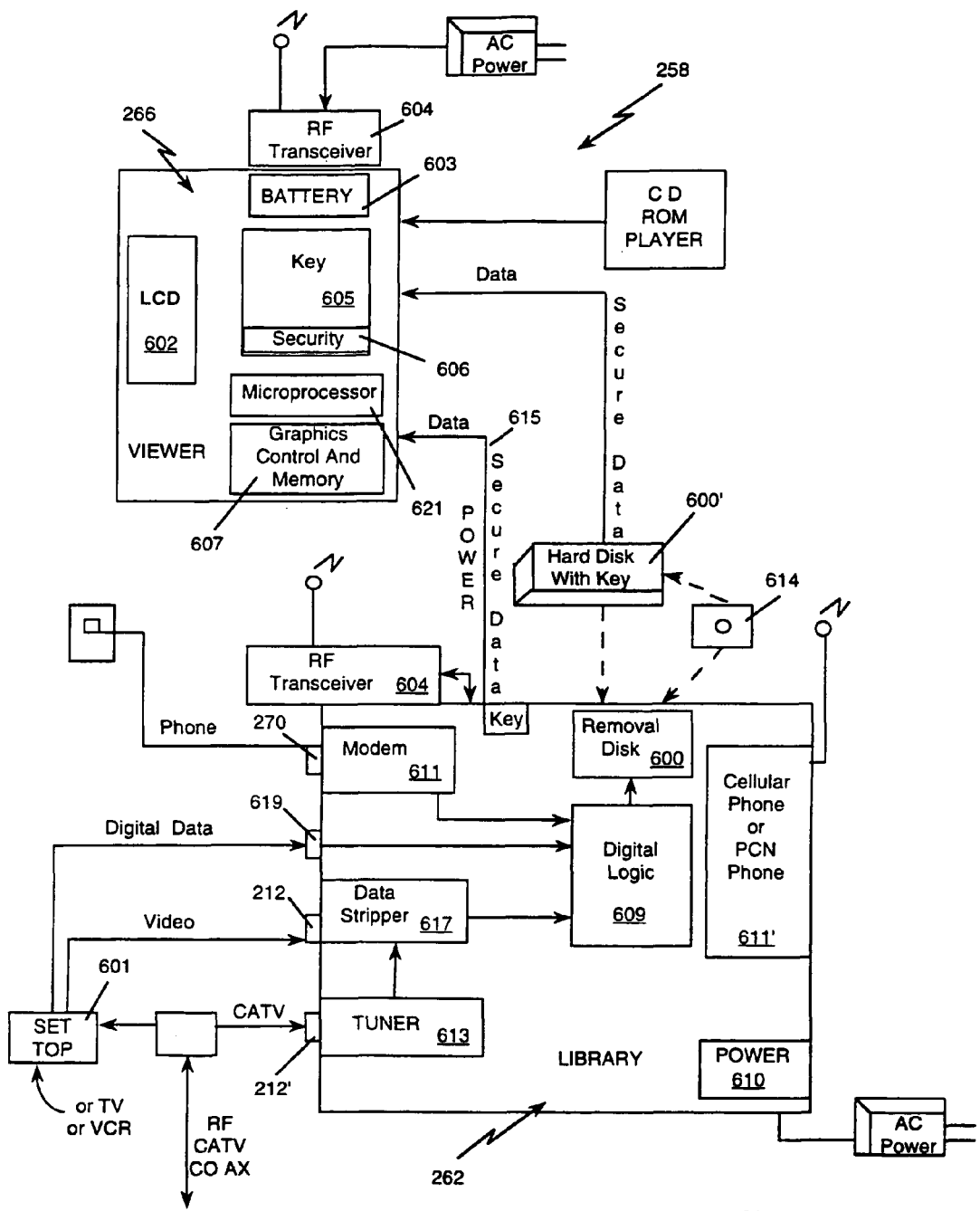
FIG. 6b is a schematic of a two unit home subsystem.

The hardware configuration for a four component home system 258 is shown in FIG. 6a. FIG. 6b shows a hardware configuration for a two component home system. The hardware components may also be incorporated into a single unit that communicates with a terminal in a television delivery system or with a telephone system by use of a modem, for example. The home system 258 performs several functions, such as receiving data and video transmissions, stripping (or extracting) the data from the video signal, screening and storing the data, providing user friendly interface controls and software, displaying menus and text, processing transactions, initiating telephone calls and transmitting billing data. Various hardware configurations may be utilized to achieve the desired functions of the home system 258. For example, as shown in FIG. 6b, the home system 258 can be configured to utilize the reception and channel tuning capability of the current installed subscriber base of cable converter boxes and televisions 601. The home system 258 can also be designed as an advanced set top terminal converter box with menu generation capability, electronic memory and a telephone modem as described in section V below.

The electronic components which make up the home system 258 can be arranged in a variety of ways. In the four unit system of FIG. 6a the viewer 266 and library unit 262 are wired together while the remaining components communicate through RF transceivers 604. In a simple version of the home system 258 there are only two units, the library unit 262 and a viewer 266. FIG. 6b shows a two unit home system 258 with certain optional features. Finally, all the functionality of the home system 258 may be incorporated into one electronic book unit, or viewer.

The viewer 266 is generally equipped with a high resolution viewing area 602, digital logic (including a key 605, security 606, and a microprocessor 621), video graphics control and memory 607, power supply circuitry 602 (not shown), an optional battery 603 and an optional RF transceiver 604. In a two unit arrangement, the library unit 262 contains the connector function to the video distribution system 208, connector function to a public telephone communications system, and memory 600 (which may be removable and portable 600'). More specifically, the library unit 262 would include data stripping functions 617, digital logic 609, memory storage 600, power circuitry 610, optional telephone connections 611 (including cellular or PCN 611'), optional battery (not shown), optional tuner module 613 and an optional RF transceiver 604. The video connector 212 and the public telephone system connection 270, as well as the removable portable memory unit 600 of the library unit 262 may be broken out into separate components. (FIG. 6b shows a removable portable hard disk memory 600' with removable cartridges 614.) Finally, the home system 258 may include an attached keyboard 267 or a wireless keyboard 268. Both the attached keyboard 267 and the wireless keyboard 268 may be used to communicate with the viewer 266 (not shown) or the library unit 262.

The wireless keyboard 268 may communicate via radio frequency (RF) signaling, for example. Therefore, the home system 258 may have as many as six separate components which communicate with each other. The two, three, four, five or six separate components which make up the home system 258 can communicate with each other in a variety of ways, including hardwired connection 615, RF transceiver 604, and other wireless methods.

RF communications are preferred in the home because they allow separate components to be located throughout the home without restriction. The data communicated between the units is preferably secure data. In addition, the library unit 262 may provide power to the viewer 266 through the hardwired connection 615.

Alternatively, a single unit may perform all of the home system 258 functions. The single unit should use light-weight materials, including a light-weight battery. A single unit eliminates the need to communicate (externally) between units. The single unit is less expensive and eliminates duplicative processing, memory storage and power circuitry.

To receive and strip the data from the video signal at the consumer's home, either a cable interface device or cable connector 212 is used. The cable connector device includes a tuner 613, while the cable interface device makes use of existing tuning equipment in the home. In either configuration, data is stripped from the video signal and stored at the subscriber's location in the library unit 262. The phone connector 270, and modem 611 initiate telephone calls and transmit ordering and billing information to the operations center 250 or billing and collection system 278. Alternatively, the phone connector 270 and the modem 611 may be used to provide access to the Internet to order and receive electronic books from an Internet web site. A digital connector 619 is provided to communicate digital information with the set top 601. The library unit 262 is the intelligent component of the home system, incorporating the hardware and software necessary to store the text data, generate menus and effect the purchase transactions. In addition to an RF transceiver 604, the library unit 262 also includes the necessary jacks and connections to allow the delivery system 200 to be connected to the viewer 266. As shown in FIG. 6b, the library 262 communicates the text data (electronic book) to the viewer 266 in a secure format which requires a key 605 for decryption. The text is generally only decrypted page by page just before viewing.

a. The Video Connector

Figure 7:
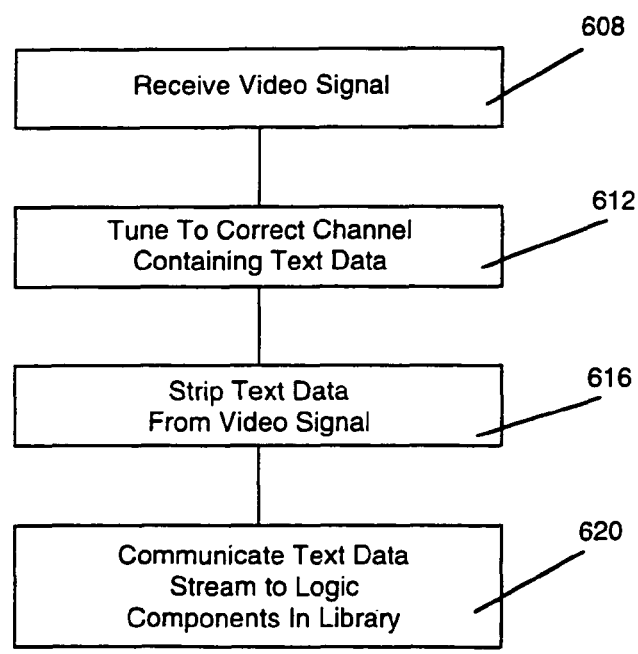
FIG. 7 is a flow diagram of the processes performed by the video connector.

FIG. 7 shows the flow of the processes performed by the video connector 212. The video connector receives the video signal 608, tunes to the channel containing the text data 612, strips the text data from the video signal 616, and communicates the text data stream to logic components in the library 620.

The connection to the video distribution system is preferably a cable connector to a cable television delivery system, as shown in FIG. 6b. The cable connector includes a data stripper circuit 617, which accepts video input from either a set top converter, TV or VCR 601, or an optional tuner block 613 that receives the CATV signal through the cable connector 212'. The data stripper circuit 617 strips data out of the video, and outputs a digital bit stream to the digital logic portion 609 of the library unit 262. The data is embedded in the video signal either in the vertical blanking interval or the active video portion in an encrypted and compressed format. The data stripper circuit 617 can be placed inside the set top converter box 601, TV, or in the library unit. The data stripper circuit 617 outputs the digital bit stream to be used by the library digital logic 609.

The video connector 212 may also contain a channel tuner module 613 that can tune to the video channel and provide access to the video that contains the data to be stripped. Using the optional tuner module 613, a set top converter, VCR, or TV tuner is not needed in the home system. The optional tuner module 613 would instead receive the CATV signal directly through the cable connector 212.

b. Library

Figure 8:
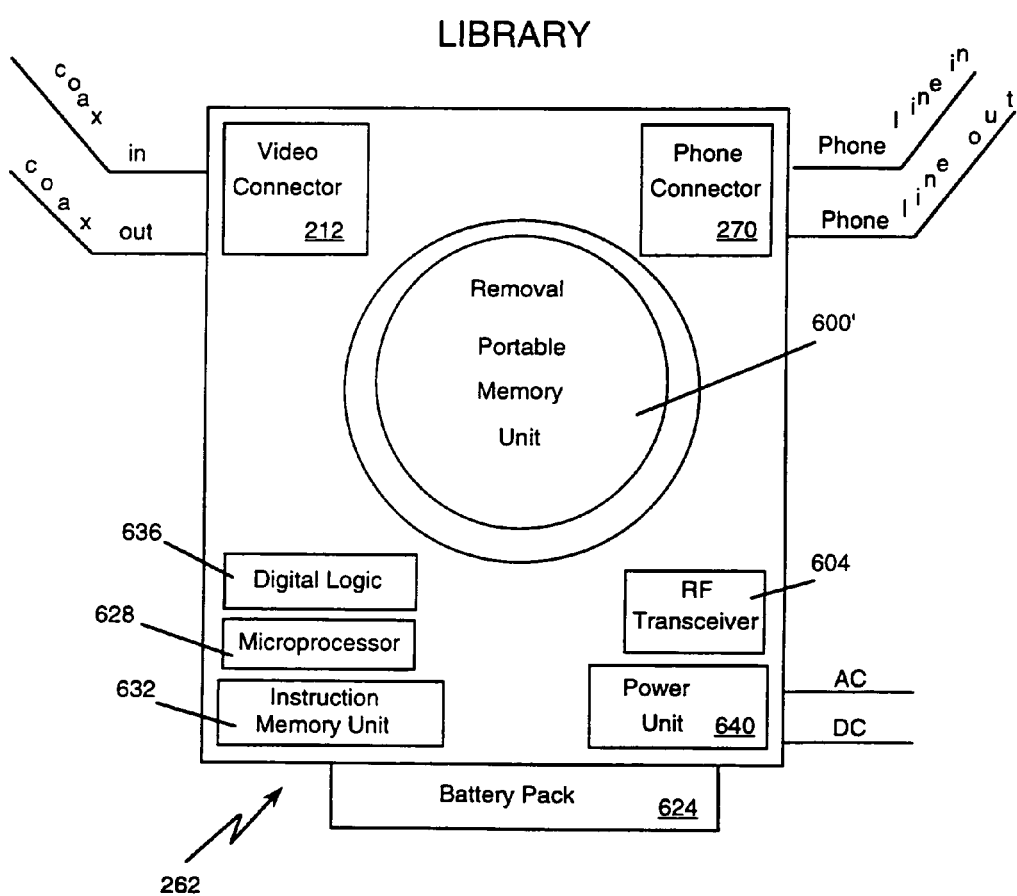
FIG. 8 is a block diagram for an example of a library unit.

An embodiment of the library unit 262 for a two unit home system 258 is shown in both FIG. 6b and FIG. 8. The embodiment shown includes the following optional parts: the video connector 212, phone connector 270, RF transceiver 604, and battery pack 624 in addition to a removal portable memory 600', microprocessor 628, instruction memory unit 632, digital logic 636, and power unit 640.

The library unit 262 contains a digital logic section 609 (not shown in FIG. 8) which includes the microprocessor 628, the digital logic 636 and the instruction memory unit 632. The microprocessor 628 is preferably a secure microprocessor such as the Mot SC21 device sold by Motorola. The digital logic section 609 will receive the serial digital bit stream from the data stripper circuit 617 and process the data. Error correction will also be performed by the digital logic section 609 and the data will be checked for proper address. If the address of the data is correct and the library unit 262 is authorized to receive the data, the data will be transferred to the memory storage unit 600, 600'. Authorization to receive the data is provided by the cable headend or another distribution point. An authorization code may be sent in the serial digital bit stream. The digital logic section 609 will send appropriate text and graphical data to the memory storage unit 600, 600'. It transfers this data in a compressed and encrypted format and the data remains stored in a compressed and encrypted format.

i. Memory Storage Unit

The memory storage unit of the library may be a removable portable memory unit 600' (as shown in FIGS. 6a, 6b and 8). A variety of options are available for memory storage: a hard disk drive, a hard disk with removable platters, and a CD ROM or memory stick. Referring to FIG. 6b, a hard disk drive unit 600' which contains removable platters may also be used. This would provide virtually unlimited library storage capacity. Data (i.e., electronic book files) may be stored in the memory storage unit in a compressed and encrypted format. As is also shown in FIG. 6b, the data may also contain a key or unique ID number that matches the ID or key of the viewer 266. This matching of a unique key or ID number prevents unauthorized transfer of text data from the memory storage unit to an unauthorized viewer. Small memory devices such as smart cards, electronic memory cards or PCMCIA cards (personal computer memory card industry association) or memory sticks may also be used to store the data.

ii. Power Circuitry

As shown in FIGS. 6b and 8, the library unit 262 may accept power from either AC wall power 610, DC power 640, or optional battery power 624. The power circuitry 610, 640 may provide all the voltage necessary from either the battery 624 or AC unit for the various circuitry in the library. The power circuitry 610, 640 may also provide power to the viewer 266 through a single data cable when connected to the viewer. The power circuitry 610, 640 will recharge the battery using AC power when in operation. With the optional battery unit 624 installed, the library unit 262 becomes a portable unit and can still provide power to the viewer 266. In order to extend battery life, power conservation measures may be utilized, such as shutting down the memory system when not in use. When the viewer 266 is being utilized and the library circuitry is not being utilized, virtually all power may be shut down to the library unit 262.

iii. Connection to the Public Telephone System

The connection to the telephone system may be provided by a modem 611. Various available modems may be used to perform this function. As shown in FIG. 6b, cellular phone or PCN phone connections 611' may also be provided. When the home system 258 is first initialized, the modem may be used to transfer the name and credit card information of the consumer to the billing and collection system 278. The telephone connection 270 may be utilized each time an electronic book is purchased by a consumer to complete and record the transaction. The telephone connection 270 may also be used as a means for receiving the electronic books from the operations center 250 or from an Internet web site, by-passing the video distribution system 208. The phone connection 270 may be a separate unit as shown in FIG. 6b.

iv. Library Processing

Figure 9:
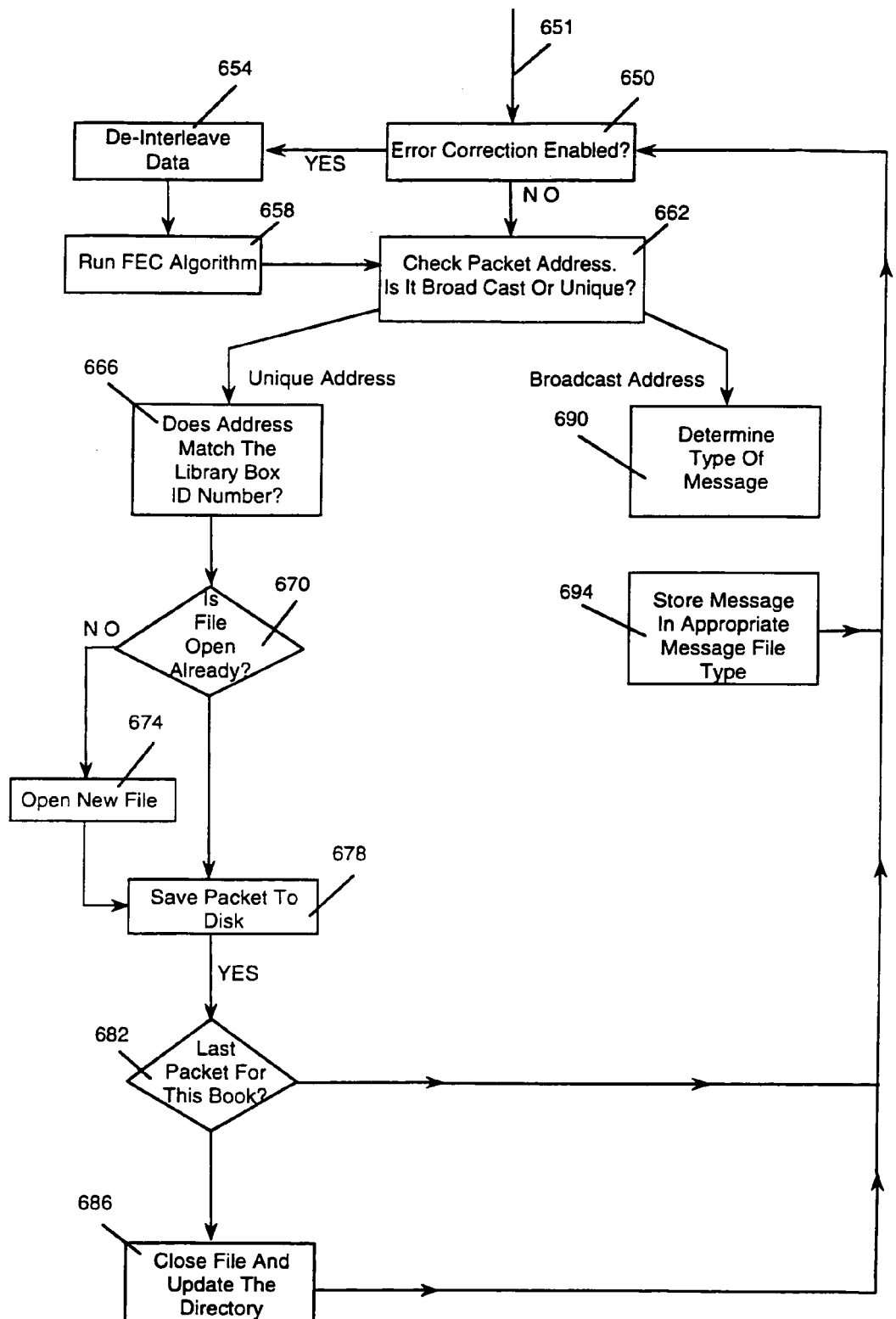
FIG. 9 is a flow diagram of some of the processes performed by the library on the received data stream.

FIG. 9 shows an example of some basic processing performed by the library unit 262 on the data stream 651 received from the video connector 212 or stripper circuit 617. First the data stream 651 is checked for error correction by block 650. If an error is detected, block 654 de-interleaves the data followed by block 658 running a FEC (Forward Error Correcting) algorithm. The combination of block 650, 654 and 658 perform the error correction needed on the data stream. If no error correction is necessary the data proceeds to block 662 where packets are individually checked for packet address.

If the address is a unique address, block 666 checks whether the address of the packet matches the library box ID number. The library box ID number is a unique number associated with that library unit 262 which is used to ensure security of the data. Block 670 determines whether an electronic file has already been opened into which the data packet can be saved. If no data file has been opened then block 674 opens a new data file for that packet. If an electronic file has been opened, then the packet is saved in that electronic file on disk, block 678. Next, the process checks to see if this is the last packet for a particular book for a particular textual data block being received 682. If it is the last packet of information, then the electronic file is closed and the directory of available electronic files is updated 686. Following either block 682 or 686, the process returns to receive another data packet from the data stream received from the data stripper block.

If the packet address is checked and the address is determined to be a broadcast address, the process determines the type of message that is being sent 690. The message may be an index of book titles, menu (and menu graphics) information, announcements, special offerings, discounts, promotions, previews etc. The message is then stored in appropriate electronic message file 694 and the process is returned to block 650 to receive another data packet and perform another error check.

Using the process of FIG. 9, the library unit 262 is able to receive, store and update directories related to the textual data and graphical data (that can be used to depict pictures in a given book or to generate menus). Variations of the processes are possible depending on the format of the data and operating system of the library unit 262.

Figure 10:
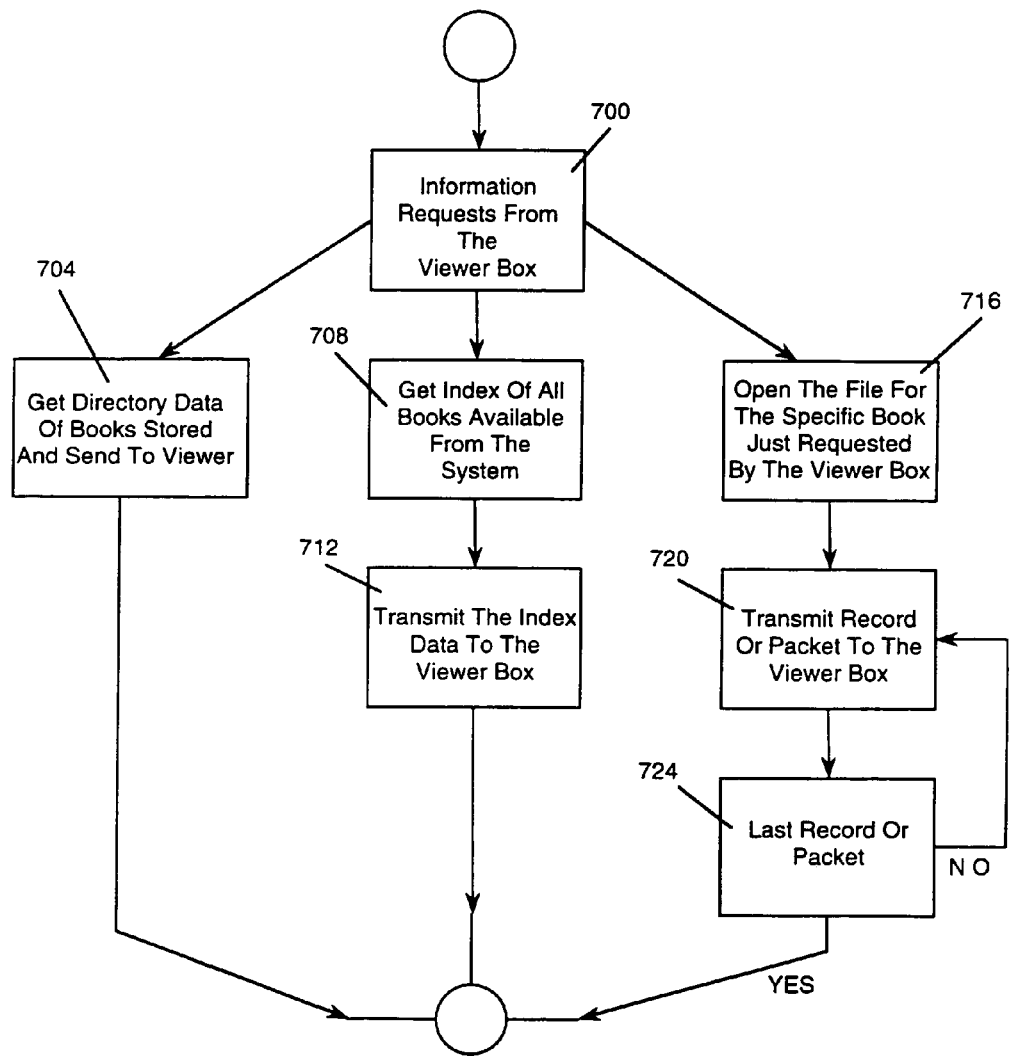
FIG. 10 is a flow diagram of the processes performed by the library unit on information requests from the viewer.

FIG. 10 shows an example of the processing of information requests from the viewer 266 at the library unit 262. Information requests from the viewer 266 are received either through the cable connecting the viewer 266 to the library unit 262 or through wireless transmissions such as RF. It is possible in some embodiments for subscribers' requests to come from a set top converter box 602 (see Section V).

Information requests received from the viewer 266 generally fall into three categories: (1) directory data of electronic books stored in the library unit 262, (2) index of all available electronic books on the system, and (3) requests for a specific electronic book (Block 700). A get directory process 704 answers a request from the viewer 266 for a directory of data showing the electronic books stored at the viewer 266. The directory of data is sent to the viewer 266 so that it may be displayed to the subscriber. A get index process 708 handles requests from the viewer 266 for an index of all available electronic books on the home system 258. The library unit 262 will obtain an index of all the available books on the system and transmit that index, process 712, with menu information to the viewer 266. An open file process 716 replies to a request from the viewer 266 for a specific electronic book. The library unit 262 opens an electronic file for the specific electronic book requested by the viewer 266 and preferably transmits the record or transmits the information 720 on a packet-by-packet basis to the viewer 266. This process of transmitting the specific electronic book, record, or packets to the viewer 266 continues until the last record or packet has been sent, 724.

In addition to the processes shown on FIG. 10 in handling a request for a specific electronic book, the library unit 262 also orders and receives specific electronic books from the operations center 250 using the process as described in the open file process 716. Following a request for a specific electronic book which is not stored at the library unit 262, the library unit 262 will proceed to determine the next available time the electronic book will be on the video distribution system 208 and ensure reception and storage of that electronic book (process not shown). In performing this process the library unit 262 will transmit to the viewer 266 information on when it will obtain the text data for the electronic book so that the subscriber may view the electronic book. In addition to timing information, price and other ordering information may also be passed by the library unit 262 to the subscriber.

c. The Viewer

Figure 11:
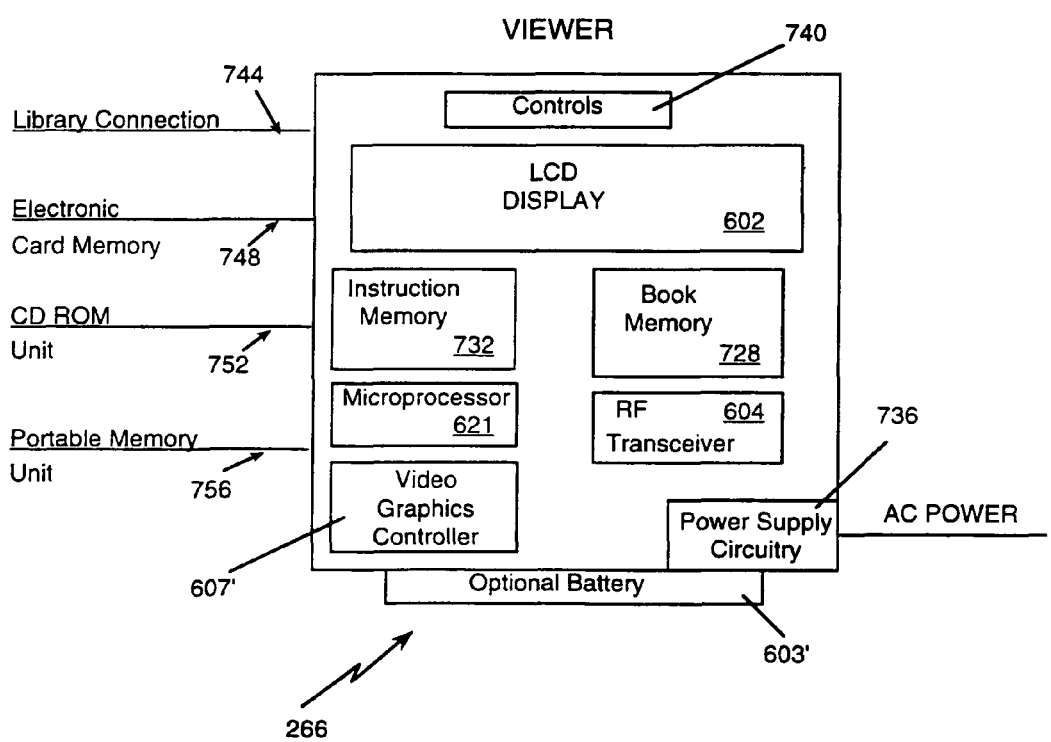
FIG. 11 is a block diagram showing the components for an example of a viewer.

FIG. 11 is a block diagram of the viewer 266 showing its internal components. The viewer 266 of FIG. 11 is similar to the viewer 266 depicted in FIG. 6b. The viewer 266 is designed to physically resemble a bound book. The viewer 266 is made up of five primary components and six optional components: (1) LCD display 602, (2) digital circuitry (not shown), (3) video graphics controller 607', (4) controls 740, (5) book memory 728, (6) optional power supply circuitry 736, (7) optional battery 603', (8) optional RF transceiver 604, (9) optional cellular or mobile communicator (608), (10) optional keyboards 267 and 268, and (11) a speaker/microphone 608'.

(1) A high resolution LCD screen 602, preferably of VGA quality, is used by the viewer 266 to display text and graphic images. The screen is preferably the size of one page of a book. A two page screen or two screens may also be used with the viewer 266.

(2) Digital circuitry that includes a secure microprocessor 621, instruction memory 732, and digital logic. Data is transferred to the viewer 266 in compressed and encrypted format. The secure microprocessor 621 compares the ID number of the viewer 266 with the incoming data stream and only stores the text data if the ID number of the viewer 266 matches that within the incoming data stream. It is preferred that the viewer 266 not output text data or other data and that the data is decompressed and decrypted only at the moment of viewing and only for the current page being viewed. These measures are preferred because they provide additional security against unauthorized access to data.

(3) A video graphics controller 607' that is capable of assisting and displaying VGA quality text and graphic images is included in the viewer 266. The graphics controller 607' is controlled by the digital circuitry described above. Text may be displayed in multiple font sizes.

(4) The viewer 266 of FIG. 11 has touch panel controls 740. These unique and novel controls 740 allow the consumer to select stored electronic books and electronic books from catalogues, move a cursor, and turn pages in a book. Typically, preferred controls 740 include forward and reverse page buttons 742, 741, a ball (or trackball) 743 for cursor movement, one or more selection buttons 745, a current book button 747 and a bookmark button 749 (see FIG. 14a).

Figure 14A:
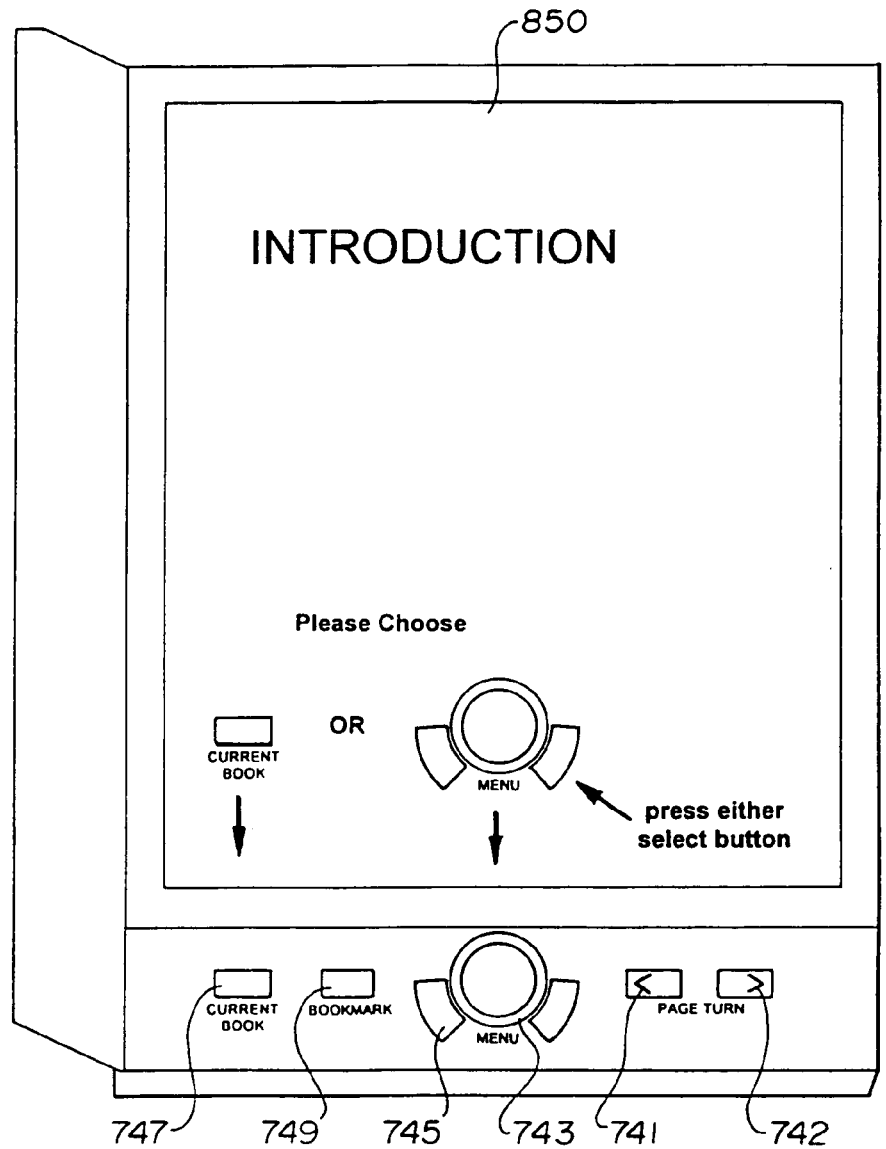
FIG. 14a is a schematic of an introductory menu.

The controls 740 should be easy to use and conveniently located. Referring to FIG. 14a, the controls for the viewer 266 may be located below the screen 602 at the bottom portion of the viewer 266. The next page turn button 742 is the most used button 740 and may be located towards the right edge of the page. The subscriber is likely to use right hand thumb movements to work the controls particularly the page turn buttons 741, 742. Therefore, it is preferred that the buttons be arranged in such a manner that the buttons are easily controlled by a subscriber's right thumb. Generally, this can be accommodated either on the lower portion of the viewer 266 (as shown) or along the right hand margin of the viewer 266 (not shown). The current book button 747 and bookmark button 749 are usually the least used of the controls 740. Therefore, in the example shown those buttons 747, 749 are located on the inside portion towards the binder of the viewer 266.

Locating the ball 743 or other cursor movement device (such as four pointer arrows—not shown) in the bottom center of the viewer 266 is both easier for the subscriber to use and easier in manufacturing the viewer 266. The selection buttons for the cursor 745 are preferably located below the middle diameter of the cursor ball 743 on the right and left sides of the ball as shown. If pointer arrows are used for cursor movement, a selection button 745 may be located in the center of the four arrow buttons (not shown). Again, the most used controls should be located where a subscriber's right hand thumb would normally rest.

(5) Book memory 728 for at least one electronic book or more of text is included in the viewer 266. The memory 728 stores text and any graphics which represent pictures in a book. The memory 728 can also store menu graphics data. Two different memory 728 devices may be used in the viewer 266, one for the instructions for the microprocessor 621 in the digital circuitry and a second type of memory may be used for the book memory 728 (and graphics). Various memory devices available on the market may be used such as, ROM, RAM or a small hard disk. Since an electronic book requires approximately 0.6 megabytes of storage, a small hard disk providing approximately 60 MBytes of storage provides memory to store approximately 100 electronic books. The large hard disk drives currently available allow for storage of thousands of electronic books.

Text for books may be displayed in various font sizes. To accommodate various fonts for display, a variety of fonts are stored in instruction 732 or book memory 728. Thus larger or smaller fonts may be recalled from memory 621, 728 to create displays desired by the subscriber.

(6) Power supply circuitry 736 in the viewer 266 will accept power from either an AC power source or from an optional battery 603', or the library unit 262. The power supply circuitry 736 provides the necessary voltages to accommodate the various systems within the viewer 266.

(7) An optional battery 603' is provided in a preferred embodiment. The battery 603' is automatically recharged when AC power is available.

(8) An optional RF transceiver 604 which provided two-way data link between the viewer 266 and other components of the home system can also be included in the viewer 266.

(9) Also, the viewer 266 may include a cellular transceiver for mobile communications.

(10) The optional wired (attached) keyboard 267 and wireless (e.g., RF) keyboard 268 (see FIG. 6*a*) may be used with the viewer 266 to provide communications between the subscriber and the viewer 266.

(11) The speaker and microphone 608' allow the viewer 266 to provide audio signals to the subscriber, and allow the subscriber to provide an audio input. The speaker and microphone 608' may be used in conjunction with the cellular transceiver 608 or other telecommunications equipment to provide for reception and transmission of telephony and data.

The viewer 266 of FIG. 11 has parts available for providing connections to: a library 744, electronic card memory 748, CD ROM units 752, and a portable memory unit 756 (such as that shown in FIG. 6*b* 600'). Various electronic memory cards such as PCMCIA can be used with this viewer 266.

Security, low power consumption and excellent display technology are desired features of the viewer 266 design. The viewer 266 should be lightweight and portable. The viewer 266 contains a software operating system that allows electronic books to be stored, read and erased and includes the capability to order electronic books and retain them in memory 728 for a predefined period of time determined by the system operator. The software can be configured to allow the electronic book to be read during a period of time (i.e., two weeks) and then automatically erased, read once and erased, or held in memory permanently. Each viewer 266 has a unique key 605. All of the data storage is encrypted with the key 605 for an individual viewer 266 to prevent more than one viewer 266 accessing the text file or electronic book file.

Figure 12:
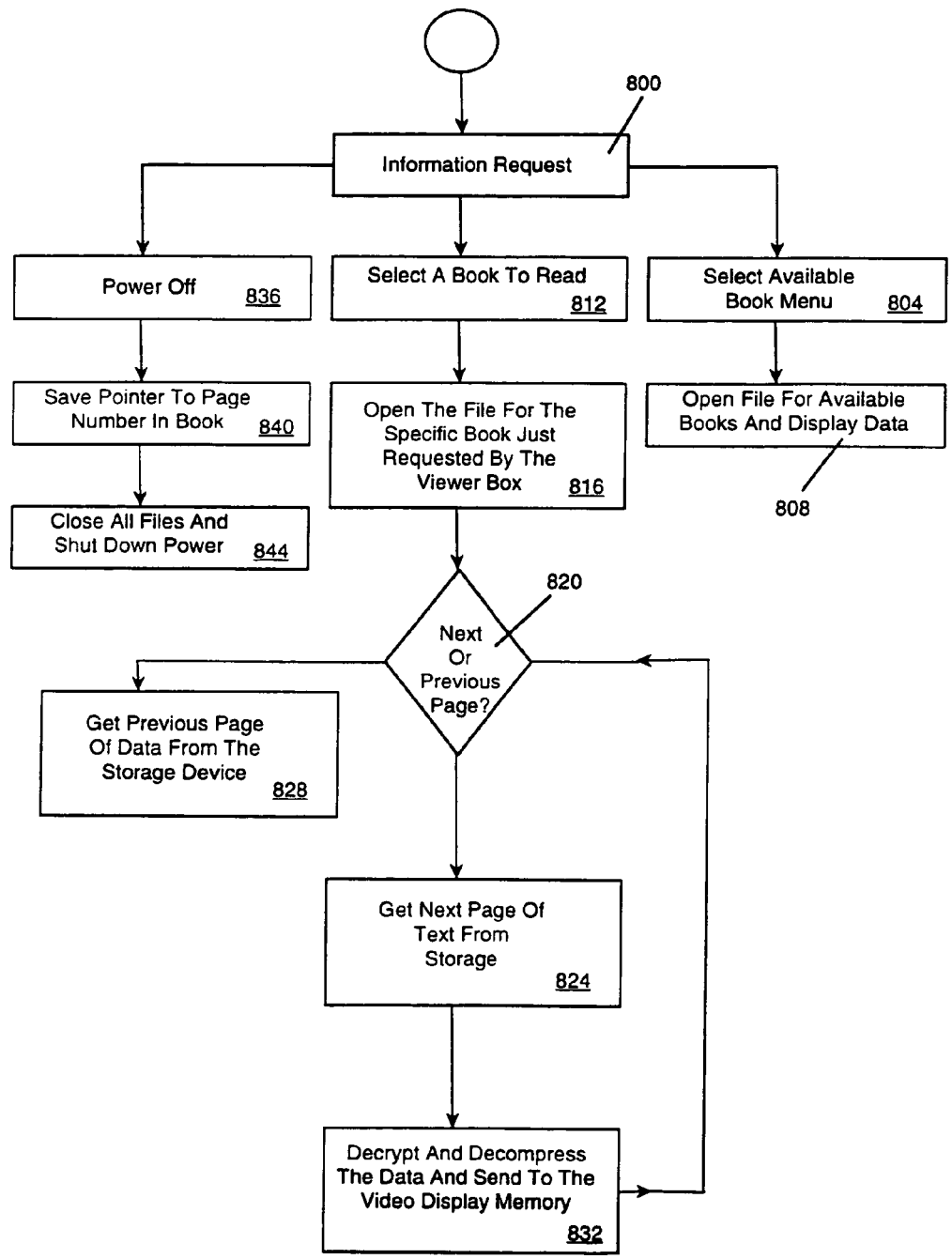
FIG. 12 is a flow diagram of some of the processes performed by the viewer on an information request from a subscriber.

FIG. 12 is a flow diagram of some of the processes executed by the viewer 266. Generally, the viewer 266 receives inputs from the subscriber through touch panel controls 740. Alternately, the viewer 266 receives inputs from a touchscreen display, the attached keyboard 267, or the remote keyboard 268. The subscriber's information requests are then processed through an information request process 800 by the viewer 266.

If the subscriber requests a menu of available electronic books, a select available book process 804 will select a book menu. An open file process 808 will open the electronic files which list the electronic books that are available (related to the category of topic of the menu) and display the menu with the names of the available electronic books.

If the subscriber selects a particular electronic book to read, then a select a book process 812 will process the selection and determine the electronic file that contains the specific electronic book. An open file process 816 will open the file for that specific book and normally access the first page. (If a pointer has already been set in that electronic book's file, the process may default to that page.) A decision process 820 will then determine which page needs to be displayed. The decision process 820 will determine whether a next page, previous page or a book marked page needs to be displayed. If the pointer for the electronic file is not in the correct location then a get previous page process 828 will move the pointer and obtain the previous page of data from the stored file. Otherwise, a get next page process 824 will normally obtain the next page of text from the stored electronic file. A decrypt and decompress process 832 will decrypt and decompress the text data and send the data to the video display. The video display will generally have a video display memory associated with it and the decrypt and decompress process 832 will send the data directly to that video display memory. The circuitry for the display then completes the process of displaying the page of text.

If the subscriber, through the controls 740, requests (from the information request process 800) that the power be turned off, then a process, 836, of turning the power off will be initiated. A save pointer process 840 saves the pointer in memory to the page number in the book that the viewer 266 is currently reading. A close files process 844 closes all the electronic files and signals the power circuitry to shut down the power to the various circuits in the viewer 266. The subscriber may also use the controls 740 to access other electronic files using electronic links embedded in a particular electronic file. An electronic link system will be described later in detail.

With these examples of basic processes the viewer 266 is able to display book selections and display text from those books.

d. Menu System

Figure 13:
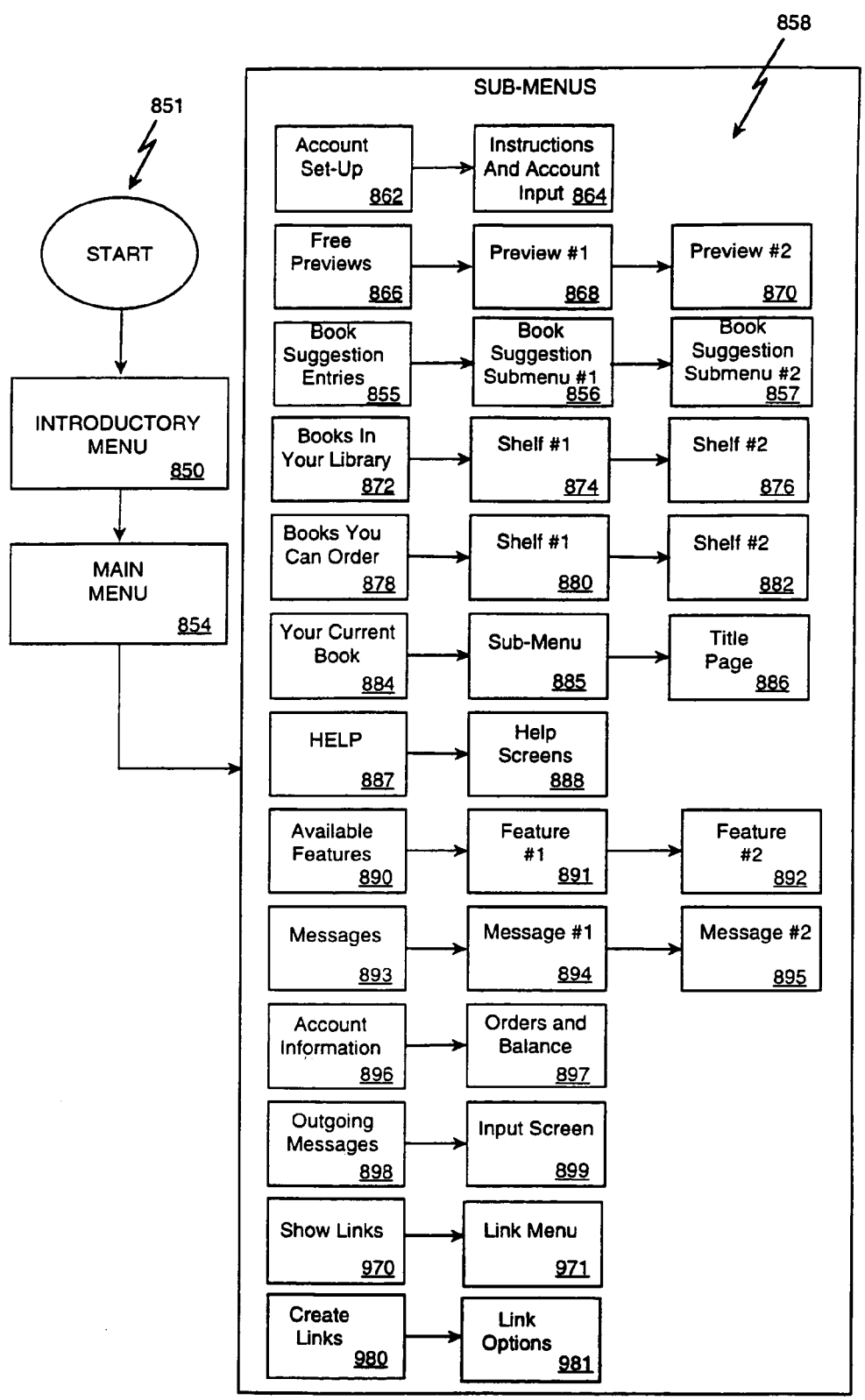
FIG. 13 is a chart depicting the menu structure and sequencing of menus in the menu system.

Referring generally to FIG. 13, the delivery system 200 may have a menu system 851 for selecting features and electronic books from the delivery system 200. The operating software and memory required for the menu system 851 may be located at the viewer 266 (e.g., the instruction memory 732 and/or book memory 728). However, it may also be located at the library unit 262 (e.g., the instruction memory 632) or the library unit 262 and the viewer 266 can share the software and memory needed to operate the menu system 851. Since the menus are usually displayed on the viewer 266 and it is preferred that the viewer 266 be capable of operating in the absence of the library unit 262, the basic software and memory to create the menus is more conveniently located at the viewer 266.

The menu system 851 allows sequencing between menus and provides menu graphics for graphical displays such as on the LCD display 602 of the viewer 266. In a system which uses a set top converter these menus may also be displayed on a television screen. In the simplest embodiment, the menus provide basic text information from which the subscriber makes choices. In more sophisticated embodiments, the menus provide visual displays with graphics and icons to assist the subscriber.

FIG. 13 depicts a menu system 851 with sequencing. The primary menus in the system are an introductory menu 850, a main menu 854 and various submenus 858. In the embodiment shown, there are three levels of submenus 858. In certain instances one or two submenus 858 is sufficient to easily direct the subscriber to the selection or information requested. However, there are features in which three or more submenus 858 make the user interface more friendly for the subscriber. Each level of submenus 858 may consist of multiple possible menus for display. The particular menu displayed depends on the selection by the subscriber on the previous shown menu. An example of this tree sequence of one to many menus are the help submenus 887, 888. Depending upon the specific help requested, a different level two help menu is displayed to the subscriber.

Figure 14B:
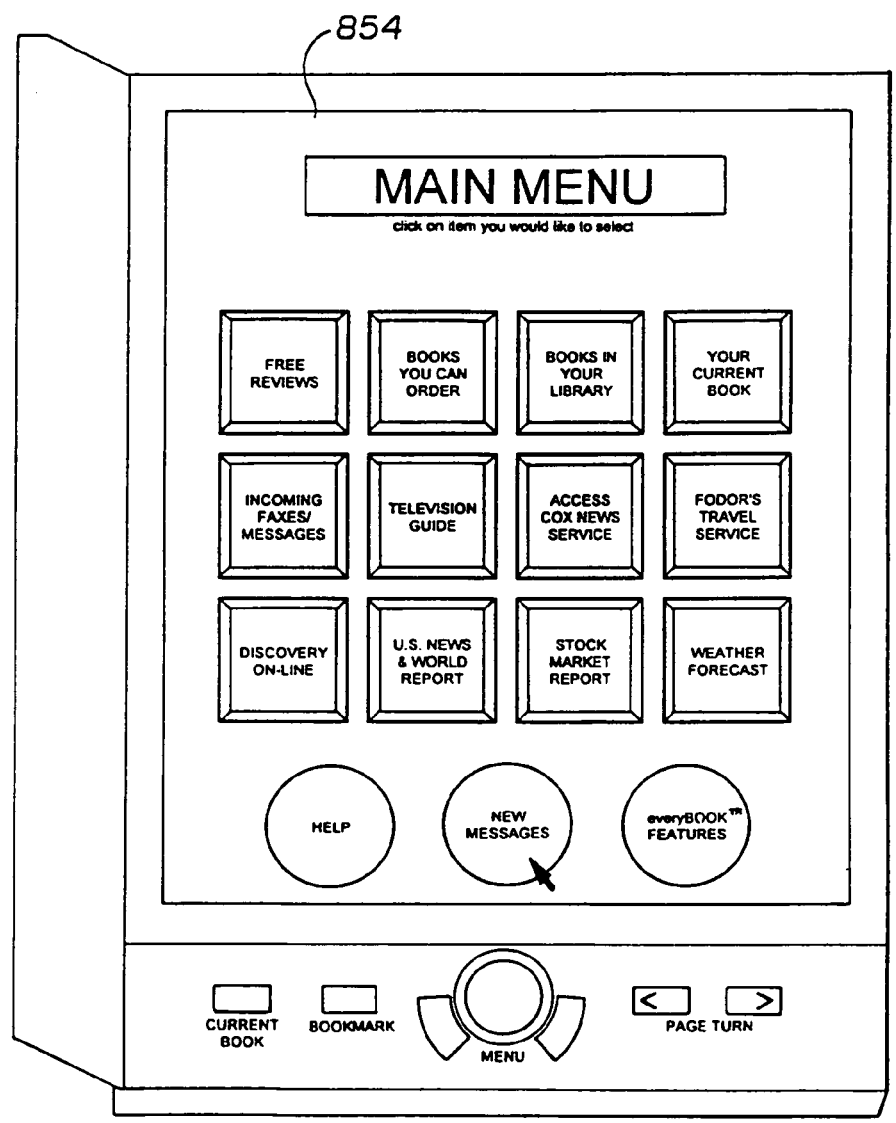
FIG. 14b is a schematic showing an example of a main menu.

An example of an introductory menu 850 is shown on FIG. 14a. Generally the introductory menu 850 introduces the viewer 266 to the system and provides initial guidance, announcements and instruction. The introductory menu 850 is followed by a main menu 854, an example of which is shown in FIG. 14b. The main menu provides the viewer 266 with the basic selection or features available in the system. FIG. 14b is an example of a main menu 854 offering many additional features and submenus 858 to the subscriber. For example, FIG. 14b shows that the viewer 266 is able to choose by a point and click method, many options including: (1) free previews, (2) books you can order, (3) books in your library, (4) your current book, (5) help, (6) on-line services and (6) other system features. Following a selection on the main menu 854, a corresponding submenu 858 is shown.

Figure 14C:
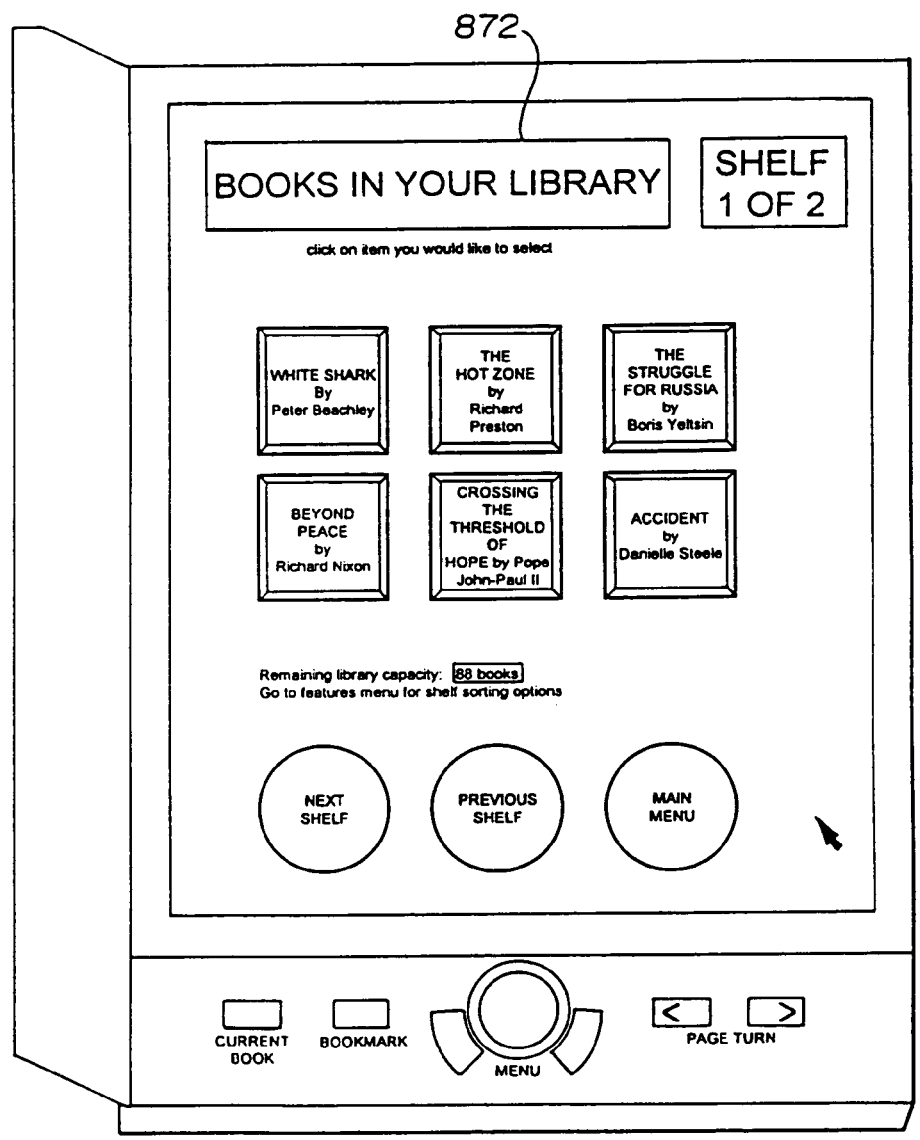
FIGS. 14c, 14d, 14e, 14f, 14g, 14h, 14i and 14j are schematics showing examples of submenus.
Figure 14D:
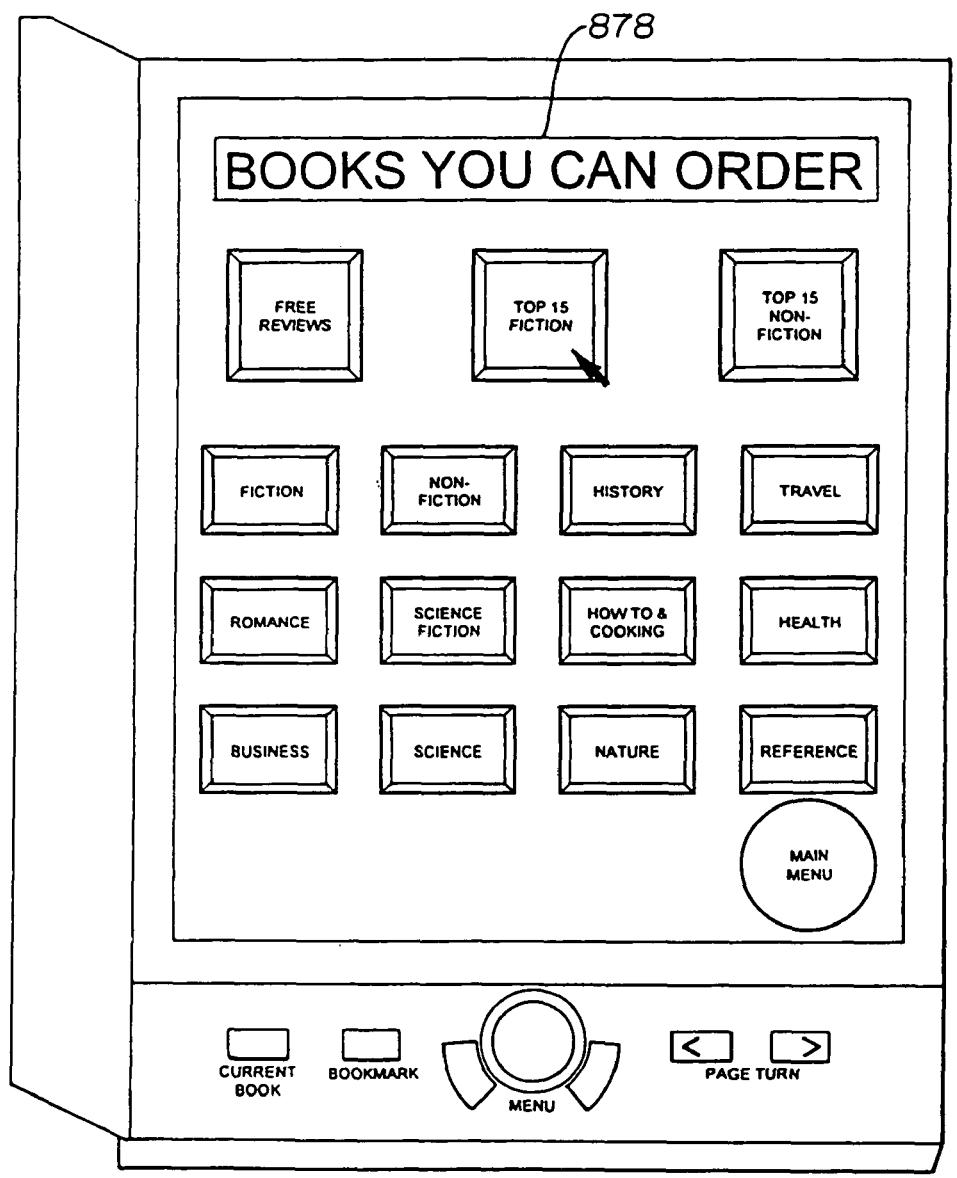
Figure 14E:
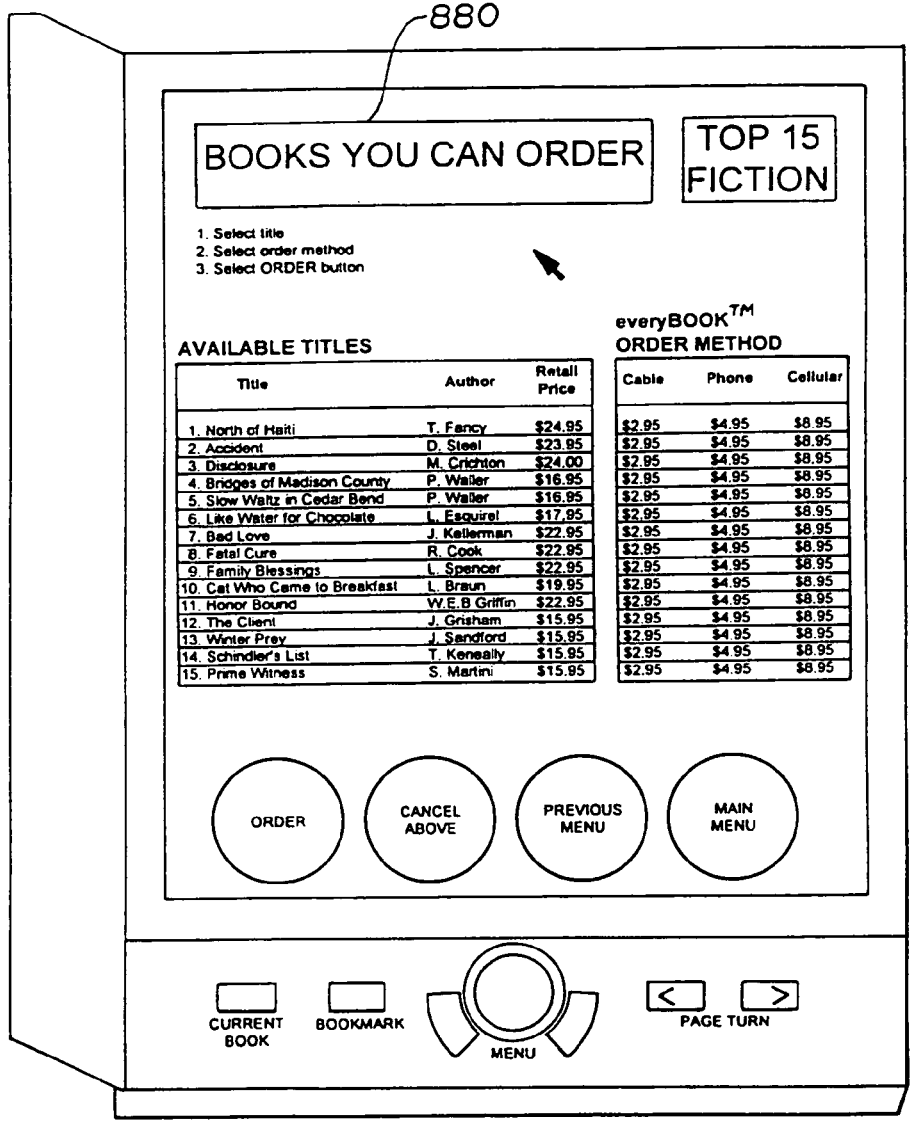

FIG. 13 shows thirteen available primary or first level submenus. They are (1) account set up 862, (2) free previews 866, (3) book suggestion entries 855, (4) books in your library 872, (5) books you can order 878, (6) your current book 884, (7) help 887, (8) available features 890, (9) messages 893, (10) account information 896, (11) outgoing message submenu 898, (12) show links 970, and (13) create links 980. FIG. 14c is an example of a first level submenu for electronic books in your library 872. This "Book In Your Library" example submenu 872 shows six available electronic books by title and author and provides the subscriber with the ability to check a different shelf of books 874 or return to the main menu 854. FIGS. 14d and 14e show example submenus 858 for electronic books that may be ordered using the "Books You Can Order" submenu 878.

Figure 14F:
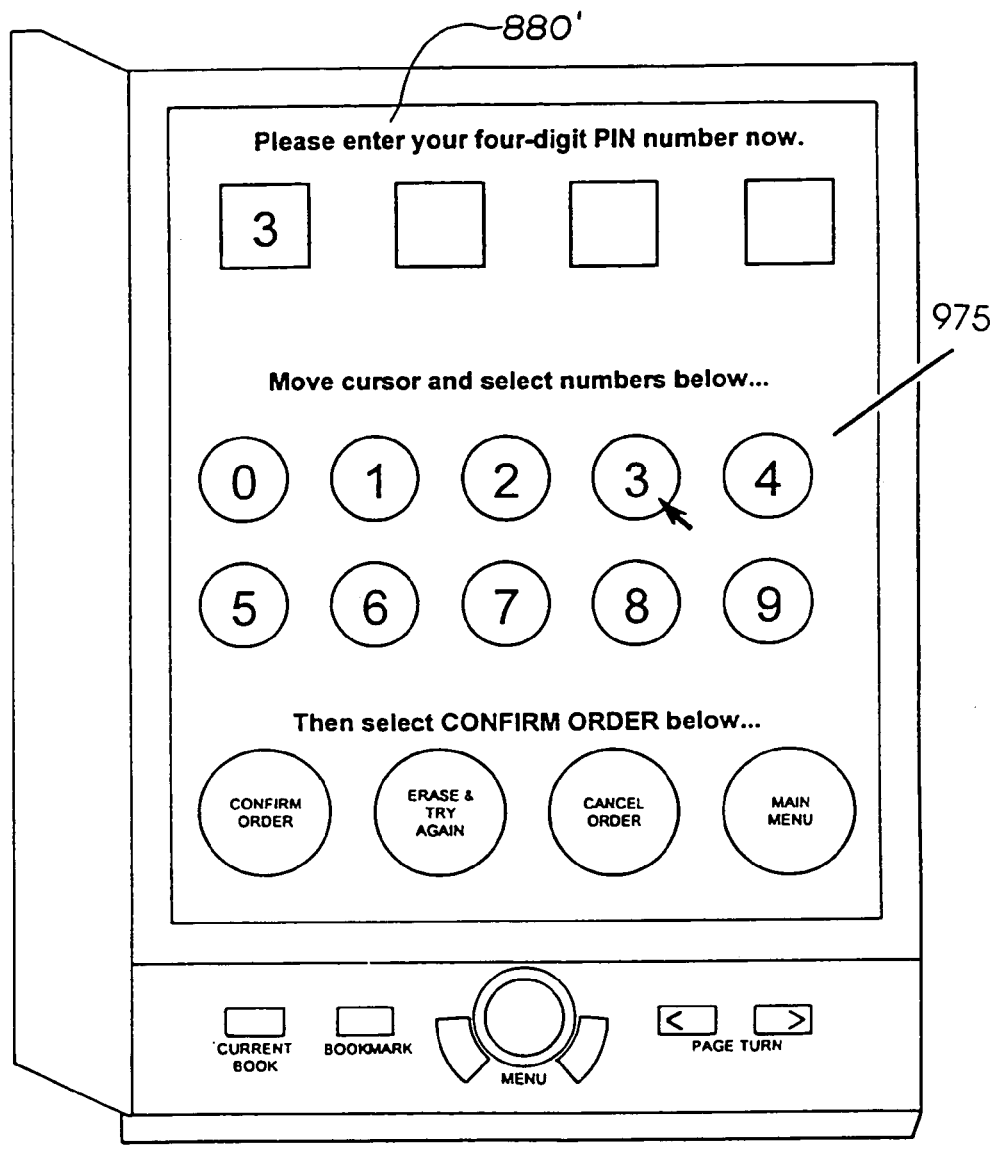

FIG. 14f is an example of an order selection and confirmation menu 880', which provides a "soft keyboard" 975 for the subscriber to use in placing an electronic book order and which confirms the subscriber's order. In this particular example, the subscriber is required to enter a PIN number to complete the subscriber's order. The "soft keyboard" 975 could be configured as a full alpha-numeric keyboard, and may be used by the subscriber to add additional information related to a book order. An alpha-numeric or similar password may be used to ensure the subscriber is an authorized subscriber. In an embodiment, the subscriber confirms an order with a PIN or password and then receives a final confirmation screen. The final confirmation screen is primarily text and may state: Your book order is now being processed via CABLE.

Your book will be delivered overnight and your VISA account will be charged $2.95.
Your book will be available for reading at 6:00 AM EST tomorrow. Make sure that:
  1. your Library Unit and Cable Connection Unit are plugged in with aerials up tonight; and
  2. you tune your cable converter to THE BOOK Channel. The TV set does not have to remain on.
or similar language.

Figure 14G:
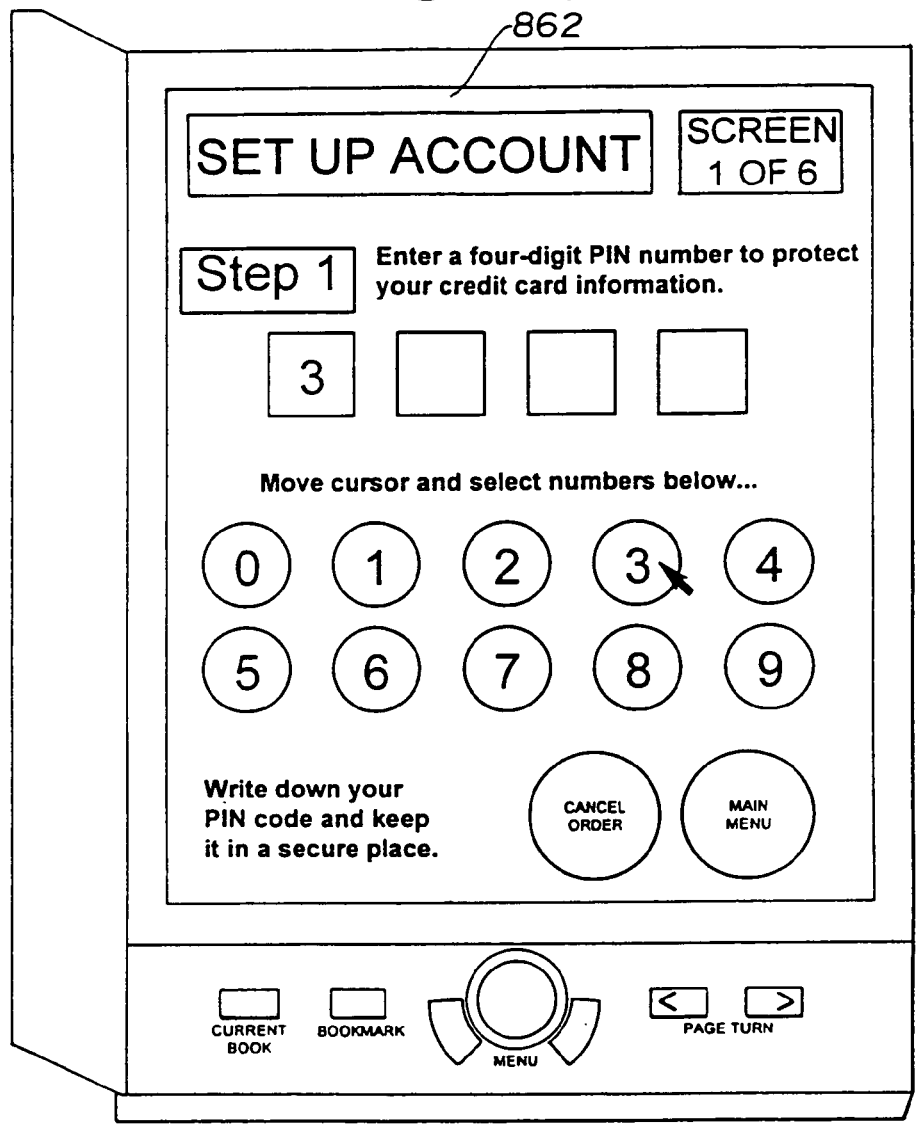
Figure 14H:
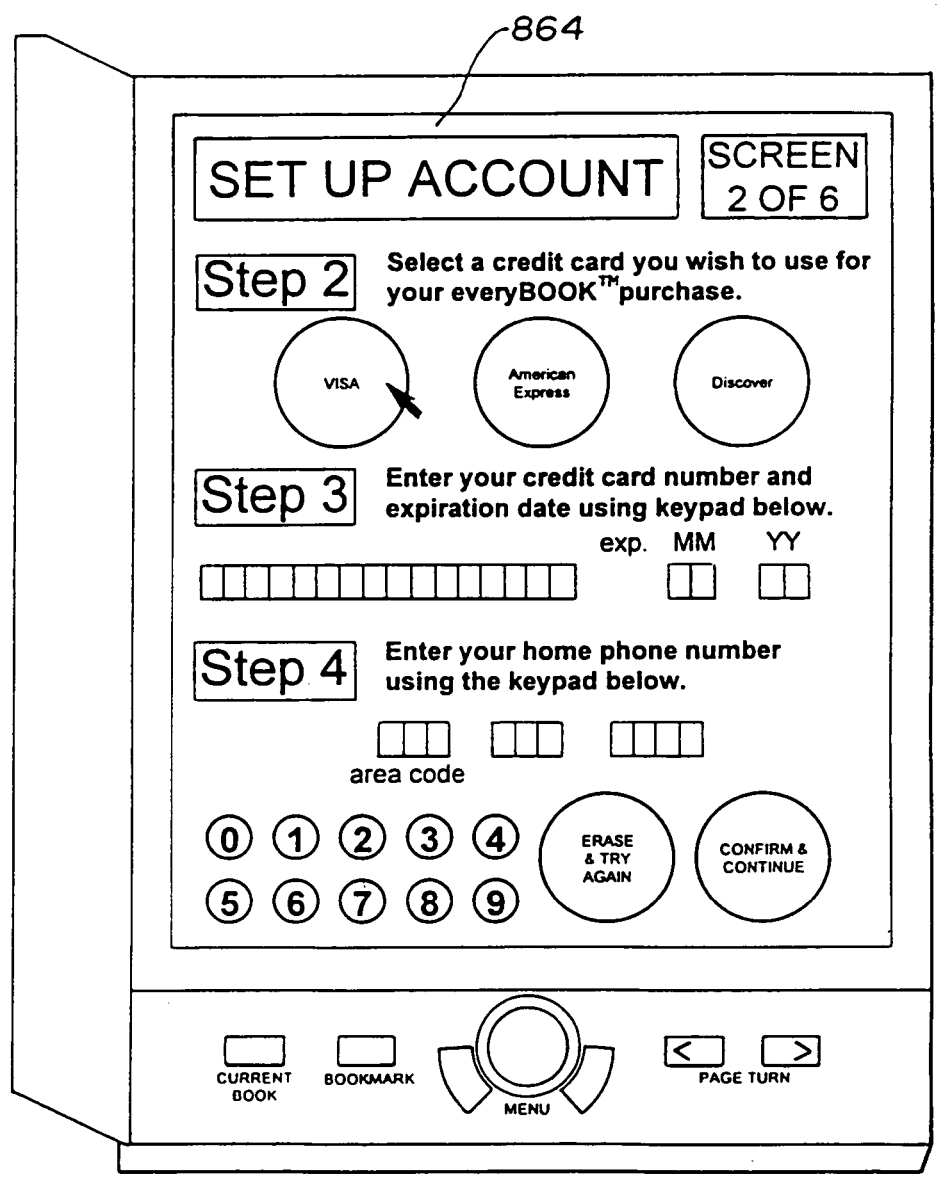

Examples of the "Account Set Up Menu" 862 and further submenus 858 related to account set up (which provide instructions and account input 864) are shown in FIGS. 14g and FIG. 14h. These submenus 858 allow initialization of an account at the operations center 250 and orders to be charged to credit cards. The submenus 858 include the ability to enter data related to your desired PIN number or password, credit cards, phone numbers, etc. It is preferred that the account set up be performed using the telephone system. A confirmation menu verifies that the account has been properly set up with the desired PIN or password and credit card.

Figure 14I:
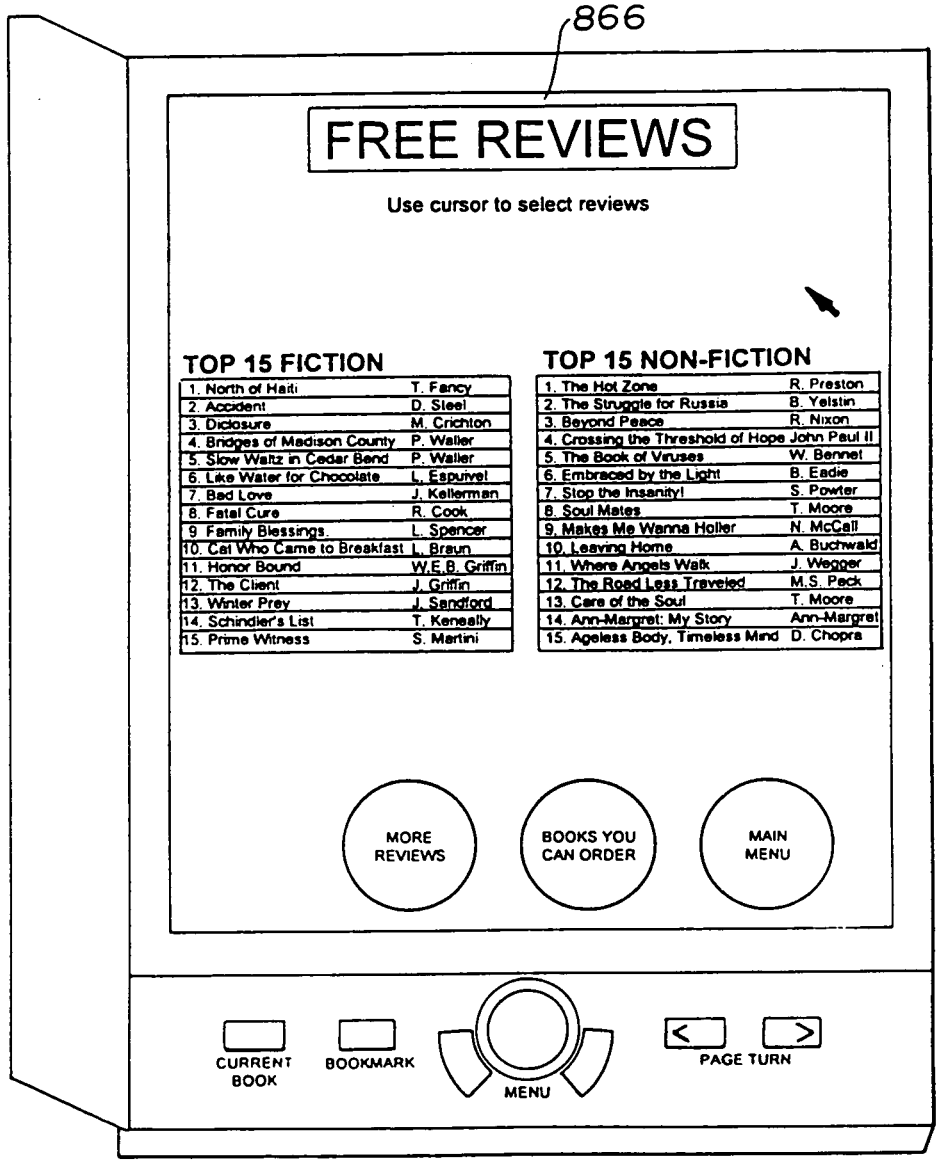
Figure 14J:
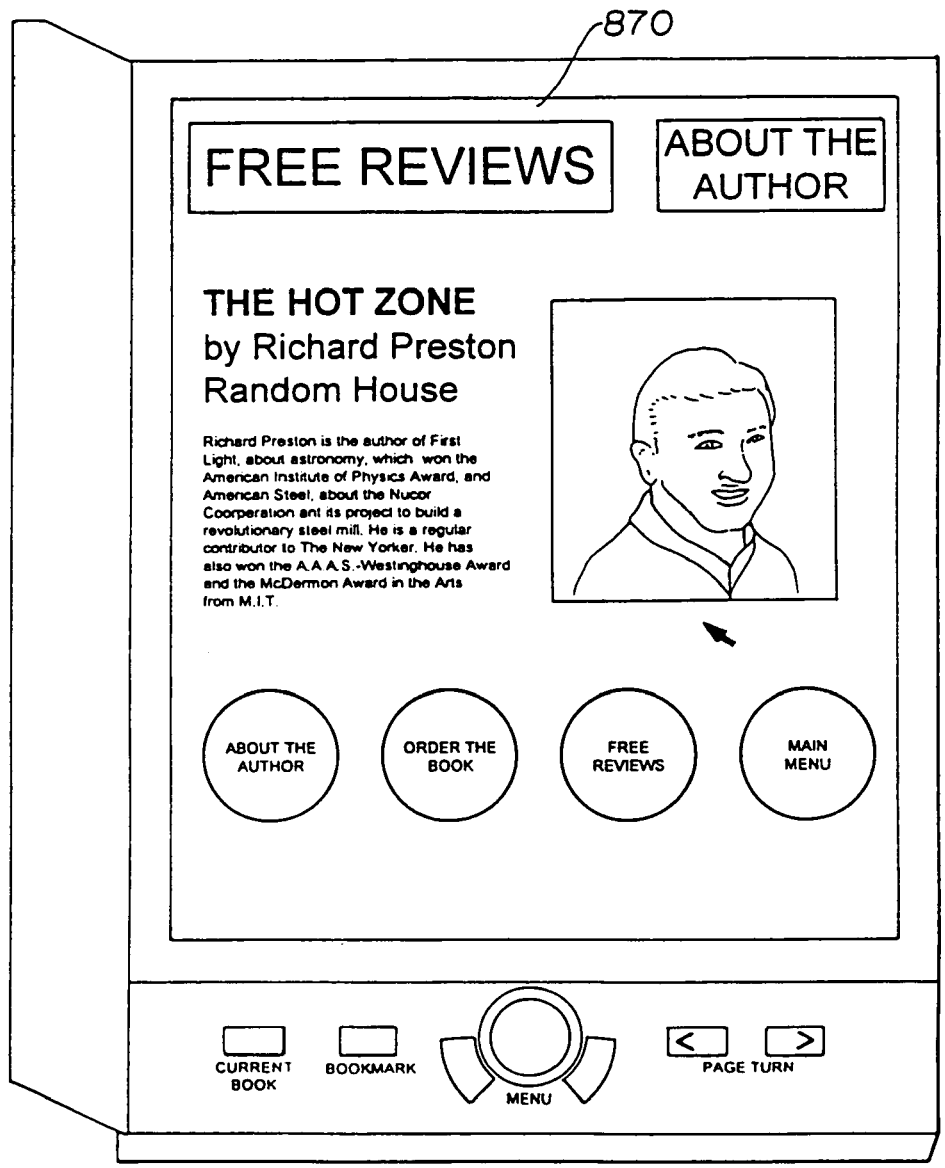

Free previews for books 866 are also provided by submenus (868, 870). Examples of the free preview menus are shown in FIG. 14i and FIG. 14j. FIG. 14i shows a menu depicting various electronic books for which previews are available for viewing. Following an electronic book selection, a screen submenu showing an excerpt of the selected electronic book cover's description is provided along with an excerpt from a critic's review of the selected electronic book. In a preferred embodiment, this preview screen for a particular electronic book also allows the subscriber to select a submenu which provides information about the author. The book preview submenu may also include a still video picture or graphics portraying a book cover or a scene from the electronic book. An example of such a still video picture or graphics is shown in FIG. 14j which depicts a preview screen 870 about the author. The video may also be provided according to MPEG standards as a short moving video clip. Such a clip could be an interview with the author, for example. The author's preview screen 870 shows a picture of the author, provides a short biography, and may allow the subscriber to order the author's books. The price for ordering the authors various electronic books may also be shown on the menu. Alternatively, the previews may be provided through an electronic link system, disclosed in the related application identified above.

In addition to free previews, in more sophisticated embodiments, the delivery system 200 provides the subscriber with an electronic book suggestion feature (see 855). This is accomplished using the menu system 851 and the processor with associated memory located at the viewer 266, library unit 262 or at the distribution point (1020 or 250). When necessary, information for the program suggestion feature is sent in the text data of the composite or video signal to the home system 258. With this feature, books or authors are suggested to a subscriber based upon historical data of the subscriber's previous orders, demographics or mood of the subscriber, other indicators, and/or by text word searches.

In a book suggestion embodiment, text word searches of preview information (such as book cover descriptions, critics reviews and biographies about the author) and/or text of books or other titles are performed by the library unit 262 using databases stored in the library memory 600. Personalized book or author suggestions are made to the subscriber by obtaining information from the subscriber indicative of general subscriber interests. Subscriber entries are solicited from the subscriber preferably using the electronic book suggestion entries submenu 855. The system uses these subscriber entries either directly or indirectly to search for books or authors to suggest to the subscriber.

Generally, the book suggestion methods may be categorized into two categories, either responsive methods (which respond to a series of subscriber menu entries), or intelligent methods (which analyze data to suggest an electronic book). Using a responsive or intelligent method, the delivery system 200 determines a list of suggested titles or authors and creates a second or third level submenu 856, 857 to suggest the titles for subscriber selection.

Responsive methods of suggesting titles include, for example, the use of mood questions, searching for authors, and keyword searching. Using the instruction memory 732 and menu generation hardware (e.g., 607) of the viewer 266, a series of mood questions can be presented on menus to determine a subscribers interest at a particular time. For this methodology, the operations center's 250 processor 404 and instruction memory 416 assign each title mood indicators (and subindicators) from a group such as light, serious, violent, short, long, dull, exciting, complex, easy-read, young theme, old theme, adventure, romance, drama, fiction, science-fiction, etc. These indicators are sent to the home system 258 with the text data and are stored in library memory 600. Based upon the subscriber entries, the processor 404 associates a set of indicators with the subscriber's request and a set of electronic books with matching indicators are located for suggesting to the subscriber.

Responsive searches for authors or keywords (a search word provided by the subscriber) are generally performed by the library processor 628 and instruction memory 632 on data stored in the library memory 600. For example, a keyword given by the subscriber may be searched for a match in library memory 600 storing the book reviews, critics and previews databases. Thus, if a subscriber provided an entry of the word "submarine" on an appropriate submenu, the title "Hunt For Red October" may be located by the library processor 628 using instruction from a routine in the instruction memory 632.

Intelligent methods of suggesting programs include analyzing personal profile data on the subscriber and/or historical data about the subscriber such as past books ordered by the subscriber (or buy data). This method is preferred in a book on demand system and can be performed at the distribution point or operations center 250 by the on-site processor 404 using subscriber databases stored in memory 428. The home system 258 receives the text data including program suggestion information from the distribution point or operations center 250 and generates the program suggestion submenus 855, 856, 857 using the same text data receiving 212 and viewer menu generation hardware (e.g., 607, 621) described above. Software routines and algorithms stored in instruction memories (e.g. 632, 732) are used to analyze historical data and book ordered data to determine a line of books to suggest to the subscriber.

The algorithms for this powerful feature of suggesting books or authors to subscribers are disclosed in great detail in U.S. Pat. No. 5,559,549, entitled REPROGRAMMABLE TERMINAL FOR SUGGESTING PROGRAMS OFFERED ON A TELEVISION PROGRAM DELIVERY SYSTEM, issued Sep. 24, 1996, and are incorporated herein by reference.

Referring to FIG. 13, submenus 858 are shown on the "Books In Your Library" submenu 872 and are preferably broken into shelf numbers with submenus for each shelf 874, 876. The submenus 858 for the "Books You Can Order" submenu 878 is similarly broken out into submenus by shelves 880, 882. These shelves may each be a category or genre of books. Electronic books may be grouped into categories such as best sellers, novels, fiction, romance, etc. See FIG. 14d.

Referring to FIG. 13, the submenu 858 for "Your Current Book" 884 allows a subscriber to select a current book 884 and then determine what page to view. This selection is confirmed with a level two submenu 885. The help submenu 887 provides the subscriber with additional help screens 888. The submenus 858 for available features 890 are preferably broken out into a sequence of separate submenus for each feature 891, 892.

Referring to FIG. 13, messages can also be sent with the delivery system 200. A level one message screen provides the subscriber with the ability to select from various messages the subscriber has pending 893. Each message is then shown on a separate submenu screen 894, 895. The message may contain text and graphics.

Referring to FIG. 13, account information is shown on a level one submenu 896 and then follow-on submenus 858 show the recent orders and your account balance 897. There is also a level one submenu for outgoing messages 898 which has a follow-on submenu used as an input screen 899.

In addition to the specific features and submenus described in FIG. 13 and FIG. 14a through FIG. 14j, many other variations and features are possible. When a book is finally selected for viewing the title page 886 will appear on the screen followed by a page of text.

III. The Billing And Collection System

The billing and collection system 278 (shown in FIGS. 2 and 3) utilizes the latest technology in electronic transaction and telephone switching to track orders, authorize deliveries, bill consumers, and credit publishers automatically. The telephone calls initiated by the phone connector 270 are received by the billing and collection system 278 which responds immediately without human intervention by placing the order and charging the consumers credit card account. Data is compiled periodically and publishers 282 are credited for sales of their books or other text. The billing and collection system 278 may also connect with subscribers through two-way cable connections, cellular, or other communication means.

It is preferred that the billing and collection system 278 communicate with the operations center 250 to track changes in available books and to provide statistical data to the operations center 250.

IV. Public Library, School, and Bookstore System

The electronic book system can be modified to be used at public libraries, schools and bookstores. FIG. 15 shows one possible arrangement of components for a public library, school or bookstore location. The main unit at a public library, school or bookstore is the file server 900. The file server 900 is a large electronic memory unit that can store thousands of electronic books. Various electronic storage means may be used in the file servers, such as hard disks, read-write CD ROMs and read-only CD ROMs.

The system comprises five components; the file server 900, a converter or video connector 904, a controller 908, a viewer 912, and a catalog printer 916. The software for controlling the system is primarily located in the controller 908. The converter or video connector 904 is similar to those described above. In this configuration the controller unit 908 monitors the data being transferred to the file server 900 by the converter 904. The controller 908 is preferably provided with a viewing screen and several control buttons. When it is necessary to have a larger screen to perform more sophisticated controlling of the system a viewer 266 may be connected to the controller 908 and the viewer screen and controls 740 may be used.

The controller 908 is only able to download books to public viewers 912 which are authorized to receive books from the particular file server 900. For security reasons it is not desirable that the public viewer 912 have access to more than one file server 900. In this way, security can be maintained over the text data for books. It is preferred that the public viewer 912 be limited to receiving one or two electronic books at a time from the controller 908. When the subscriber of the public viewer 912 needs a new or additional electronic book, the subscriber returns the viewer 912 to the school or public library where the subscriber receives a new electronic book from the controller 908.

In order to track the electronic books that are available on the file server 900, the titles of the available books may be printed on a catalog printer 916. The catalog printer 916 is connected to the library controller 908 and the titles of the electronic books are downloaded to the catalog printer 916. None of the coded text for any of the electronic books can be printed using the controller 908 and catalog printer 916 of this system. In order to maintain security over the data, none of the electronic book data is allowed to be downloaded to the printer 916. Once a complete printout of available electronic book titles, magazines, or other textual material is complete, a hard copy of the catalog 920 can be maintained at the file server 900.

The system shown may also be used at bookstores. The bookstores can rent the public viewer 912 to customers with the text for one or two electronic books loaded onto the public viewer 912. The public viewer 912 may be provided with an automatic timeout sequence. The timeout sequence would erase the textual data for the books after a certain period of time, for example, two weeks. It is expected that after a period of time (perhaps within two weeks) the renter would return the public viewer 912 to the bookstore and receive additional electronic books for viewing. Using this arrangement, it is also possible for the bookstore to (permanently) sell a viewer 912 to a regular customer. The customer then returns to the bookstore from time to time to receive textual data for an electronic book which the customer can then store permanently on the customer's own viewer 912. Various other configurations are possible for bookstores, schools and public libraries using the file server 900 and public viewer 912 described.

V. Use of a Set Top Converter

Existing set top converters such as those made by Scientific Atlanta or General Instruments are presently unequipped to handle the delivery system 200 of the present invention. Although set top converters may be built which include the library functions, hardware modifications are necessary in order to use the delivery system 200 with existing set top converter technology.

Figure 16A:
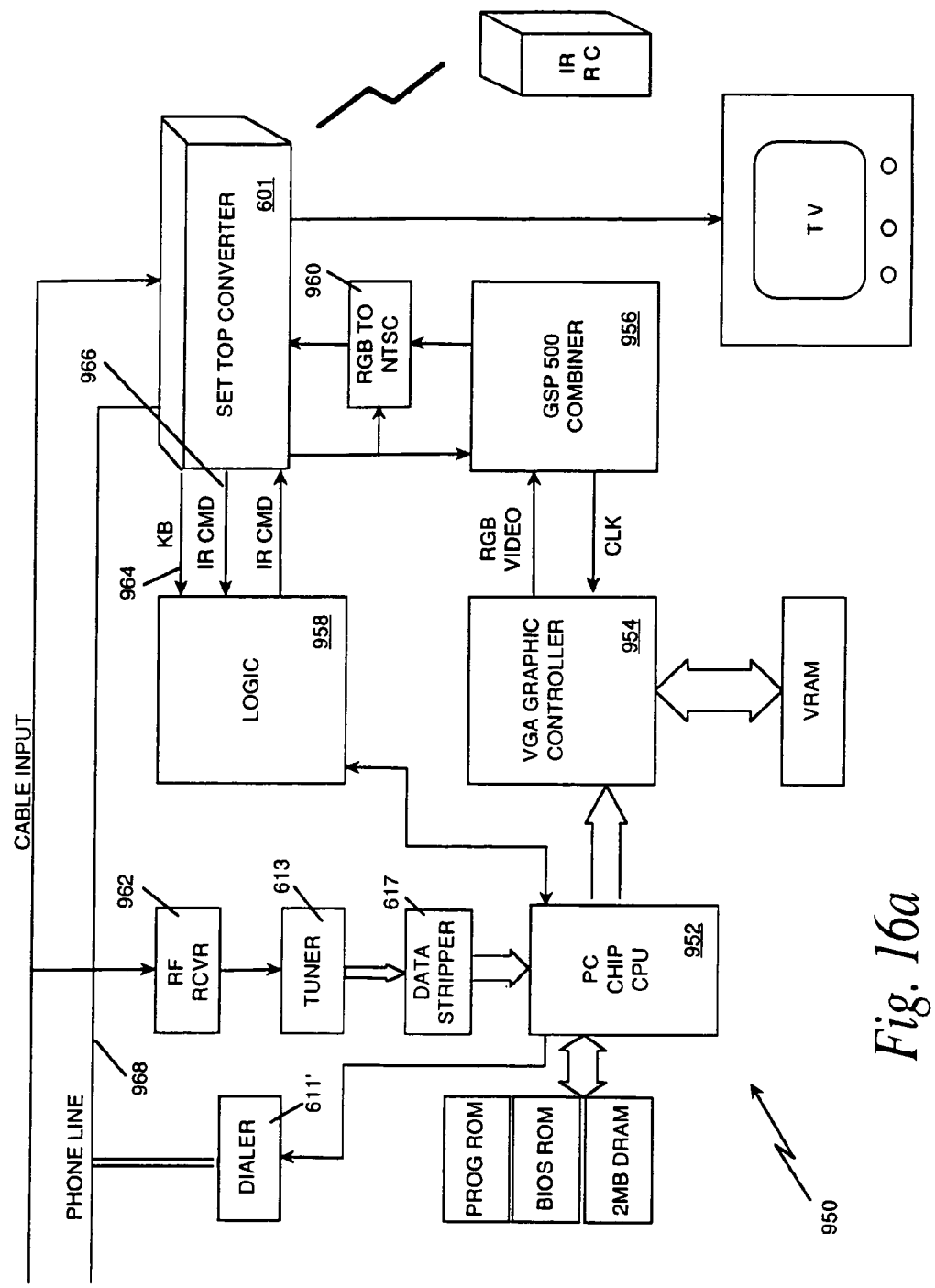
FIG. 16a and FIG. 16b are schematics of hardware modifications or upgrades to a set top converter.
Figure 16B:
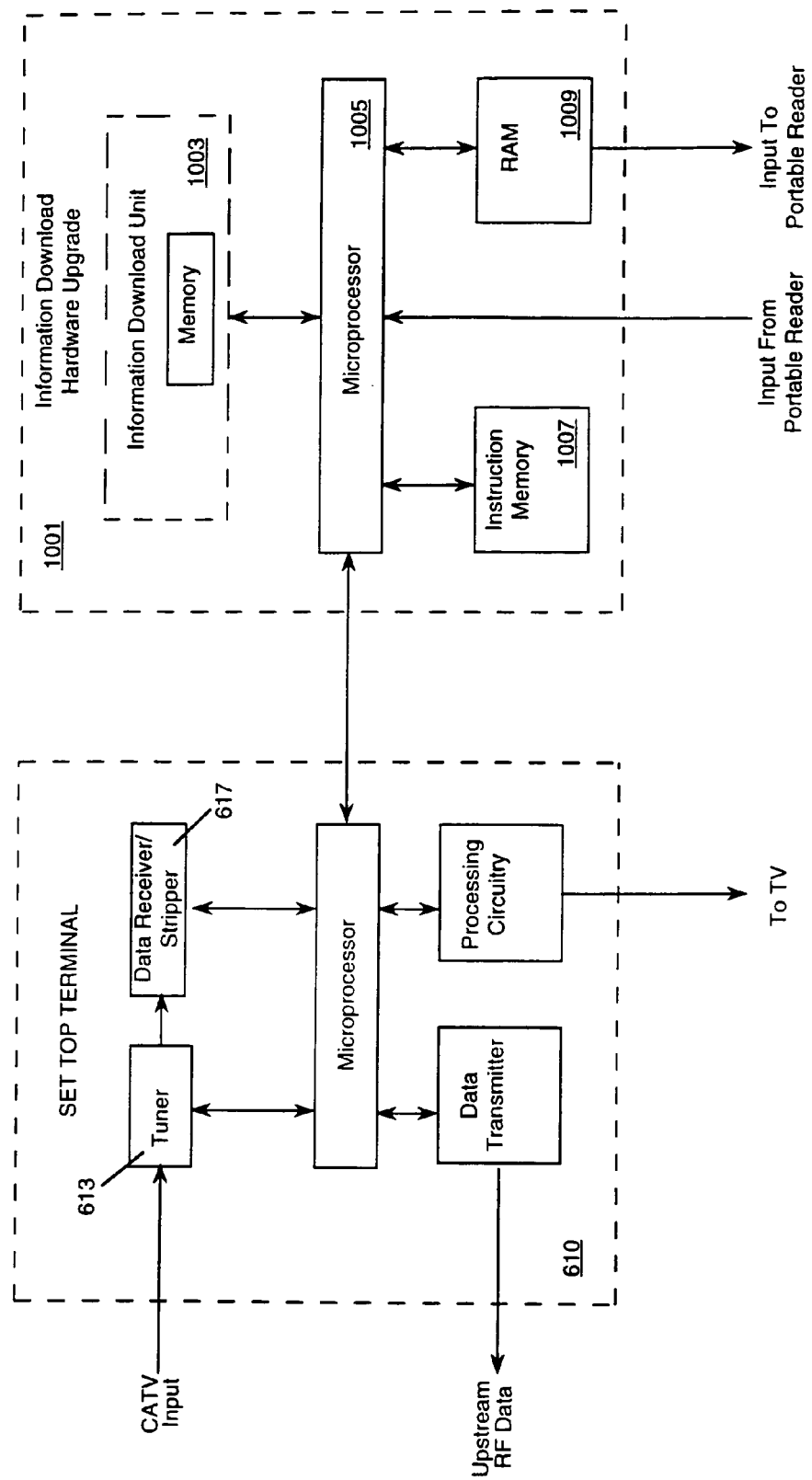

FIGS. 16a and 16b are examples of hardware modifications or upgrades. A port is used to attach hardware upgrades described below to a set top terminal. Two examples of upgrades to set top converters 601 to assist in receiving and selecting electronic books are shown. A menu generation card upgrade (FIG. 16a) and an information download unit (FIG. 16b). Each of these upgrades may be connected to the set top terminal unit through an upgrade port. A four wire cable, ribbon cable, IEEE 1394 firewire interface, USB interface, or the like may be used to connect the upgrade to the set top converter 601.

A card addition 950 to a set top converter 601 is depicted in FIG. 16a. The card 950 shown provides the additional functionality needed to utilize the book selection system with existing set top converter 601 technology. The card 950 may be configured to slip inside the frame of a set top terminal and become part of the set top terminal, an advanced set top terminal. The primary functions the card 950 adds to the set top converter 601 are the interpreting of data signals, generating of menus, sequencing of menus, and, ultimately, the ability of the subscriber to select an electronic book using either the television or a viewer 266. The card 950 also provides a method for a remote location, such as the cable headend, to receive information on electronic books ordered. The electronic books ordered information and control commands may be passed from the cable headend to the card 950 using telephone lines.

The primary components of the card 950 are a PC chip CPU 952, a VGA graphic controller 954, a video combiner 956, logic circuitry 958, NTSC encoder 960, a receiver 962, demodulator (not shown), and a dialer 611'. The card 950 operates by receiving the data text signal from the cable headend through the coaxial cable. The logic circuitry 958 of the card 950 receives data 964, infrared commands 966, and synchronization signals (not shown) from the set top converter 601. Menu selections made by the viewer 266 on the remote control are received by the set top converter's 601 IR equipment and passed through to the card 950. The card 950 interprets the IR signal and determines the electronic book (or menu) the subscriber has selected. The card 950 modifies the IR command to send the information to the set top converter 601. The modified IR command contains the channel information needed by the set top converter 601. Using the phone line 968 and dialer 611', the card 950 is able to transmit electronic books ordered information to the cable headend. It is also possible to receive the electronic books over the telephone lines and by-pass the video distribution system. In this embodiment, the telephone system may be used for example, to provide access to an Internet web site to order and receive electronic books.

These commands are passed through the interface linking the set top terminal's microprocessor with the microprocessor of the hardware upgrades. In this way, subscriber inputs, entered through the set top terminal keypad or remote control, can be transferred to any of the hardware upgrades for processing and responses generated therein can then be sent back to the set top terminal for display. In a preferred embodiment the IR commands 966 are transferred from set top terminal 601 to hardware upgrade.

Hardware upgrades may include a microprocessor, interactive software, processing circuitry, bubble memory, and a long-term memory device. In addition to these basic components, the hardware upgrade may make use of an additional telephone modem or CD-ROM device.

The information download hardware upgrade 1001 (shown in FIG. 16b) allows the subscriber to download large volumes of information from the operations center 250 or cable headend using the set top converter 601. The hardware upgrade 1001 will enable subscribers to download data, such as electronic books and magazines, to local storage. Primarily, the hardware upgrade 1001 is an additional local storage unit 1003 (e.g., hard disk, floppy, optical disk or magnetic cartridge and may include a microprocessor 1005, instruction memory 1007, and a random access memory 1009, as shown in FIG. 16b). Preferably, a small portable viewer 266 is also provided with the upgrade 1001 to enable downloaded text to be read without the use of a TV.

The downloadable information may be text or graphics supplied by the operations center 250 or cable headend. With this upgrade, electronic books may be downloaded and read anywhere with the portable viewer 266. Using this upgrade, books may be downloaded and stored in compressed form for later decompression. The electronic books would be decompressed only at the time of viewing. Important text that the public desires immediate access may made available through this system. Text such as the President's speech, a new law, or a recent abortion decision rendered by the Supreme Court may be made immediately available.

In one embodiment, electronic book ordering information is stored at each set top terminal until it is polled by the cable headend using a polling request message format. An example of a polling request message format consists of six fields, namely: (1) a leading flag at the beginning of the message, (2) an address field, (3) a subscriber region designation, (4) a set top terminal identifier that includes a polling command/response (or P/F) bit, (5) an information field, and (6) a trailing flag at the end of the message. A similar response frame format for information communicated by the set top terminal to the cable headend in response to the polling request may be used.

Figure 17:
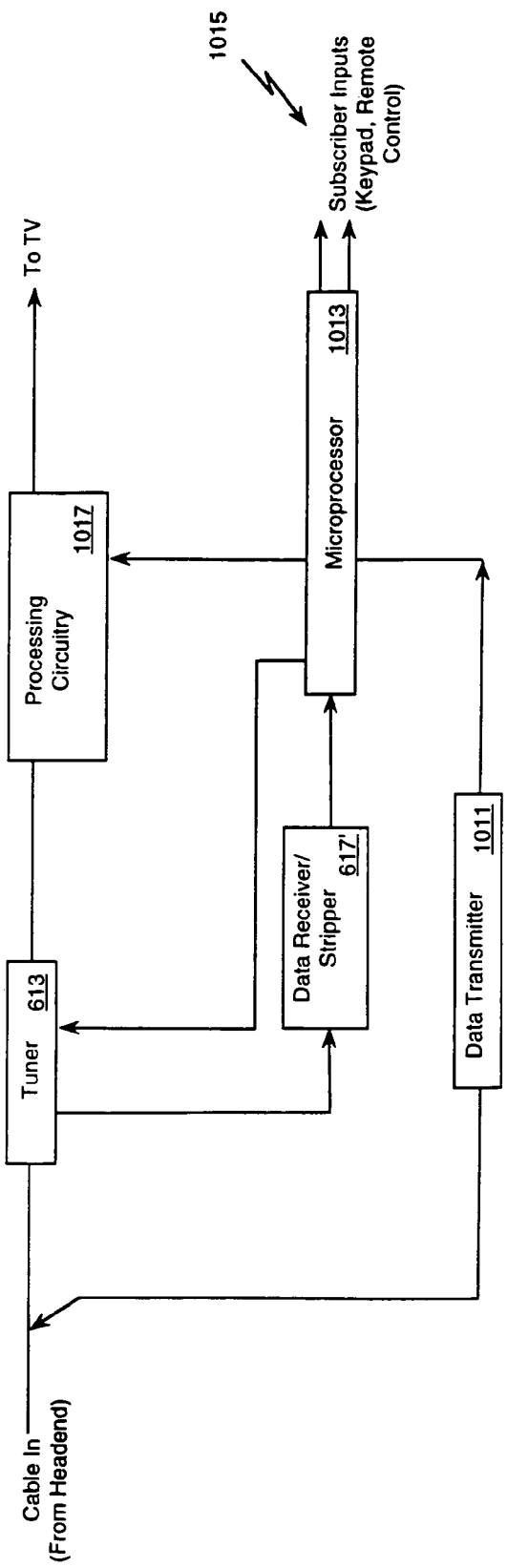
FIG. 17 is a schematic showing a set top terminal that includes a data receiver and data transmitter.

FIG. 17 shows a preferred set top converter that includes a data receiver 617' and a data transmitter 1011. The data transmitter provides upstream data communications capability between the set top converter 601 and the cable headend. Upstream data transmissions are accomplished using the polling system described and, using a data transmitter 1011. Both receiver 617' and transmitter 1011 may be built into the set top converter 601 itself or added through an upgrade module. Regardless of the specific hardware configuration, the set top terminal's data transmission capabilities may be accomplished using the hardware shown in FIG. 17.

FIG. 17 shows RF signals, depicted as being received by a data receiver 617' and tuner 613 working in unison. Both of these devices are interfaced with the microprocessor 1013, which receives inputs 1015, from the subscriber, either through a set top converter's keypad, a remote control unit or the viewer 266. All cable signals intended for reception on the subscriber's TV are accessed by the tuner 613 and subsequently processed by the processing circuitry 1017. This processing circuitry 1017 typically includes additional components (not shown) for descrambling, demodulation, volume control and remodulation on a Channel 3 or 4 TV carrier.

Data targeted to individual set top converters is received by the data receiver 617' according to each set top converter's specific address or ID. In this way, each addressable set top converter only receives its own data. The data receiver 617' may receive set top converter 601 specific data in the information field of the signal frame described or on a separate data carrier located at a convenient frequency in the incoming spectrum.

The received data includes information regarding electronic books and menus available for selection. The subscriber may enter a series of commands 1015 using a keypad or remote control in order to choose an electronic book or menu. Upon receipt of such commands, the microprocessor 1013 instructs the tuner to tune to the proper frequency of the channel carrying data and subsequently instructs the processing circuitry 1017 to begin descrambling of this data.

Upon selection of the electronic book, the microprocessor 1013 stores any selection information in local memory (not shown) for later data transmission back to the cable headend. The microprocessor 1013 coordinates all CATV signal reception and also interacts with various upstream data transmission components. Typically, the data transmitter 1011 operates in the return frequency band between 5 and 30 MHZ. In an alternative embodiment, the frequency band of 10 to 15 MHZ may be used. Regardless, however, of the frequency band used, the data transmitter 1011 sends information to the cable headend in the information field of the response frame described. Those skilled in the art will recognize that a number of variations and combinations of the above-described set top terminal hardware components may be used to accomplish upstream data transmissions.

VI. Books-On-Demand System

Figure 18A:
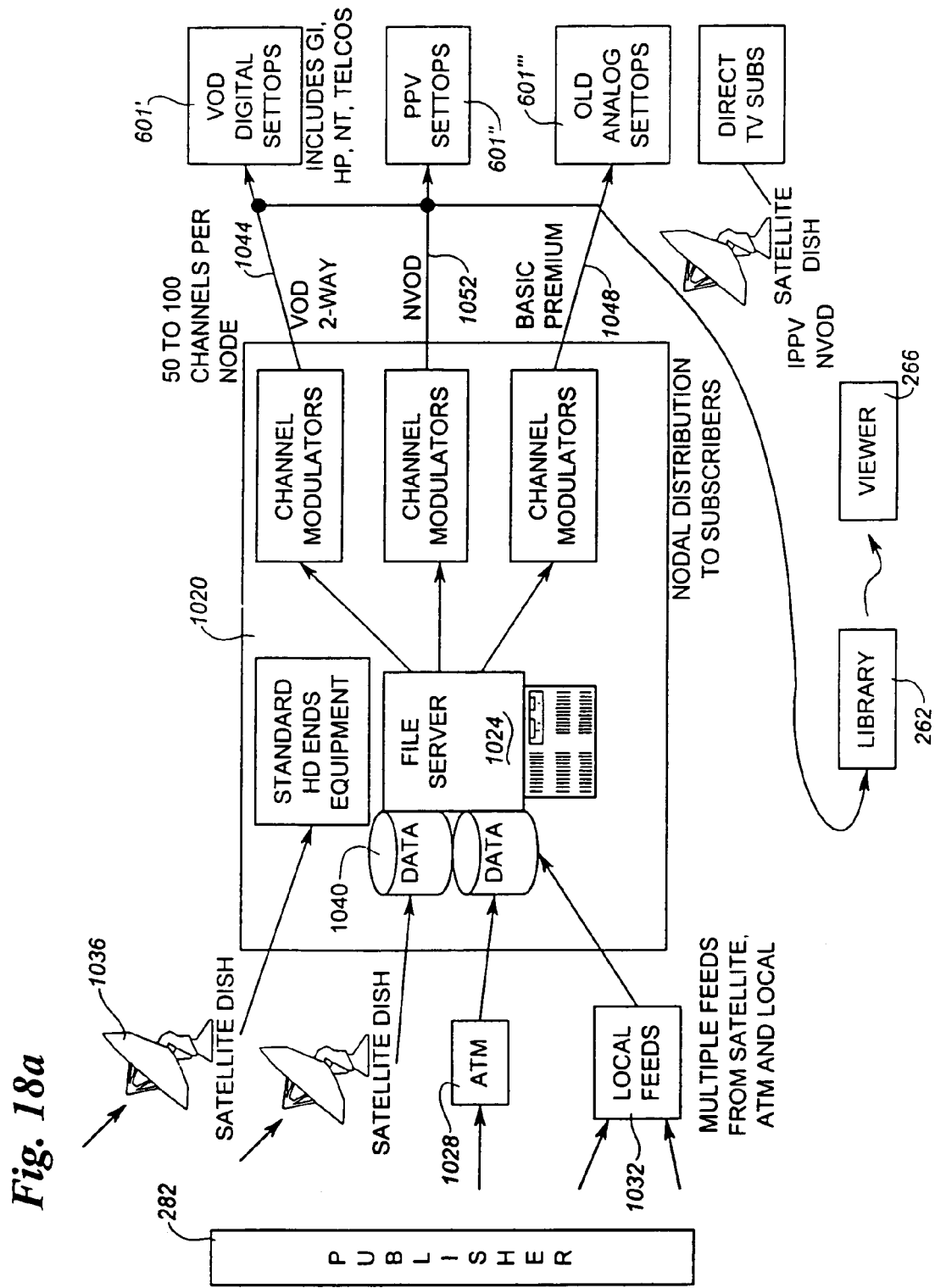
FIG. 18a is a schematic of a book-on-demand system.

The electronic book system 200 described may also be configured in a book-on-demand style. FIG. 18a shows one example of a configuration for a books-on-demand system. A books-on-demand system requires more powerful two-way communications between the consumer's home, bookstore, school or public library and either the operations center 250 or a distribution site 1020 such as the cable headend. This type of two-way communication can be provided by the hardware shown in FIG. 17 and described above.

Referring to FIG. 18a, in a books-on-demand system, the subscriber selects the electronic book to be download from an available menu of electronic books (see for example FIGS. 14d and 14e). The data for menus of available books is usually sent to the subscriber location by the distribution site 1020. After the subscriber's menu selection, information about the subscriber selection (or request) is then communicated to either a distribution point 1020 (such as a cable headend or an Internet web site) or the operations center 250. Upon receipt of this request, the needed textual and graphical information for the book is spooled and sent to the subscriber. In this manner, books are only sent when requested by the subscriber and are sent immediately upon demand for the book (or text).

In order to support such a books-on-demand system, the text delivery and distribution must be conducted on a strong nodal architectured distribution system, such as, a video-on-demand cable or telephone television system, an Internet web site, or through use of individual telephone access on the public telephone system.

The books-on-demand system allows for a greater selection of electronic books to the subscriber and limits the amount of communicated book data that is unnecessary or unneeded. It also provides the electronic book to the subscriber in a much timelier fashion.

In addition to a stronger distribution system, a books-on-demand system requires a distribution point 1020 to have more sophisticated equipment to access and "spool out" the textual information. This can be accomplished using file server technology 1024 for storing the electronic books and ATM 1028 or telephone-type switching (not shown) to distribute the textual information. The file server 1024 and distribution technology that can be used in configuring such a books-on-demand system is described in U.S. Pat. No. 5,262, 875 and U.S. Pat. No. 5,218,695, cited above.

FIG. 18a shows an embodiment for a books-on-demand system that utilizes file server technology. In addition to electronic books, the embodiment of FIG. 18a will support distribution of nearly any digital data. Electronic books or textual files are received from publishers 282 and other sources through local feeds 1032, ATM 1028, or by satellite dish 1036. The data is then stored in memory 1040 at the file server 1024. The distribution point 1020 may be a cable headend that receives requests from subscribers and delivers text to subscribers over a two-way communication system (such as a video-on-demand system (VOD) 1044). Alternately, an Internet web site may serve as the distribution point 1020.

The library unit 262 can be connected to either a basic premium-type service cable system 1048, a near video-on-demand type cable system (or pay-per-view (PPV) 1052) or a video-on-demand cable system 1044. In connecting with either of these three systems the library unit 262 may access the cable directly or may access the system through a set top terminal 601', 601", or 601'".

Using the two-way video-on-demand system 1044, a subscriber is able to request a specific electronic book title and receive that text immediately following its request. To accomplish this, the distribution point 1020 transmits a list of available electronic books through the cable delivery system to the library unit 262. The library unit 262 displays the list of available electronic books on a menu or similar format. As described earlier, it is preferred that the library unit 262 use menus which list categories of available electronic books to form its request from the distribution point 1020. After selecting an electronic book, the library unit 262 sends a request signal on the two-way communication system 1044 back to the distribution point 1020. This request signal can be handled in two ways. The library unit 262 either initiates the request or the distribution point 1020 polls the various libraries on the two-way system 1044. Upon receiving the request for the electronic book title, the text associated with that book title is transmitted to the library unit 262 using the two-way cable system 1044.

Figure 18B:
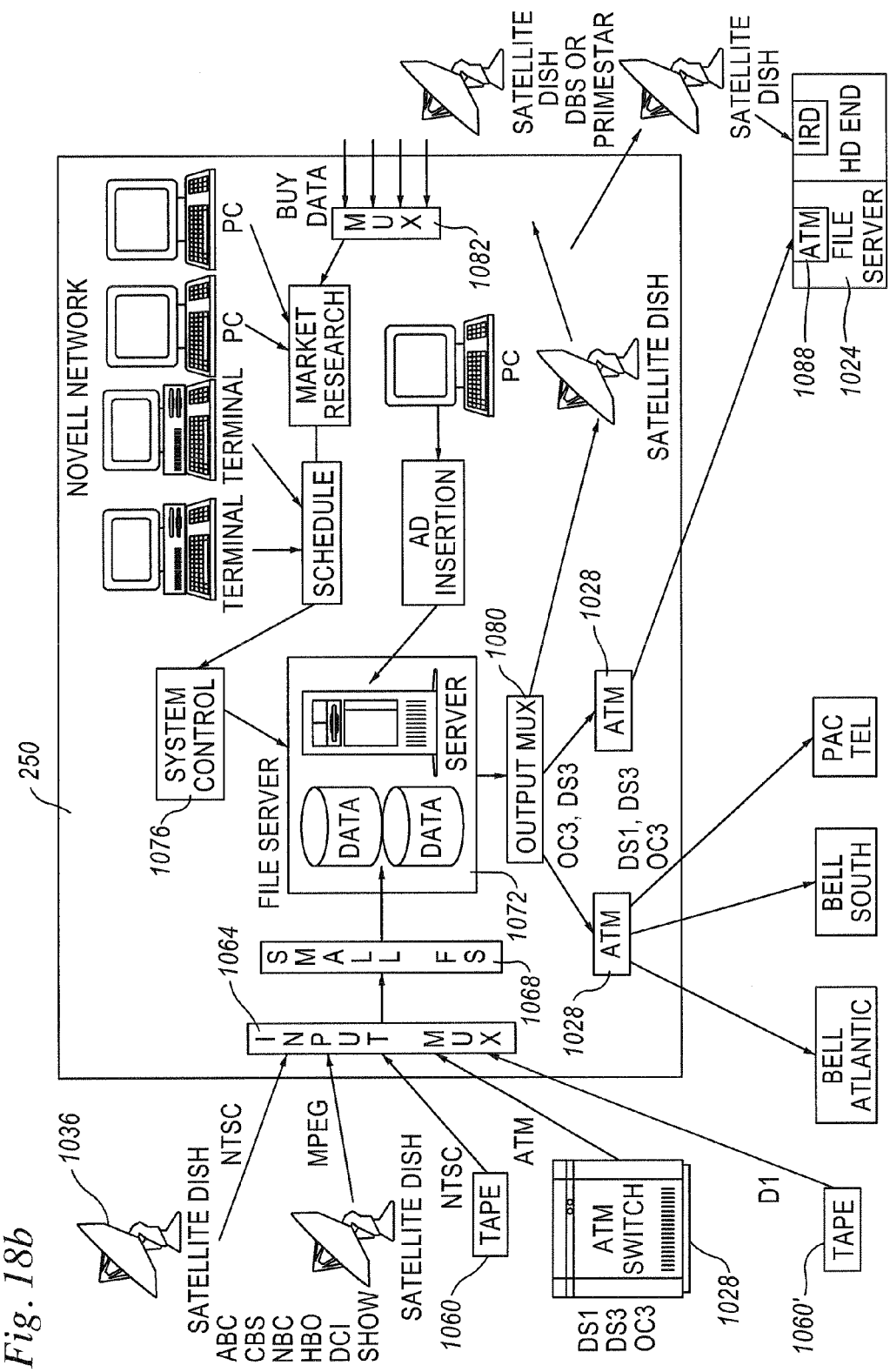
FIG. 18b is a schematic of an operations center supporting a book-on-demand system.

FIG. 18b is an expanded view of a preferred operations center 250 that supports a regional or national books-on-demand system. In fact, the operations center 250 shown supports distribution of nearly any digital data. The operations center 250 supports multiple feeds to receive digital information by tape 1060, 1060', ATM 1028, or satellite 1036. The information is processed through an input MUX 1064 and a small file server 1068 before reaching the master file server 1072. Digital data such as electronic books received from publishers 282 is then stored on the master file server 1072. It is preferred that the digital data is stored compressed in a standard format such as MPEG2.

A system controller 1076 provides control over the regional or national books-on-demand system. Electronic books may be packaged into groups to provide feeds to various cable headends. In addition, scheduling and marketing research are conducted at the operations center 250. In order to handle the scheduling and market research, electronic book buy data is received at the operations center 250 through a multiplexer 1082. Electronic book buy information can be provided by the operation center 250 to the billing and collection system 278.

The operations center 250 is also equipped to insert messages or advertisements into the file server. These messages or advertisements will eventually be received by the subscribers.

The master file server 1072 uses an output multiplexer 1080 and ATM 1028 as well as satellite connections to distribute digital data. In a preferred embodiment, cable headends receive text data on electronic books from the master file server 1080 through the output multiplexer 1028 and an ATM system 1028. After receiving the electronic book data, the cable headends store the books in a local file server 1024. FIG. 18a's distribution point 1020 is an example of a cable headend which may receive data from the operations center 250 of FIG. 18b through an ATM hookup 1088 or satellite hookup.

VII. Restricted Access Features for Electronic Books

An electronic book may include various features for restricting access to text or other information contained within it. As discussed below, those features include restricting information in electronic books by user and content. Other features include restricting how a user may access pages of an electronic book based, for example, on page order, content, or time of viewing.

Figure 19:
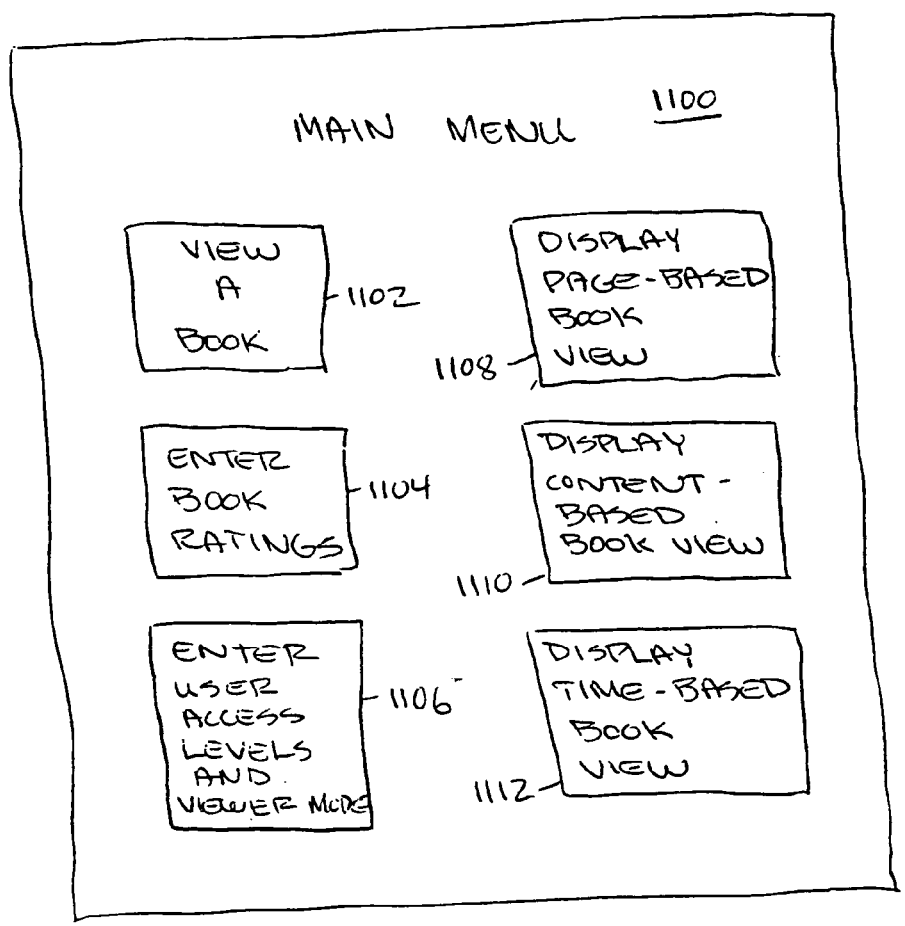
FIG. 19 is a diagram of a main menu for restricted access features for electronic books.

FIG. 19 is a diagram of a main menu 1100 for restricted access features for electronic books. Main menu 1100 may be displayed on the viewer 266 for permitting a user to select various options relating to restricting access to information in electronic books. Main menu 1100 has a number of sections for permitting the user to select the options by selecting an appropriate section. The term section refers to a definable portion of the screen, and the act of selecting a section may involve, for example, positioning the cursor or a pointer over the section using trackball 743 and depressing selection buttons 745 to "click on" the section; other cursor-control devices, including peripheral devices, may be used to select a section either by positioning the cursor or entering a particular command. The sections in main menu 1100, and other described screens, may alternatively have different shapes and may be displayed in a different configuration than that shown. In addition, the screens may have more or fewer sections depending upon, for example, desired functions or displayed information. Also, main menu 1100 and the other described screens may be generated for display on the viewer 266, or retrieved from memory for display, by library processor 628 operating under control of software modules residing within the instruction memory unit 632 or by viewer processor 621 operating under control of software modules residing within the instruction memory 732, or by hardware modules, or a combination of hardware and software modules.

A view book section 1102 permits a user to select an option to view one of the electronic books stored within the viewer 266 or library 262. An enter book ratings section 1104 permits a user to select an option to enter ratings for the stored electronic books in order to control access to the electronic books. A rating or book rating is any type of information used to control or restrict access to content of an electronic book. Also, ratings may include a range of ratings, and the range of ratings may have associated support levels indicating multiple levels of access such as those provided by the following standard film ratings: G; PG; PG-13; R; and NC-17. An access levels and viewer mode section 1106 permits a user to select an option to enter access levels for users in order to control the users' access to the stored electronic books. This option also permits a particular user to set the operating mode of the viewer 266. Access levels or user access levels are any type of information used to restrict or control particular users' access to content of electronic books. An operating or viewer mode is a particular way in which a viewer restricts or controls access to content of electronic books. It may, for example, restrict access by user access levels, book ratings, a combination of access levels and book ratings, or according to another methodology.

Sections 1108, 1110, and 1112 permit a user to select various options for how a particular electronic book may be viewed. A page-based book view section 1108 permits a user to select a page-based book view option, which refers to a feature requiring that pages of an electronic book be viewed in a particular order. A content-based book view section 1110 permits a user to select a content-based book view option, which refers to a feature requiring that portions of a particular page of an electronic book be selected in a particular order before viewing a next page in the electronic book. A time-based book view section 1112 permits a user to select a time-based book view option, which refers to a feature requiring that a page of an electronic book be viewed for a particular amount of time before viewing a next page in the electronic book.

Figure 20:
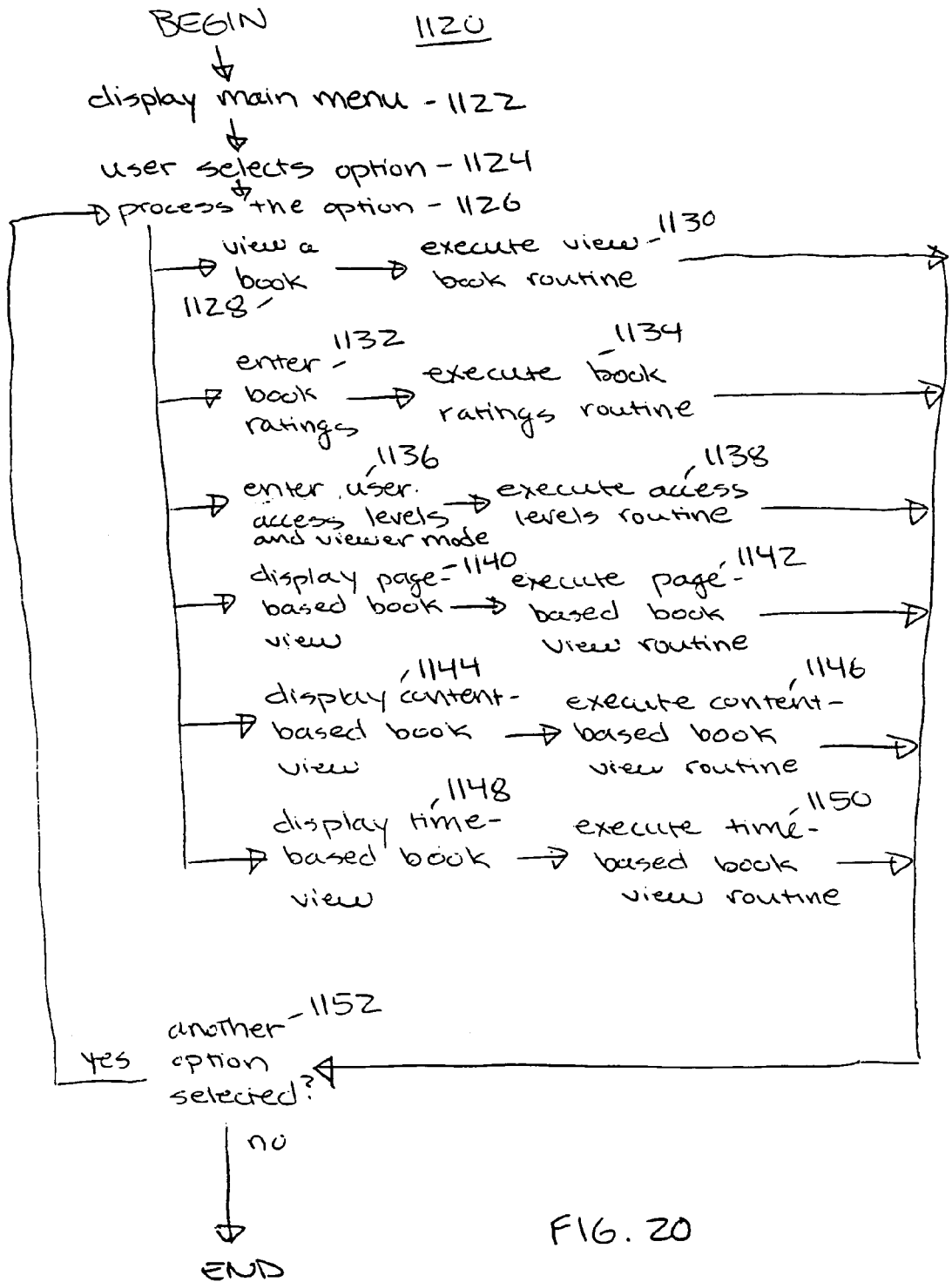
FIG. 20 is a flow chart of a main menu process.

FIG. 20 is a flow chart of a main menu process 1120 for processing a user's selection of various sections in main menu 1100. Main menu process 1120 may be implemented within the viewer 266, the library 262, or a combination; for example, it may be implemented by software modules residing within the instruction memory unit 632 for execution by the library processor 628 or within the instruction memory 732 for execution by the viewer processor 621, or by hardware modules, or a combination of hardware and software modules. In process 1120, a display main menu process 1122 displays a main menu 1100 on the viewer 266. A select option process 1124 waits for a user to select one of the sections within a main menu 1100. Upon a user selecting a section in order to choose an option, an option process 1126 selects an appropriate routine based upon the user's selected option. If the user selected the view book section 1102, a view book process 1128 executes a view book routine 1130. If the user selected the book ratings section 1104, a book ratings process 1132 executes a book ratings routine 1134. If the user selected access levels and viewer mode section 1106, an access levels and viewer mode process 1136 executes an access levels routine 1138.

If the user selected the page-based book view section 1108, a display page-based book view process 1140 executes a page-based book view routine 1142. If the user selected the content-based book view section 1110, a display content-based book view process executes a content-based book view routine 1146. If the user selected the time-based book view section 1112, a display time-based book view process 1148 executes a time-based book view routine 1150.

After executing the appropriate routine based upon the user's selection, a decision process 1152 determines if the user has selected another section in the main menu 1100. If so, the option process 1126 is repeated to process the next selected option.

Figure 21A:
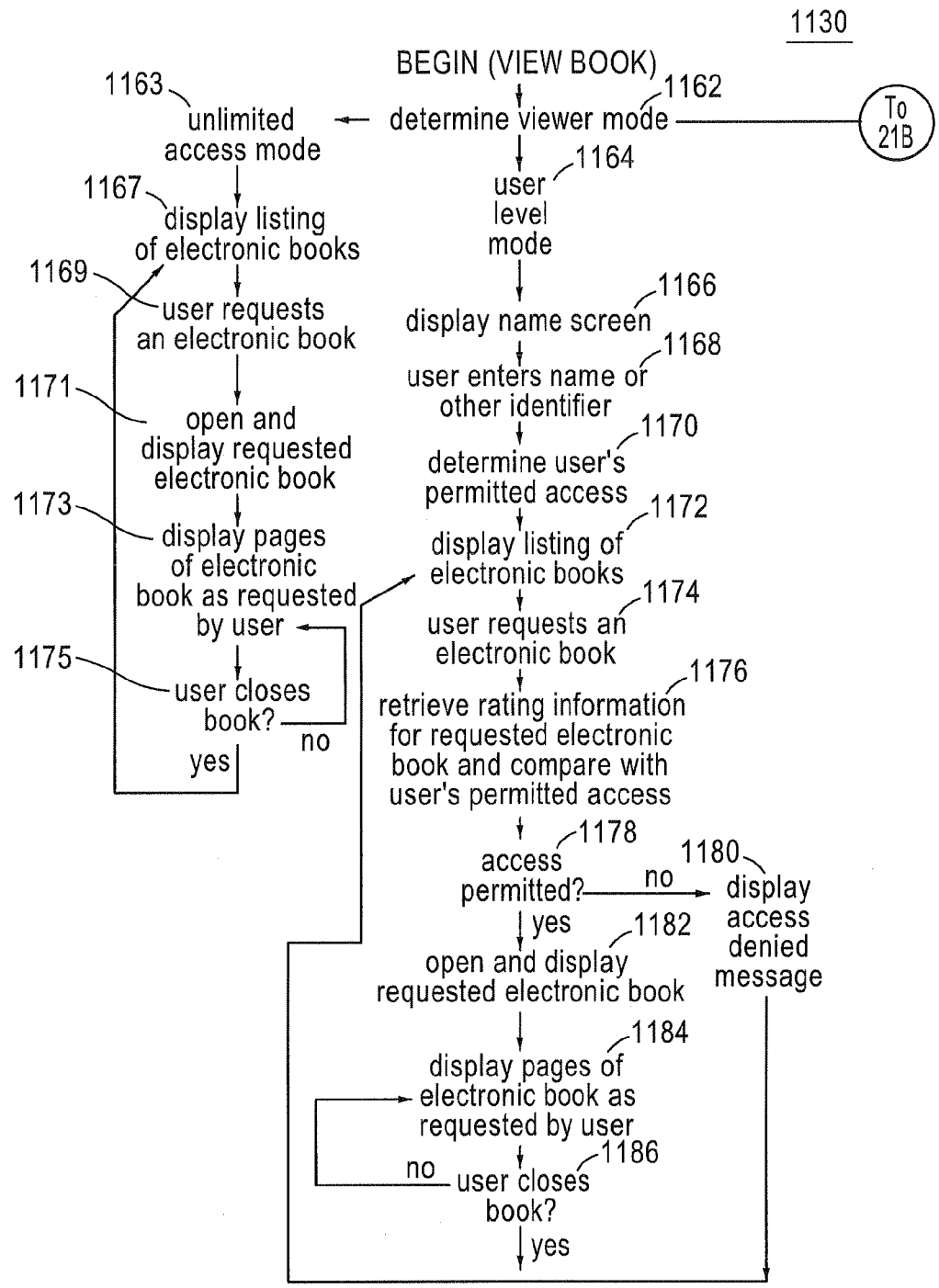
FIGS. 21A and 21B are flow charts of a view book routine.
Figure 21B:
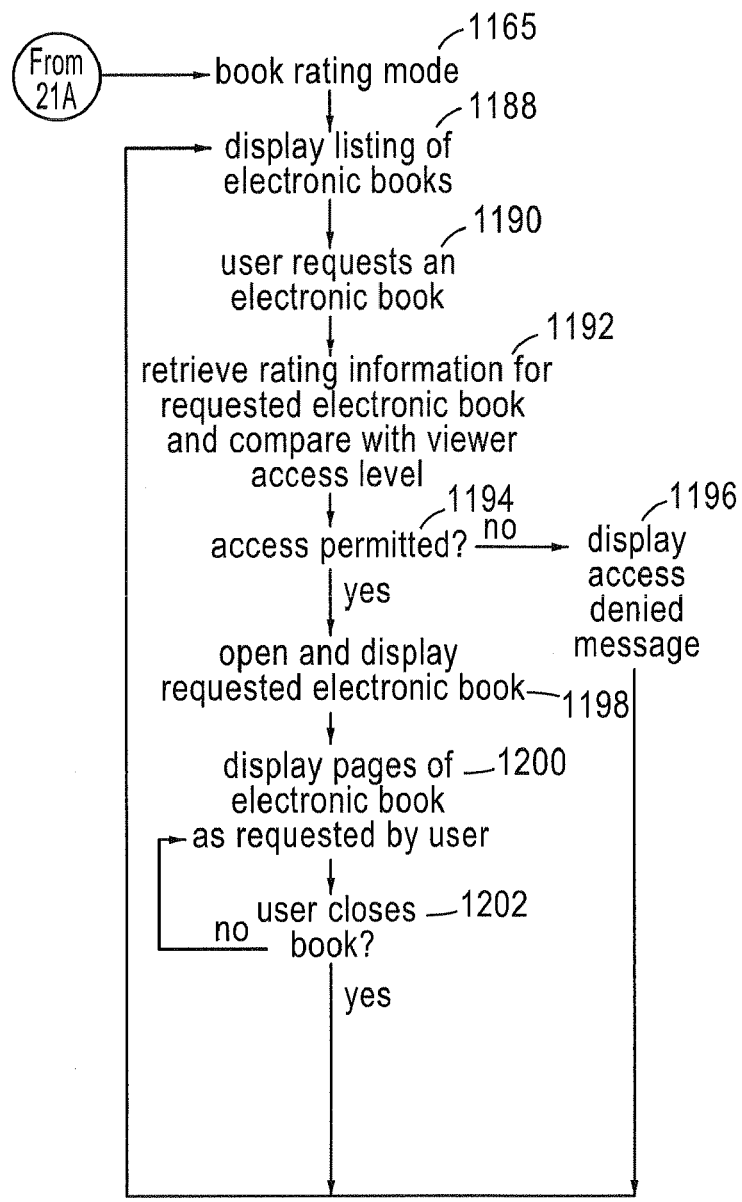
Figure 22:
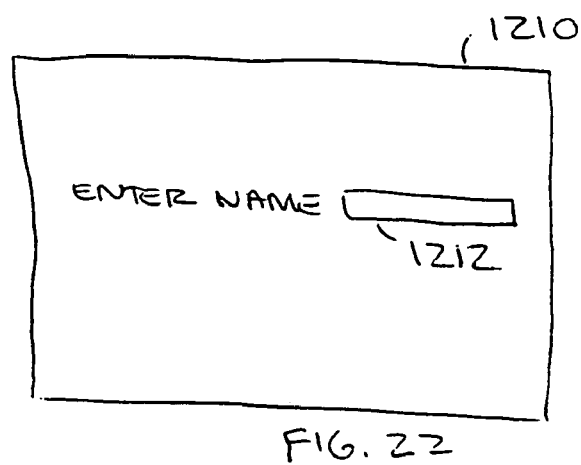
FIG. 22 is a diagram of a user name screen.

FIGS. 21A and 21B are flow charts of view book routine 1130. The view book routine 1130 may comprise software modules stored in a memory, such as the instruction memory 732 of the viewer 266 (see FIG. 11). The processor 621 then executes the view book routine 1130. The view book routine 1130 includes a viewer mode routine (or module) 1162 to determine the operating mode of the viewer 266. The viewer 266 may operate in a number of different modes, as set by a particular user or determined by default. For example, a user level mode module 1164 permits access based upon a particular access level assigned to each user and ratings assigned to the stored electronic books. A book rating mode module 1165 permits access based solely upon the ratings assigned to the stored electronic books. Alternatively, a user may operate the viewer 266 in neither the user level or book rating modes, shown as an unlimited access mode module 1163, which effectively disables the restricted access features. Other modes or default modes are possible for use with restricted access features. The processor 621, using the viewer mode module 1162 determines if the viewer 266 is operating in the user level mode 1164, the book rating mode 1165, the unlimited access mode 1163, or another mode. If operating in the user level mode 1164, a display name screen module 1166 displays a screen requesting a user's name or other identifier. FIG. 22 illustrates an example of a name screen 1210 for display on the viewer 266 and including a name section 1212 for the user to enter a name or other identifier.

The processor 621 uses a name process module 1168 to receive the user's entered name or identifier. An access module 1170 determines the user's permitted access, which it may accomplish by retrieving from a database an access level assigned to the user. The database, stored for example in the instruction memory unit 632 or within the instruction memory 732, may include a table cross-referencing user names or identifiers with access levels. Table 1 illustrates an example of access levels one (1) through n and books rates l, m, and n.

TABLE 1

| user identifier | access level | meaning |
|---|---|---|
| user1 | 1 | access to all electronic books |
| user2 | 2 | access to no electronic books |
| user3 | 3 © 48 | access to electronic books rated 1-m |
| ... | | |
| userN | N | access to electronic books rated m-n |

Figure 23:
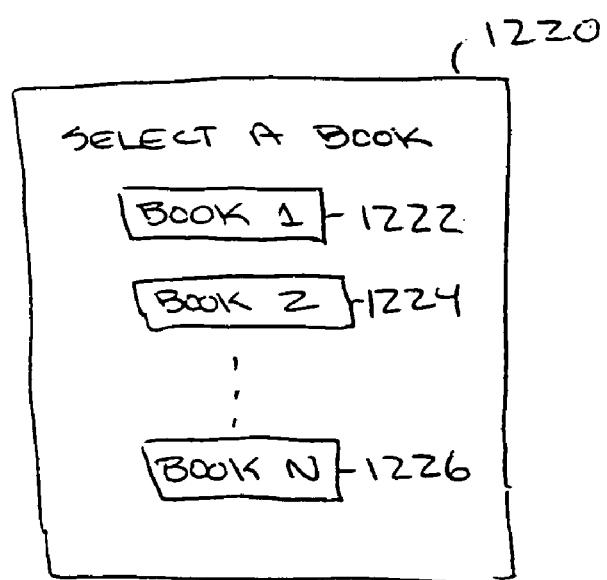
FIG. 23 is a diagram of a select book screen.

A display module 1172 displays a listing of the stored electronic books or a sub-set of them that are available to the users based on their entered user identifiers. FIG. 23 illustrates a select a book screen 1220 for display on the viewer 266 and including sections 1222, 1224, and 1226 identifying stored electronic books 1, 2 and N, respectively.

Returning to FIG. 21A, a request module 1174 receives the user's selection of a requested electronic book. The user may choose an electronic book for viewing by positioning the cursor on one of the sections 1222, 1224 and 1226 identifying the desired electronic book in the select a book screen 1220 and selecting a desired section on screen, or by entering a particular command using a keyboard or other peripheral device. The processor, using a rating module 1176 then retrieves the rating information for the selected electronic book and compares the information with the user's permitted access.

The rating information may be stored within a header file for each electronic book. The information contained in the header file may be used to identify and categorize each electronic book for display and for other purposes, such as associating a rating with the electronic book or for searching. As new electronic books are stored on the viewer 266 or library unit 262, this header information may be extracted from the header file and stored in a database resident on the viewer 266 or library unit 262, such as in memory 600 or 600'. The header information associated with each electronic book typically includes the information shown in Table 2, and can be stored, for example, in records or other database structures.

The header file may contain a rating field for storing ratings or rating information for the corresponding electronic book. The header file may also contain other fields relevant to controlling access to electronic books. The header file may include a restricted version field to identify whether the corresponding electronic book is a restricted or unrestricted version; a page-based book view field to identify information for use in determining the particular order of pages for the page-based book view option; a content-based book view field to identify information for use in determining the particular order of sections for the content-based book view option; and a time-based book view field to identify information for use in determining the particular time of viewing pages for the time-based book view option.

TABLE 2

Title:
Authors:
    Primary Author:
    Author 2:
    Author 3:
    Author 4:
    Author 5:
ISBN #:
Library of Congress # (LC #)
Dewey Decimal Classification # (DDC #)
Publisher:
Edition Number:
Date of Publishing:
Related Categories:

| | |
|---|---|
| Category 1 | Category 6 |
| Category 2 | Category 7 |
| Category 3 | Category 8 |
| Category 4 | Category 9 |
| Category 5 | Category 10 |

Related Keywords:

| | |
|---|---|
| Keyword 1 | Keyword 6 |
| Keyword 2 | Keyword 7 |
| Keyword 3 | Keyword 8 |
| Keyword 4 | Keyword 9 |
| Keyword 5 | Keyword 10 |

Figure 24:
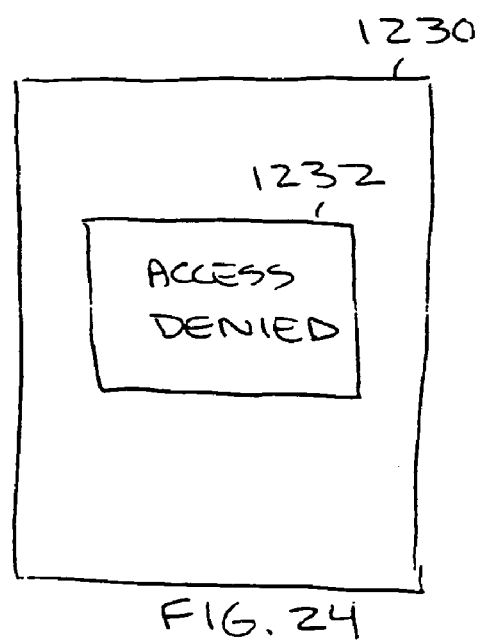
FIG. 24 is a diagram of an access denied screen.

User Defined Criteria 1:
User Defined Criteria 2:
User Defined Criteria 3:
User Defined Criteria 4:
User Defined Criteria 5:
Book Summary/Description:
User Entered Notes:
Rating:
Restricted Version:
Page-Based Book View:
Content-Based Book View:
Time-Based Book View:

Using a decision module 1178, the processor 621 determines if the user is permitted access to the selected electronic book. It may make this determination by comparing the retrieved rating for the requested electronic book with the permitted access for the user's access level, as shown for example in Table 1. If no access is permitted, the processor 621 uses a display module 1180 and displays an access denied message. FIG. 24 illustrates an access denied screen 1230 for display on the viewer 266 and for displaying an access denied message 1232. Otherwise, if the user is permitted access, the processor 621 uses an open module 1182 to open and display the requested electronic book, and a display module 1184 to display pages of the electronic book as requested by the user.

Figure 25:
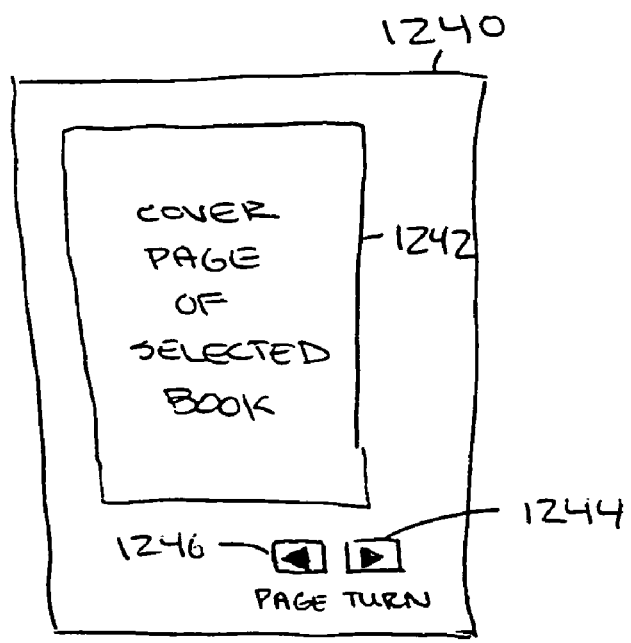
FIG. 25 is a diagram of an electronic book cover page screen.

FIG. 25 illustrates a book access screen 1240 displaying a cover page 1242 of a requested electronic book to which access is permitted. The book access screen 1240 also displays a page forward button 1244 and a page backward button 1246 to permit a user to page forward and backward, respectively, in the displayed electronic book by selecting the appropriate button. The processor 621 uses a decision module 1186 to determine if the user has closed the displayed electronic book and, if so, routine 1130 returns to display module 1172 to display the listing of the stored electronic books in the select a book screen 1220. A user may close a displayed electronic book by selecting an icon displayed on the screen, for example, or by entering, using a keyboard or other device, a particular command.

If the viewer 266 is in the book rating mode 1165, the processor 621, using a display module 1188, displays the listing of electronic books, as illustrated in the select a book screen 1220. Using a request module 1190, the processor 621 receives a user's requested electronic book, and with a rating module 1192, retrieves rating information for the requested electronic book and compares the rating information with the viewer access level. The processor 621 next uses a decision module 1194 to determine if access to the requested electronic book is permitted by determining, for example, if the rating for the requested electronic book is within the range of ratings for which access is permitted for the particular viewer mode. If not, using a display module 1196, the processor 621 may display an access denied message, as illustrated in the access denied screen 1230. Otherwise, if access is permitted, the processor 621 uses an open module 1198 to open and display the requested electronic book, and a display process 1200 to display pages of the electronic book as requested by the user, as illustrated in the book access screen 1240. Using a decision module 1202, the processor 621 determines if the user closes the displayed electronic book. If so, the view book routine 1130 returns to a display module 1188 to display the listing of electronic books on the select a book screen 1220. The access levels may be assigned, for example, locally by a particular user or by a supplier or distributor upon sale of an electronic book or providing a subscription to one.

If the viewer 266 is in the unlimited access mode 1163, the processor 621 uses a display module 1167 to display a listing of the stored electronic books or a sub-set of stored electronic books that are available to the user based on the entered user identifier. FIG. 23 illustrates the select a book screen 1220 for display on the viewer 266 and includes name sections identifying stored electronic books. Returning to FIG. 21, the processor 621 uses a request module 1169 to receive the user's selection of a requested electronic book. The user may choose an electronic book for viewing by positioning the cursor on a section identifying the desired electronic book on the select a book screen 1220 and selecting the action denied section, or by entering a particular command using a keyboard or other device. The processor 621 then uses an open module 1171 to open and display the requested electronic book, and a display module 1173 to display pages of the electronic book as requested by the user.

FIG. 25 illustrates a book access screen 1240 displaying a cover page 1242 of a requested electronic book to which access is permitted. The book access screen 1240 also displays a page forward button 1244 and a page backward button 1246 to permit a user to page forward and backward, respectively, in the displayed electronic book by selecting the appropriate button. The processor 621 uses a decision module 1186 to determine if the user has closed the displayed electronic book and, if so, routine 1130 returns to display module 1175 to display the listing of the stored electronic books in the select a book screen 1220. A user may close a displayed electronic book by selecting an icon displayed on the screen, for example, or by entering, using a keyboard or other device, a particular command.

Figure 26:
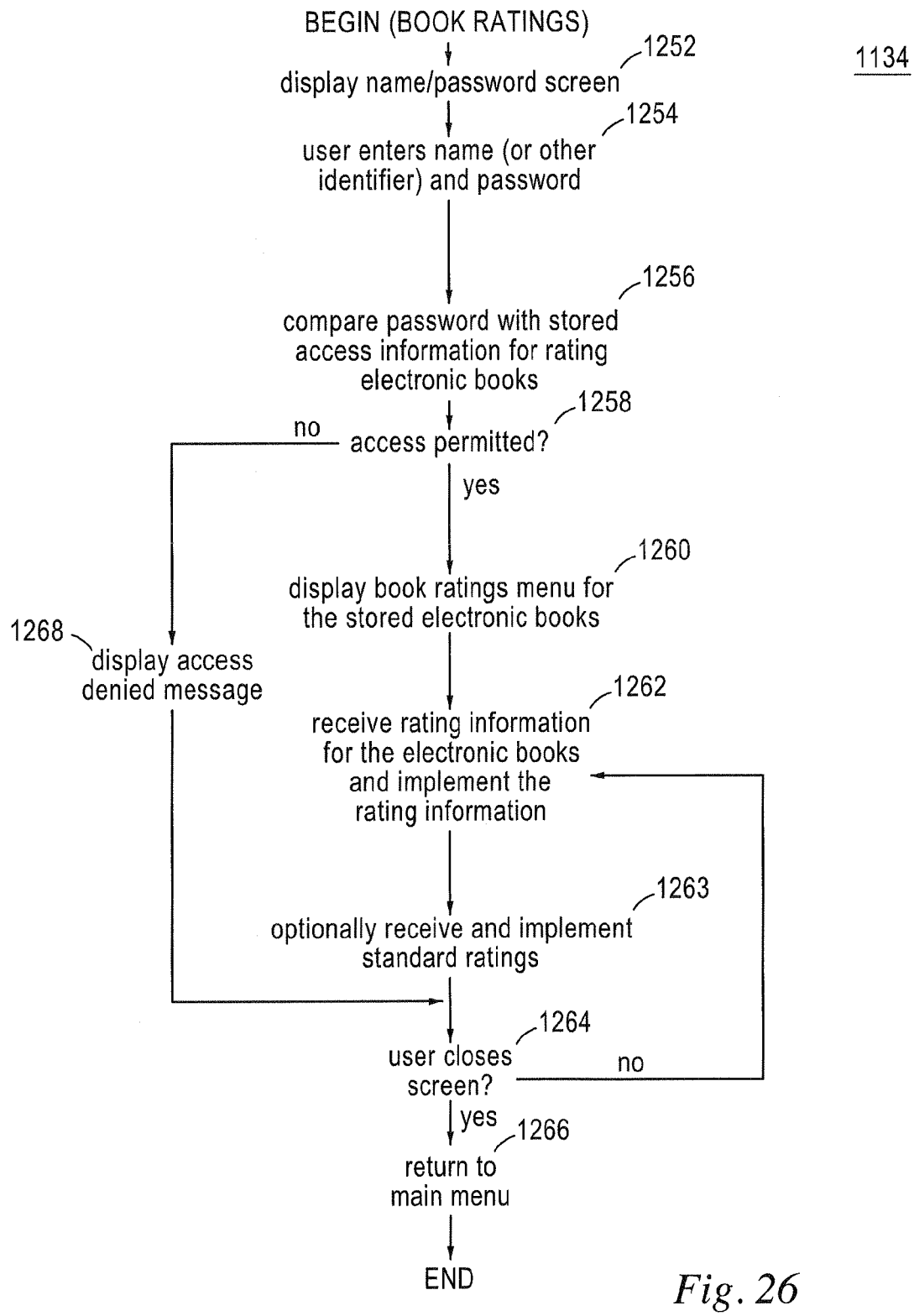
FIG. 26 is a flow chart of a book ratings routine.

FIG. 26 is a flow chart of a book ratings routine 1134. The book ratings routine 1134 may be implemented within the viewer 266, the library 262, or a combination; for example, it may be implemented by software modules residing within the instruction memory unit 632 for execution by the library processor 628 or within the instruction memory 732 for execution by the viewer processor 621, or by hardware modules, or a combination of hardware and software modules. In the book ratings routine 1134, the processor 621 uses a name/password module 1252 to display a name and password screen for permitting a particular user to enter a name or other identifier for a user and a corresponding password. The password may include an alphanumeric string or any type of information used to verify a user's identity. The particular user has the ability to enter and change user access levels and book ratings.

Figure 27:
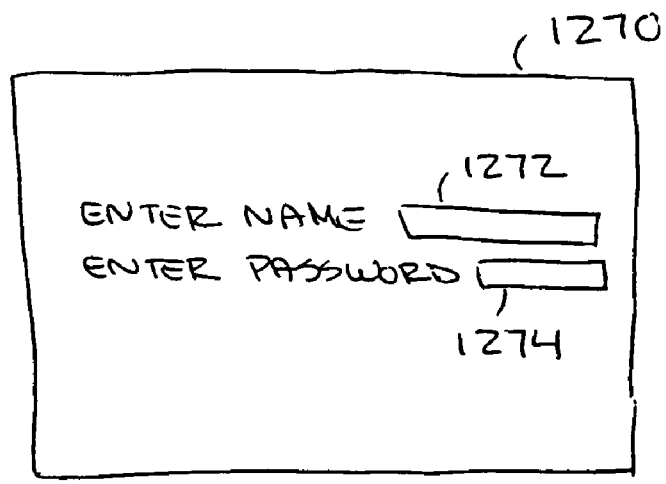
FIG. 27 is a diagram of a user name and password screen.

FIG. 27 illustrates a password screen 1270 for display on the viewer 266 and having name and password sections 1272 and 1274, respectively, for permitting the user to enter a name or other identifier and a password. Using a receive module 1254, the processor 621 receives the user's entered name or other identifier and the user's corresponding password. The processor 621 then uses a compare module 1256 to compare the user's entered password with stored access information relating to rating of the stored electronic books. The processor 622 uses a decision module 1258 to determine if the user is permitted to enter book ratings by, for example, determining if the user's name and password matches the stored access information. If not, using a display module 1268, the processor 621 displays an access denied message, as illustrated in FIG. 24.

Figure 28:
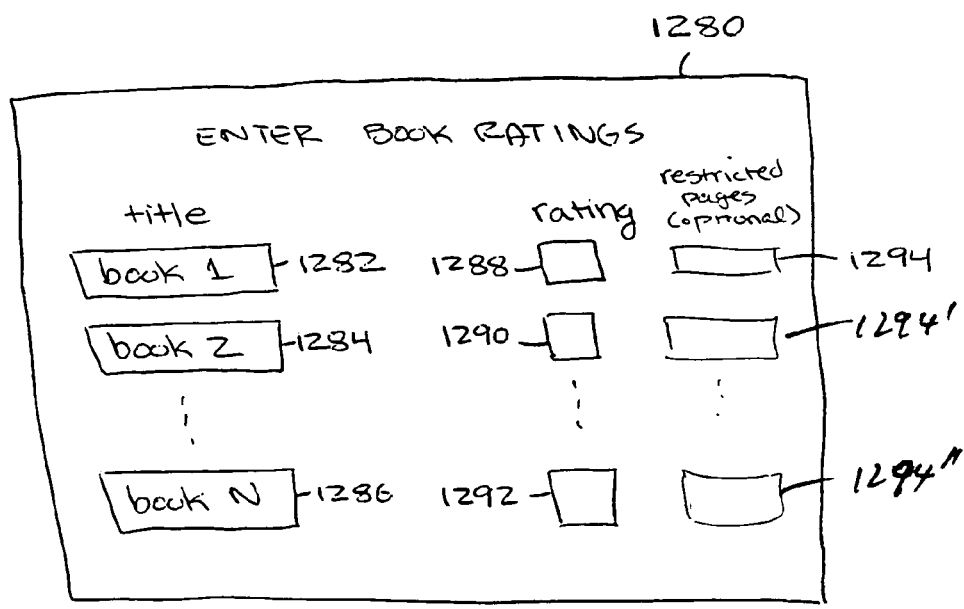
FIG. 28 is a diagram of a book ratings screen.

If the user is permitted access, the processor 621, using display module 1260, displays a book ratings menu. FIG. 28 illustrates a book ratings screen 1280 for display on the viewer 266 that permits a user to enter ratings for stored electronic books.

The book ratings screen 1280 displays book sections 1282, 1284 and 1286 that list electronic books 1-N. associated with each of the book sections is one of a rating section 1288, 1290, and 1292. In addition, optional page restrictions sections 1294-1294" may be used to restrict access to specific pages in an electronic book.

Returning to FIG. 26, the processor 621 uses a receive module 1262 to receive the user's entered rating information for the stored electronic books and implements the rating information. The viewer 266 or library unit 262 may store the rating information in a database structure, such as a table, for later access and retrieval. The rating information may relate to a content of a corresponding electronic book by, for example, indicating restriction of particular content, a particular type of content, a particular portion of the content, or another type of restriction. The processor 621 then uses a receive standard ratings module 1263 to optionally receive and implement standard ratings, the implementation of which depends upon the particular standard; the standard ratings may be entered by a user or may be predetermined by, for example, a publisher or an operations center.

Using a decision module 1264 the processor 621 determines if the user closes the book ratings screen 1280. If not, the book ratings routine 1134 may continue to receive rating information. If the user did close the book ratings screen 1280, a return module 1266 is used to return to the main menu and display the main menu screen 1100. The phrase close a screen or close screen refers to removing from display information displayed on a screen of the viewer, and a user may close a screen by selecting an icon displayed on the screen, for example, or by entering via a keyboard or other device a particular command.

Figure 29:
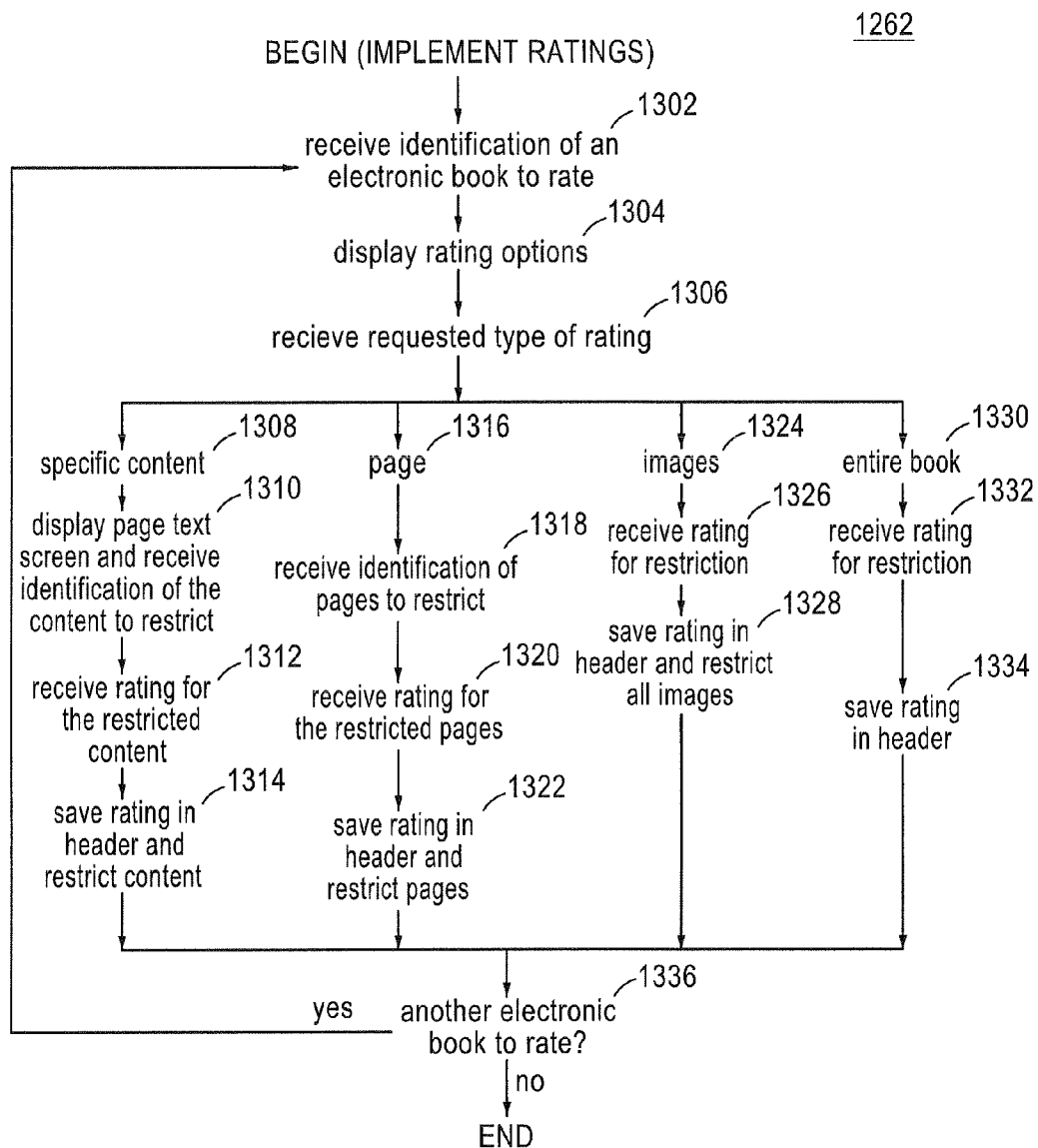
FIG. 29 is a flow chart of an implement ratings process.

FIG. 29 is a flow chart of implement ratings module 1262, including examples of various ways in which the user may restrict access to the stored electronic books. In the implement ratings module 1262, the processor 621 uses a receive module 1302 to receive the user's identification of an electronic book to rate, which may be accomplished by determining which section the user selected in the book ratings screen 1280 or by determining in which corresponding section a user entered a rating in screen 1280. Using a display ratings module 1304, the processor 621 may display rating options, if desired by a user, and rating options may be implemented by using rating numbers or characters to determine the type of rating. Alternatively, the processor 621 may present another screen with rating options or present such options within separate sections of the book ratings screen 1280. Next, the processor 621 uses a receive module 1306 to receive and process the user's requested type of rating. If the user requested restriction of specific content, as determined using the specific content module 1308, a receive content module 1310 is used to display a text screen for displaying pages of an electronic book to a user and for permitting a user to identify information to restrict. The receive content module 1310 is also used to receive an identification of content to restrict. A text screen, examples of which are provided in FIGS. 30a-30f, is a screen displaying a page of an electronic book, the page having information possibly including text, graphics, images, video, or other information capable of visual display. A receive rating module 1312 is used to receive a rating for the restricted content, and a save module 1314 is used to save the entered rating in the header file for the electronic book and restricts the identified content.

If the user requested restriction of specific pages, as determined by the processor 621 using page restriction module 1316, a receive module 1318 is used to receive identification of pages to restrict, as entered in, for example, in section 1294 of the book ratings screen 1280. A receive rating module 1320 is used to receive a rating for the restricted pages, and a save module 1322 is used to save the rating in the header file for the electronic book and restricts the identified pages.

If the user requested restriction of images, as determined during execution of an images module 1324, a receive module 1326 is used to receive a rating for the restricted images, and a save module 1328 is used to save the rating in the header file for the electronic book and restricts the images.

If the user requested restriction of the entire content of an electronic book, as determined by the processor 621 using an entire book module 1330, a receive module 1332 is used to receive a rating for the restriction, and a save module 1334 is used to save the entered rating in the header file for the electronic book.

Table 3 provides an example of rating options and particular ratings, if the rating options are determined by characters or numbers entered in the ratings sections 1288, 1290, and 1292, shown in FIG. 28. In Table 3, a user would enter a number, for example, as the particular ratings m, n, o, and p. Alternatively, default ratings may be used, as determined for example of different characters or symbols identifying rating options and as further illustrated in Table 3. The viewer 266 may store the entered type of ratings and particular ratings for each electronic book in the header file for each electronic book or in a database table or another type of structure in the instruction memory unit 632 or within the instruction memory 732 to cross-reference the ratings with the electronic books. Ratings may also be based upon standard ratings such as those used in conjunction with the device known as the v-chip, or any type of ratings pre-assigned to the electronic books by, for example, a publisher.

TABLE 3

| rating | meaning |
| --- | --- |
| C-m | restrict by content, rating m applied to restricted content |
| P-n | restrict pages entered in section 1294, rating n applied to restricted pages |
| I-o | restrict images, rating o applied to the images |
| B-p | restrict entire content of the book, rating p applied to the book |
| ... | |
| C-d | restrict by content, default rating applied to restricted content |
| P-d | restrict pages entered in section 1294, default rating applied to restricted pages |
| I-d | restrict images, default rating applied to the images |
| B-d | restrict entire content of the book, default rating applied to the book |

Returning to FIG. 29, upon completion of restricting access to a particular electronic book, a decision process module 1336 is used to determine if the user has selected another electronic book to rate. If so, the implement ratings module 1262 returns to the receive module 1302 for the processor 621 to perform the processes for restricting and rating the next selected electronic book.

FIGS. 30a-30f are diagrams of screens for display on the viewer 266 to illustrate in conjunction with implement ratings module 1262 different ways in which a particular user may restrict access to electronic books. FIG. 30a is a diagram of a page text screen 1340, which the viewer 266 may display upon a user requesting restriction of specific content. A restrict section 1341 permits a user to restrict selected content, and selection of page turn sections 1343 and 1345 permit a user to page backward and forward, respectively, in the displayed electronic book by selecting the appropriate section. FIG. 30b is a diagram of page text screen 1340 with selected text 1342 to be restricted. Upon a user selecting restrict section 1341, the viewer 266 restricts access to the selected text. FIG. 30c is a diagram of page text screen 1340 with restricted text section 1344, illustrating removal of the restricted text when viewed by a user who does not have an access level permitting viewing of the restricted text.

FIG. 30d is a diagram of a page text and graphics screen 1346 illustrating an image 1348 within a displayed page of an electronic book. A user may restrict the image by selecting the image, as indicated in FIG. 30e illustrating image 1350 having a different shaded background to indicate its selection. Upon selecting restrict section 1341, the viewer 266 restricts access to the image, and FIG. 30f illustrates removal of the image to display a restricted portion 1352 when viewed by a user who does not have an access level permitting viewing of the restricted image.

For restriction of particular content, as opposed to an entire book, such as the restriction by specific content (module 1308), page (module 1316), or images (module 1324), in one embodiment the viewer 266 restricts the particular content by saving another version of the restricted electronic book with the restricted portions deleted. Therefore, the viewer 266 may store two versions of the same electronic book for restricting access. A first version is the original version, such as that received from a publisher, and includes all content. A second version has all restricted content deleted, such as described with respect to FIGS. 30a-30d. The header file for each electronic book may use the restricted version field to identify whether the corresponding book is the first (unrestricted) or second (restricted) version, and the restricted version field may also, if desired or necessary, cross-reference the two versions.

Figure 31:
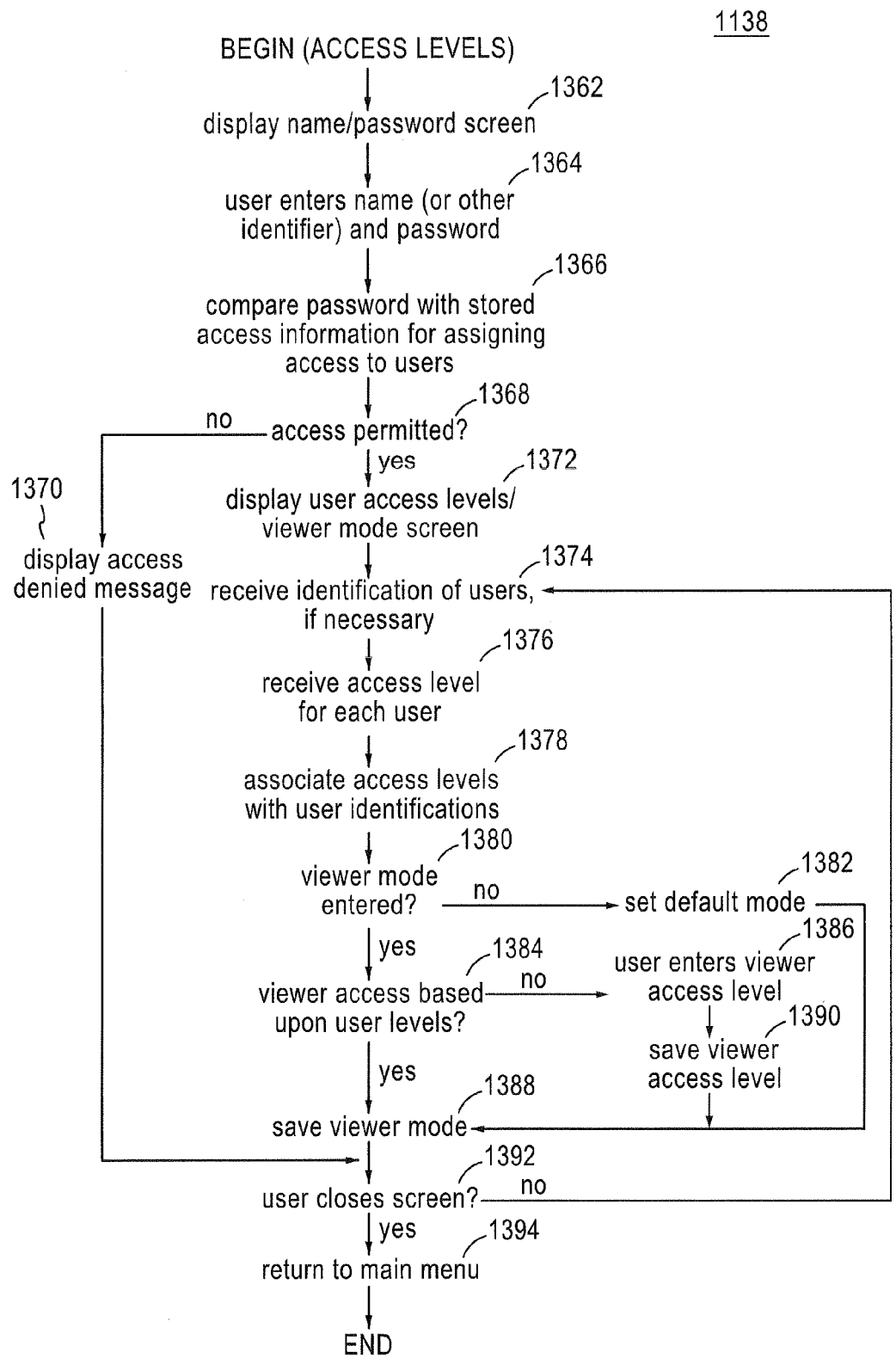
FIG. 31 is a flow chart of an access levels routine.

FIG. 31 is a flow chart of an access levels routine 1138. The access levels routine 1138 may be implemented within the viewer 266, the library 262, or a combination; for example, the access levels routine 1138 may be implemented by software modules residing within the instruction memory unit 632 for execution by the library processor 628 or within the instruction memory 732 for execution by the viewer processor 621, or by hardware modules, or a combination of hardware and software modules. In the access levels routine 1138, a display name/password module 1362 is used to display the password screen 1270 permitting a user to enter a name or other identifier and a corresponding password. A receive module 1364 is used to receive the user's entered name or other identifier and entered password. An electronic book viewer, such as the viewer 266, may contain identification of a default user and password, allowing for initial set-up of additional users and their associated access levels by entering the default information using the password screen 1270 and the receive module 1364. The default user and password information may be pre-assigned and subsequently provided to a particular user. A compare module 1366 is used to compare the password with stored access information related to assigning access levels to users. A decision module 1368 is used to determine if the particular user is permitted to enter access levels for other users, typically determined by whether the password matches the stored access information. If not, a display module 1370 is used to displays an access denied message, as illustrated in the access denied screen 1230.

Figure 32:
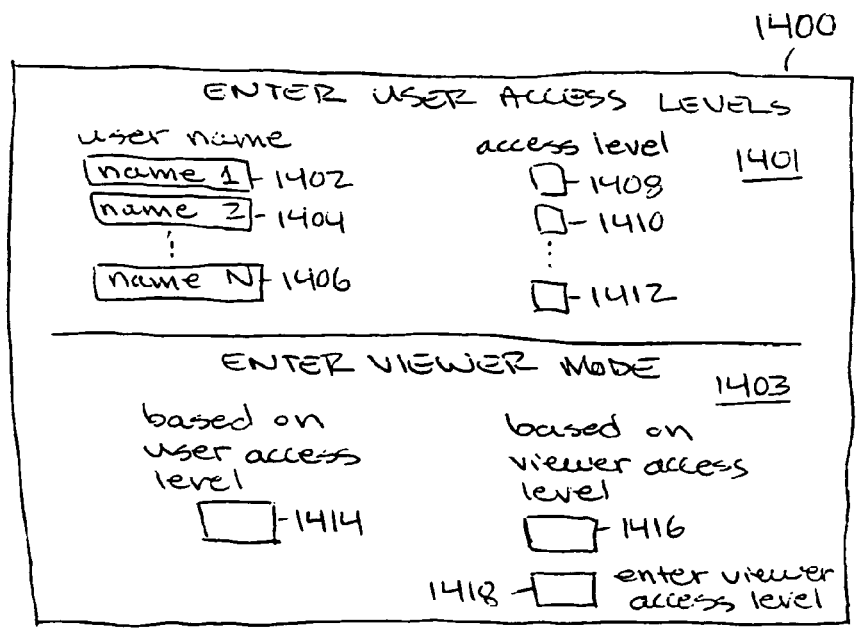
FIG. 32 is a diagram of an access levels and viewer mode screen.

Otherwise, if the user is permitted access, a display module 1372 is used to display a user access levels/viewer mode screen. FIG. 32 illustrates an access levels/viewer mode screen 1400 for display on the viewer 266. The screen 1400 includes an access levels section 1401 permitting the user to enter access levels for other users. The screen 1400 includes name sections 1402, 1404, and 1406 identifying users and, if necessary, permitting entry of information identifying a potential user. Corresponding access levels sections 1408, 1410, and 1412 permit the user to enter access levels for, respectively, users identified by sections 1402, 1404, and 1406. A viewer mode section 1403 permits the user to enter a mode for the viewer 266. By selecting user access level section 1414, the user may set the viewer 266 in a mode to restrict access by both user access levels and book ratings. By selecting viewer access level section 1416, the user may restrict access based solely on the book ratings and may enter a particular level in section 1418 to control the level of restriction.

Table 4 provides an example of electronic books that a user may access based upon a particular viewer access level entered in section 1418 while in the viewer mode. The viewer mode restricts access to the stored electronic books based upon a rating for each electronic book. A user may enter the parameters r, s, t, and u, or they may be predetermined or established, for example, by a publisher.

TABLE 4

| viewer access level | electronic books that may be accessed |
| --- | --- |
| 1 | no electronic books |
| 2 | all electronic books |
| 3 | only electronic books rated 1-s |
| ... | |
| r | only electronic books rated t-u |

Returning to FIG. 31, a receive identification module 1374 is used to receive identifications of users, if necessary, in screen 1400. A receive access levels module 1376 is used to receive access levels entered in, for example, access levels sections 1408, 1410, and 1412. An associate access levels module 1378 is used to associate the entered access levels with the corresponding users and saves such information in a database structure, such as shown in Table 1, for later access and retrieval. A decision module 1380 is used to determine if a viewer mode has been entered in viewer mode section 1403. If not, a default module 1382 is used to set a default mode. A default mode may be predetermined and stored in the viewer 266, or determined and entered by a user. Otherwise, a decision module 1384 is used to determine if the user has entered a viewer mode based upon access levels by selecting user access levels section 1414. If not, a receive module 1386 is used to receive a viewer access level in section 1418, and a save module 1390 is used to save the entered level. A save view mode module 1388 is used to save the viewer mode, in this example either a mode based upon user access levels and book ratings (user access level mode) or based solely upon book ratings (viewer access level mode), or neither of those modes.

A decision module 1392 is used to determine if the user closes screen 1400. If not, the routine 1138 may continue to receive access levels and viewer modes. If the user does close screen 1400, a return module 1394 is used to return to the main menu to display main menu screen 1100.

Figure 33:
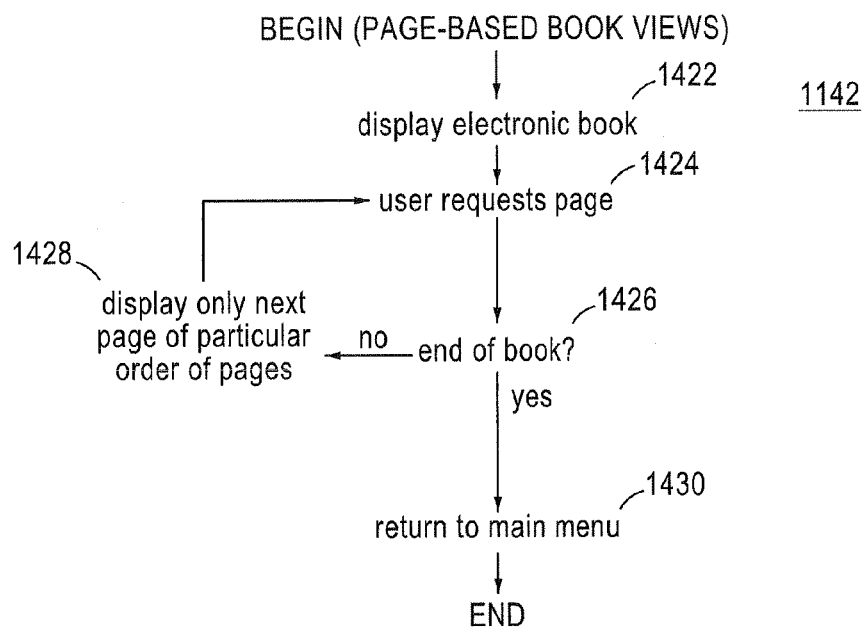
FIG. 33 is a flow chart of a page-based book view routine.

FIG. 33 is a flow chart of page-based book view routine 1142. The page-based book view routine 1142 may be implemented within the viewer 266, the library 262, or a combination; for example, it may be implemented by software modules residing within the instruction memory unit 632 for execution by the library processor 628 or within the instruction memory 732 for execution by the viewer processor 621, or by hardware modules, or a combination of hardware and software modules. In the page-based book view routine 1142, a display module 1422 is used to display an electronic book. FIG. 34 illustrates a text screen 1425 for display on the viewer 266 for the page-based book view routine 1142. The text screen 1425 displays a page of an electronic book, and it includes a next page section 1427 for selection by a user to select the next page of the displayed electronic book.

A request module 1424 is used to receive a user's request for a next page, such as by the user selecting next page section 1427. Alternatively, a user may be required to perform a predefined action such as taking an interactive quiz, prior to being allowed to move to the next page. A decision module 1426 is used to determine if an end of the electronic book is displayed. If so, a return module 1430 is used to return to the main menu to display main menu screen 1100. If the end of the electronic book is not displayed, a display module 1428 is used to display only the next page of a particular order of pages of the electronic book. The viewer 266 may store a particular order for the pages, such as a sequential order, and therefore require that the user view the pages in sequential order. Other orders of pages may similarly be saved. In addition, the particular order may be changed by a user to re-order the pages for a subsequent page-based book view, and different stored electronic books may have different associated page orders for viewing them in the page-based book view mode. The particular order may be stored in the page-based book view field in the header file for each electronic book, or it may be stored elsewhere and referenced by information in the page-based book view field.

Figure 35:
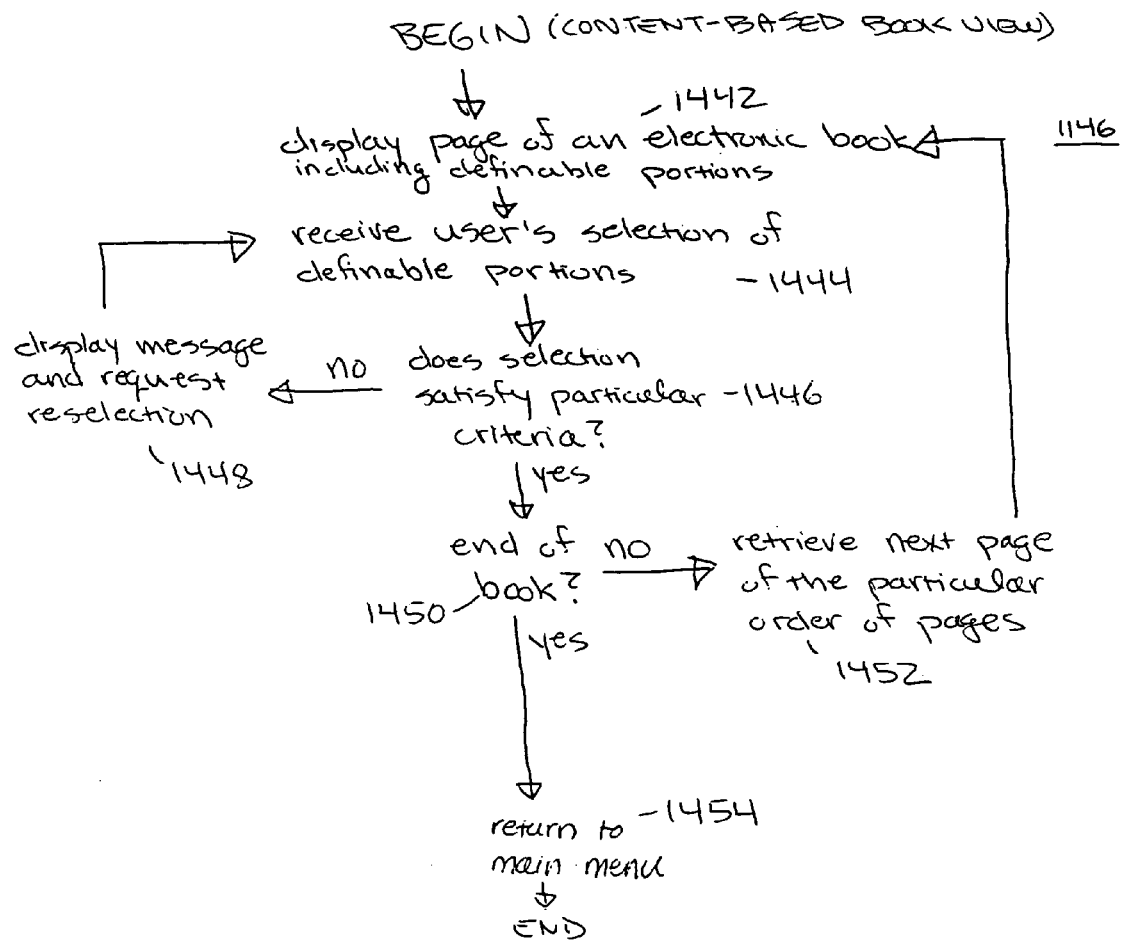
FIG. 35 is a flow chart of a content-based book view routine.
Figure 36:
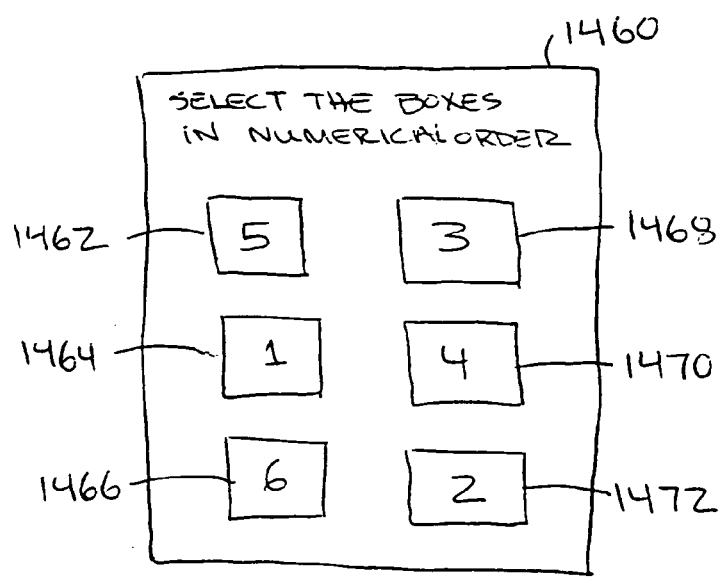
FIG. 36 is a diagram of a content-based book view screen.

FIG. 35 is a flow chart of content-based book view routine 1146. The content-based book view routine 1146 may be implemented within the viewer 266, the library 262, or a combination; for example, it may be implemented by software modules residing within the instruction memory unit 632 for execution by the library processor 628 or within the instruction memory 732 for execution by the viewer processor 621, or by hardware modules, or a combination of hardware and software modules. In content-based book view routine 1146, a display module 1442 is used to display a page of an electronic book having particular sections. FIG. 36 illustrates a content restriction screen 1460 for display on the viewer 266 and having sections 1462, 1464, 1466, 1468, 1470, and 1472. The content-based book view routine 1196 restricts access to the electronic book displayed in screen 1460 by displaying the next or another page only when the user selects the sections in a particular order, in this example, in numerical order. Other types of restriction are possible for teaching or other purposes. For example, an electronic book used for teaching mathematics could include a page or pages with example problems of increasing difficulty. Associated with each problem could be a model answer. The user's access to the problems may be restricted, using the routine 1146, such that the user is provided access to a subsequent problem only after first successfully answering a prior problem.

The viewer 266 may store a table or other database structure cross-referencing each page of an electronic book with a selection order for the sections on each page. The header file for each electronic book may store that information in the content-based book view field, or the content-based book view field may include a reference to the information stored elsewhere. The viewer 266 can retrieve that information in order to compare the user's selection with the stored selection to determine whether to display the next page. Table 5 provides an example of an order of selection for an electronic book displayed on the content restrictions screen 1460 and possibly having other pages. As shown in Table 5, each page may have its own particular selection order in which the displayed sections must be selected to view the next page, and each page may also instruct the user to select the displayed sections in a particular order, for example, sequential, reverse sequential, only the odd numbered sections, or only the even numbered sections. In addition, the listing of the pages in the table may identify the order in which the pages are to be displayed; alternatively, the viewer 266 may permit the user to view any other page after selecting the sections on a displayed page in the particular order.

TABLE 5

| page | selection order for sections |
|------|------------------------------|
| 1 | 1, 2, 3, 4, 5, 6 |
| 2 | 6, 5, 4, 3, 2, 1 |
| 3 | 1, 3, 5 |
| 4 | 2, 4, 6 |
| ... | |
| m | m1, m2, . . . mn |

The processor 621 uses a receive process 1444 receives the user's selection of the sections in the displayed page of the electronic book. A decision module 1446 is used to determine if the selection satisfies particular criteria relating to the restricted access. If not, a message module 1448 may be used to display a request for the user to reselect the portions. If the selection does satisfy the criteria, a decision module 1450 is used to determine if the end of the electronic book is displayed. If not, a retrieve module 1452 may be used to retrieve the next page of the particular order of pages and returns to display module 1442 to display that page. The next displayed page may also have sections that must be selected in a particular order to again advance to the next page. If the end of the book is displayed, a return module 1454 may be used to return to the main menu to display screen 1100.

Figure 37:
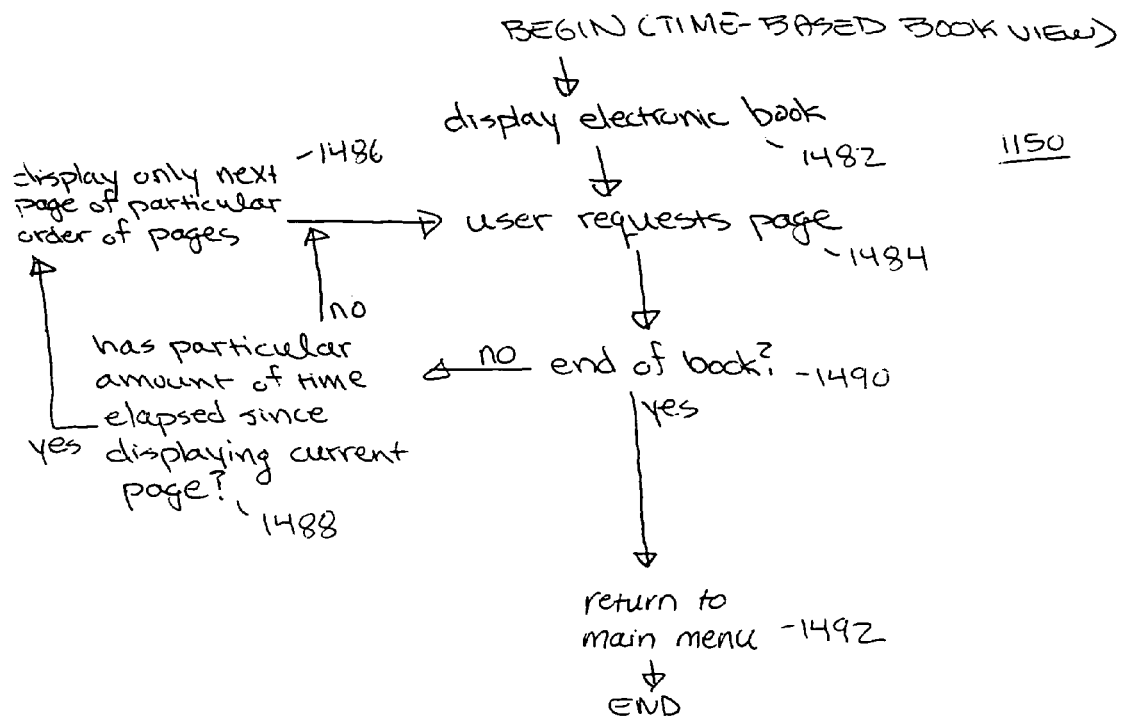
FIG. 37 is a flow chart of a time-based book view routine.

FIG. 37 is a flow chart of a time-based book view routine 1150. The time-based book view routine 1150 may be implemented within the viewer 266, the library 262, or a combination; for example, it may be implemented by software modules residing within the instruction memory unit 632 for execution by the library processor 628 or within the instruction memory 732 for execution by the viewer processor 621, or by hardware modules, or a combination of hardware and software modules. This routine requires that the user view each page of a displayed electronic book for a particular time period before the viewer 266 will display the next page. In the time-based book view routine 1150, a display module 1482 my be used to display a page of an electronic book, for example, as shown in text screen 1425. A request module 1484 may be used to receive a requested next page from a user. In response, a decision module 1490 may be used to determine if the end of the book is displayed and, if so, a return module 1492 may be used to return to the main menu to display screen 1100.

If the end of the electronic book is not displayed, a decision module 1488 is used to determine if a particular amount of time has elapsed since displaying the current page. The viewer 266 or library unit 262 may include an internal timer, such as a timer provided by the viewer processor 621 or the library processor 628, triggered by a page selection in order to determine if the particular amount of time has elapsed. The particular amount of time may be predetermined or entered by a particular user, and it may be stored in the time-based book view field of the header file for the corresponding book or referenced by information in the time-based book view field. In addition, each page may include the same amount of particular time for viewing or varying amounts of time.

Table 6 is an example of a table providing viewing times for pages of a particular electronic book. Upon display of a particular page by the viewer 266, it may retrieve the corresponding viewing time for that page from the appropriate table or other database structure and also trigger a timer, or obtain a time stamp or time information from a running timer. The viewing time information may be stored in the time-based book view field for the corresponding electronic book, or it may be stored elsewhere and referenced by information in the time-based book view field. In addition, the listing of pages in the table may identify the order in which the pages are displayed.

When another page is requested, the viewer 266 may obtain another time stamp or time information from the timer and compare it with the previous time stamp or time information to determine an amount of elapsed time since the current page was first displayed. If a sufficient amount of time has elapsed, a display module 1486 may be used to display the next page of a particular order of the pages, such as a sequential order. Otherwise, if a sufficient amount of time has not elapsed, routine 1150 continues displaying the current page.

TABLE 6

| page | viewing time |
|---|---|
| 1 | 2 minutes |
| 2 | 1.75 minutes |
| 3 | 1.5 minutes |
| ... | |
| m | n minutes |

The time-based book view routine 1150 may be incorporated into the viewer software to control access to specific book content. For example, if an electronic book includes a page bearing an advertisement, the routine 1150 could prevent that page from being turned until a sufficient time has elapsed to ensure the user has at least had an opportunity to view the advertisement. In another alternative use, the routine 1150 could be used in a school text book to require pages to be turned at a rate set by a teacher, or programmed into the electronic book. In these alternatives, a warning may be provided that an allowed time for viewing has elapsed, prior to a page being turned by the processor 621.

While this invention has been described in conjunction with the embodiments described above, it is evident that many alterations, modifications and variations will be apparent to those skilled in the art. Accordingly, embodiments of the invention as set forth above are intended to be only illustrative. Various changes may be made without departing from the scope of the invention as defined in the following claims and their equivalents.

The invention claimed is:

1. A method for permitting a user to restrict access to a plurality of stored electronic books for display on a viewer, comprising:
   storing and indexing a plurality of electronic books in a library unit;
   receiving identification information from a user;
   displaying a directory of the plurality of electronic books on a viewer, wherein the directory of the plurality of electronic books is displayed based on the identification information received from the user;
   determining if the user is an authorized user;
   receiving an assignment of a rating for each of the electronic books, the ratings being related to content of the electronic books;
   receiving an assignment of an access level restriction for a potential user;
   creating, at the viewer, restricted versions of electronic books to which access has been restricted by identifying restricted portions of the electronic book to be deleted from the unrestricted version of the electronic book, wherein the restricted versions maintain original formats of the electronic books;
   receiving an assignment of a page order based restriction for each of the electronic books; and
   receiving an assignment of a time based restriction for each of the electronic books, wherein each page of the electronic book must be displayed for a predetermined period of time; and
   permitting at least one user other than the authorized user to have restricted access to the electronic books based upon the received assigned ratings and the received assigned access level.

2. The method of claim 1, wherein the received assignment of a rating includes a received assignment of a particular rating within a range of ratings for each of the electronic books.

3. The method of claim 2, wherein the permitting step includes selectively permitting access to the electronic books based upon the ratings within the range of ratings.

4. The method of claim 1, further including requiring receipt of a password in order to assign receive assignment of the ratings.

5. The method of claim 1, wherein the received assignment of the rating is received from a default user.

6. A method for permitting a user to restrict access to a stored electronic book for display on a viewer, comprising:
   storing and indexing an electronic book in a library unit;
   receiving identification information from a user;
   determining if the user is an authorized user;
   receiving selected portions of the electronic book for use in restricting access to a content of the electronic book and rate access levels for at least one user other than the authorized user;
   permitting at least one user other than the authorized user to have restricted access to the content of the electronic book based upon the received selected portions, wherein an access restriction is stored in a header file of the electronic book;
   saving a restricted version of the electronic book in at least one of the library unit and the viewer, the restricted version having content from the restricted electronic book and having the received selected portions of the electronic book deleted without changing the original format of the electronic book; and
   inserting a cross reference between the restricted version and an unrestricted version of the electronic book in at least one of the restricted version and the unrestricted version of the electronic book.

7. An apparatus for permitting a user to restrict access to a plurality of stored electronic books for display, comprising:
   a memory that stores and indexes a plurality of electronic books;
   a display that displays an index of the electronic book, wherein the index of the electronic book is displayed based on identification information received from a user;
   a receiving module that receives:
   an assignment of a rating for each of the electronic books, the ratings being related to content of the electronic books;
   an assignment of an access level for each user other than an authorized user;
   selected portions of an original electronic book for which access will be restricted by deleting the received selected portions of the electronic book;
   an assignment of a page order based restriction for each of the electronic books; and
   an assignment of a time based restriction for each of the electronic books, wherein each page of the electronic book must be displayed for a predetermined period of time;

a saving module for saving a restricted version of the original electronic book, the restricted version including at least part of the original content of the original electronic book and having the received selected portions deleted without changing an original format of the original electronic book; and a permitting module that permits at least one user other than the authorized user to have restricted access to the electronic books based upon at least one of the received assigned ratings, the received assigned access level, the received assigned page order, and the received assigned time based restrictions, wherein the access restriction is stored in a header file of the electronic book.

8. The apparatus of claim 7, wherein the receiving module further includes receiving an assignment of a particular rating within a range of ratings for each of the electronic books.

9. The apparatus of claim 8, wherein the permitting module includes a selective permitting module that selectively permits access to the electronic books based upon the ratings within the range of ratings.

10. The apparatus of claim 7, further including a password module that requires receipt of a password in order to receive assignment of the ratings.

11. The apparatus of claim 7, wherein the receiving module includes a rating module that receives assignment of the rating a default user.

12. An apparatus for permitting a user to restrict access to a stored electronic book for display, comprising:

a memory that stores and indexes an electronic book;

a display unit for displaying an index having the electronic book, wherein the index is displayed based on identification information received from a user;

receiving module that receives selected portions of the electronic book for use in restricting access to a content of the electronic book; and a permitting module that permits users other than an authorized user to have restricted access to the content of the electronic book based upon the received selected portions, wherein the restriction is stored in a header file of the electronic book; and a restricted version module that saves a restricted version of the electronic book in the library unit, the restricted version including at least some content from the original version of the electronic book and having the received selected portions deleted without changing an original format of the electronic book;

wherein the restricting module includes a cross reference section that inserts a cross reference between the restricted version and an unrestricted version of the electronic book in at least one of the restricted version and the unrestricted version of the electronic book.

\* \* \* \* \*